(12) United States Patent
Tamura et al.

(10) Patent No.: US 11,500,270 B2
(45) Date of Patent: Nov. 15, 2022

(54) ACCESSORY, IMAGE PICKUP APPARATUS ON WHICH SAME IS MOUNTABLE, AND CAMERA SYSTEM

(71) Applicant: CANON KABUSHIKI KAISHA, Tokyo (JP)

(72) Inventors: Masahisa Tamura, Tochigi (JP); Kunihiko Sasaki, Tochigi (JP); Toshinori Yamazaki, Tokyo (JP); Masayasu Shigematsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/188,489

(22) Filed: Mar. 1, 2021

(65) Prior Publication Data

US 2021/0181603 A1 Jun. 17, 2021

Related U.S. Application Data

(63) Continuation of application No. PCT/JP2018/032552, filed on Sep. 3, 2018.

(51) Int. Cl.
| | | |
|---|---|---|
| *G03B 17/14* | (2021.01) | |
| *G03B 17/56* | (2021.01) | |
| *H04N 5/225* | (2006.01) | |
| *H04N 5/232* | (2006.01) | |

(52) U.S. Cl.
CPC ......... *G03B 17/14* (2013.01); *G03B 17/566* (2013.01); *H04N 5/2252* (2013.01); *H04N 5/2254* (2013.01); *H04N 5/23209* (2013.01); *H04N 5/23241* (2013.01)

(58) Field of Classification Search
USPC .................................. 396/531, 532
See application file for complete search history.

(56) References Cited

U.S. PATENT DOCUMENTS

| | | | | |
|---|---|---|---|---|
| 2012/0063020 A1* | 3/2012 | Imafuji | ............. | H04N 5/23209 396/529 |
| 2013/0022348 A1* | 1/2013 | Hasuda | ............ | H04N 5/232411 396/530 |

(Continued)

FOREIGN PATENT DOCUMENTS

| | | |
|---|---|---|
| JP | S59-048742 A | 3/1984 |
| JP | S63-172257 A | 7/1988 |

(Continued)

*Primary Examiner* — James M Hannett
*Assistant Examiner* — Dwight Alex C Tejano
(74) *Attorney, Agent, or Firm* — Canon U.S.A., Inc. I.P. Division

(57) ABSTRACT

An accessory attachable to and detachable from an image pickup apparatus includes a second mount portion including a plurality of second bayonet claw portions capable of engaging with a plurality of first bayonet claw portions, a plurality of second terminals capable of contacting with a plurality of first terminals, an accessory body, and a mount fixing member for fixing the second mount portion to the accessory body. The plurality of second terminals is provided at positions different from positions of the plurality of second bayonet claw portions, and all of multiple second terminals, among the plurality of second terminals, used in communication between the image pickup apparatus and the accessory are provided at predetermined positions.

24 Claims, 27 Drawing Sheets

(56) References Cited

U.S. PATENT DOCUMENTS

| | | | |
|---|---|---|---|
| 2013/0266303 A1* | 10/2013 | Nishio | G03B 17/565 396/532 |
| 2013/0287388 A1* | 10/2013 | Nishio | G03B 17/565 396/532 |
| 2018/0348598 A1* | 12/2018 | Yamana | G03B 17/566 |
| 2019/0129123 A1* | 5/2019 | Funaoka | G02B 7/022 |

FOREIGN PATENT DOCUMENTS

| | | |
|---|---|---|
| JP | 2013-080214 A | 5/2013 |
| JP | 2014-013331 A | 1/2014 |

* cited by examiner

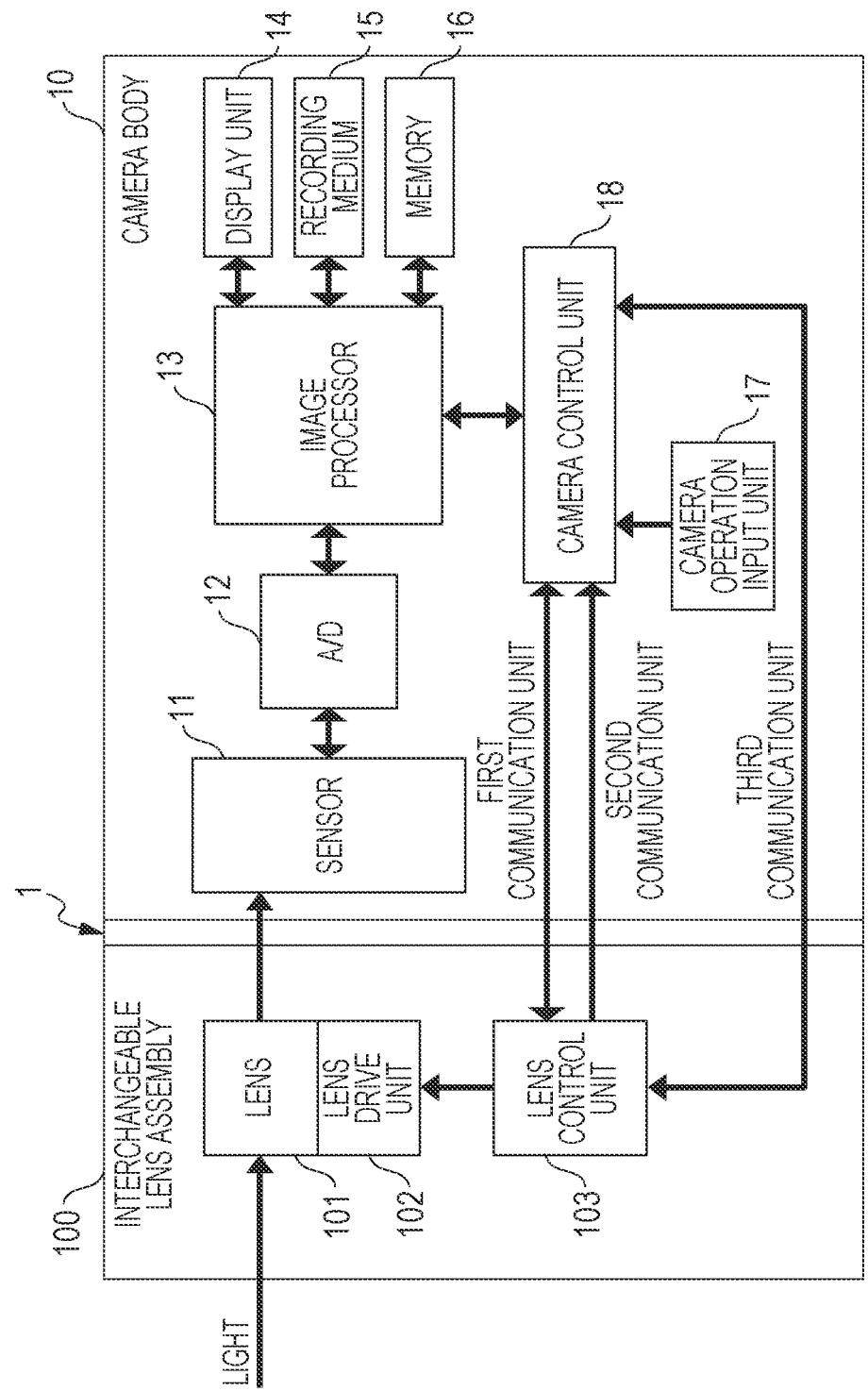

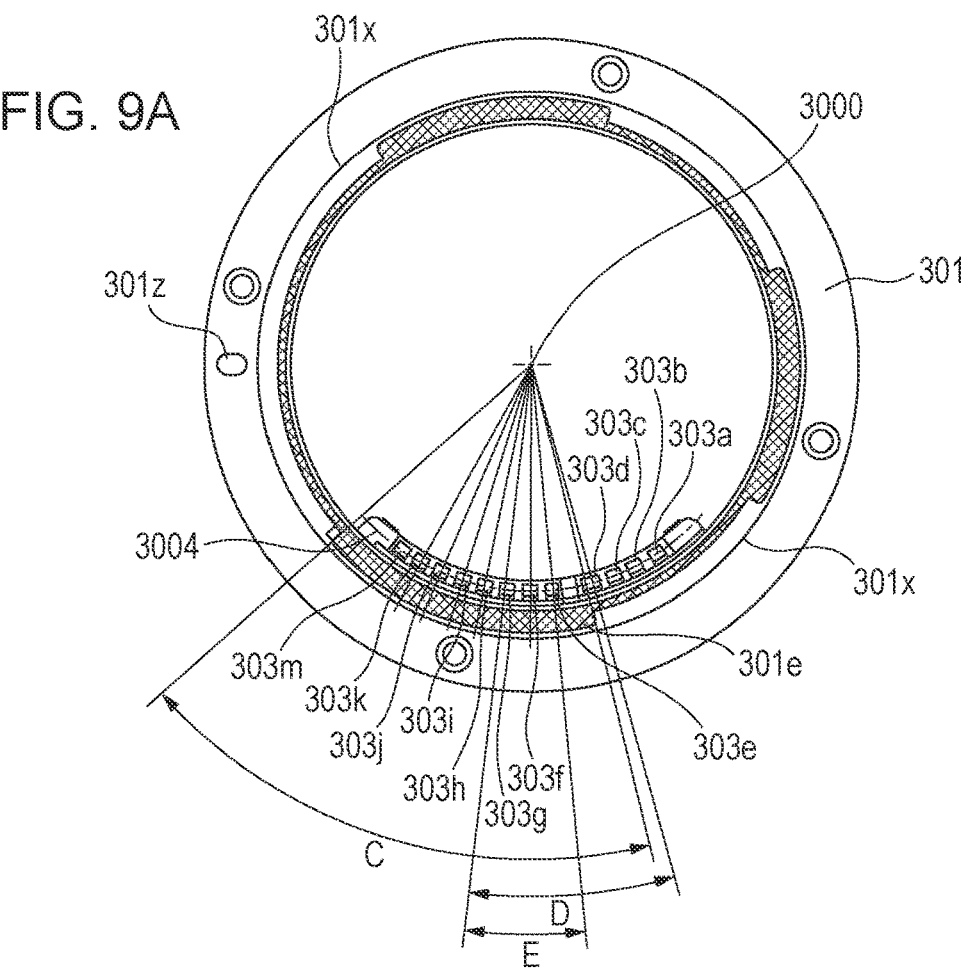
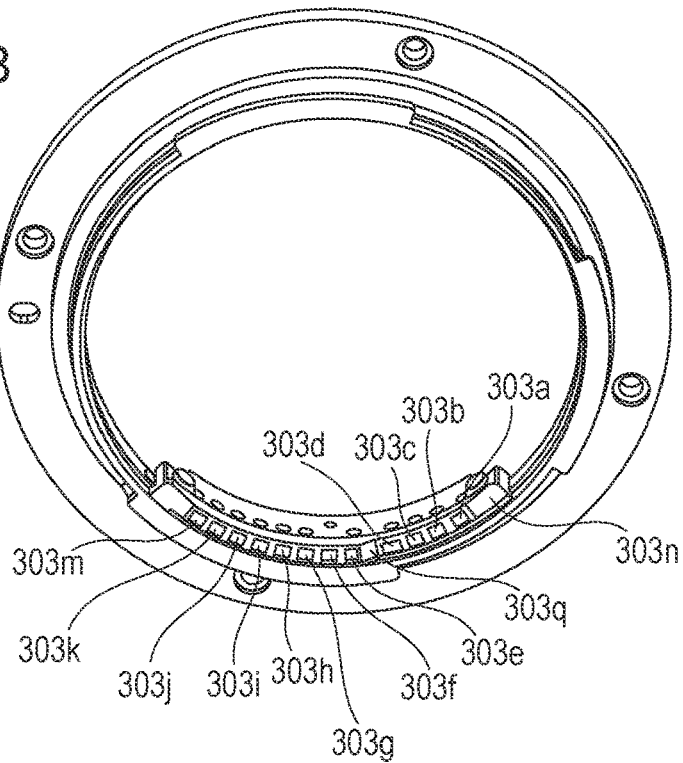

ACCESSORY, IMAGE PICKUP APPARATUS ON WHICH SAME IS MOUNTABLE, AND CAMERA SYSTEM

CROSS-REFERENCE TO RELATED APPLICATIONS

This application is a Continuation of International Patent Application No. PCT/JP2018/032552, filed Sep. 3, 2018, which is hereby incorporated by reference herein in their entirety.

BACKGROUND OF THE INVENTION

Field of the Invention

The present disclosure relates to an accessory, an image pickup apparatus on which the accessory is mountable, and a camera system.

Background Art

A camera and a camera accessory are discussed in PTL1, in which the camera includes a plurality of terminal pins, and the camera accessory, such as an interchangeable lens attachable to and detachable from the camera, includes a plurality of terminal surfaces that comes in contact with the plurality of terminal pins to communicate with the camera.

The interchangeable lens assembly discussed in PTL1 includes a plurality of bayonet claw portions that can be connected to a plurality of bayonet claw portions provided on a camera side. In PTL1, when the interchangeable lens assembly is mounted on the camera, a terminal surface on the interchangeable lens assembly side is positioned within an angle range in which a predetermined bayonet claw portion on the interchangeable lens assembly side is provided. The terminal surface comes in contact with a terminal pin, which determines the type of the interchangeable lens assembly, out of the plurality of terminal pins on the camera side. Such a configuration enables the interchangeable lens assembly discussed in PTL1 to determine the type of the interchangeable lens assembly mounted on the camera in a more stable manner.

CITATION LIST

Patent Literature

PTL1: Japanese Patent Laid-Open No. 2014-13331

A plurality of terminal pins on the camera side includes not only an above described terminal pin that determines a type of an interchangeable lens assembly mounted on the camera, but also a communication terminal for communicating between the camera and the interchangeable lens assembly. To stabilize the communication between the camera and the interchangeable lens assembly, a terminal pin corresponding to the communication terminal on the camera side is desirably in contact with a terminal surface corresponding to the communication terminal on the interchangeable lens assembly side in a more stable manner. However, PTL1 does not disclose any configuration that allows the terminal pin corresponding to the communication terminal on the camera side to be in contact with the terminal surface corresponding to the communication terminal on the interchangeable lens assembly side in a more stable manner.

SUMMARY OF THE INVENTION

The present disclosure provides an accessory capable of communicating with an image pickup apparatus in a stable manner, an image pickup apparatus on which the accessory can be mounted, and a camera system.

To achieve the above described purpose, an accessory according to the present invention is an accessory attachable to and detachable from an image pickup apparatus including a first mount portion including a plurality of first bayonet claw portions, and a plurality of first terminals, wherein the accessory includes a second mount portion including a plurality of second bayonet claw portions capable of engaging with the plurality of first bayonet claw portions, a plurality of second terminals capable of contacting with the plurality of first terminals, an accessory body, and a fixing member for fixing the second mount portion to the accessory body, the plurality of second terminals is provided at positions different from positions of the plurality of second bayonet claw portions, and when viewed in a central axis direction of the second mount portion, a plurality of half lines that extends from a central axis of the second mount portion and pass through a plurality of second terminals, among the plurality of second terminals, that are used in communication between the image pickup apparatus and the accessory, all pass through a predetermined second bayonet claw portion.

According to the present invention, an accessory capable of communicating with an image pickup apparatus in a stable manner, an image pickup apparatus on which the accessory can be mounted, and a camera system can be provided.

Further features of the present invention will become apparent from the following description of exemplary embodiments with reference to the attached drawings.

BRIEF DESCRIPTION OF THE DRAWINGS

FIG. 1A is a block diagram of a camera and an interchangeable lens assembly according to an exemplary embodiment.

FIG. 9A is a detailed diagram illustrating a dispositional relationship of lens contact portions according to the present exemplary embodiment.

FIG. 9B is a detailed diagram illustrating the dispositional relationship of the lens contact portions according to the present exemplary embodiment.

Figure 1B:
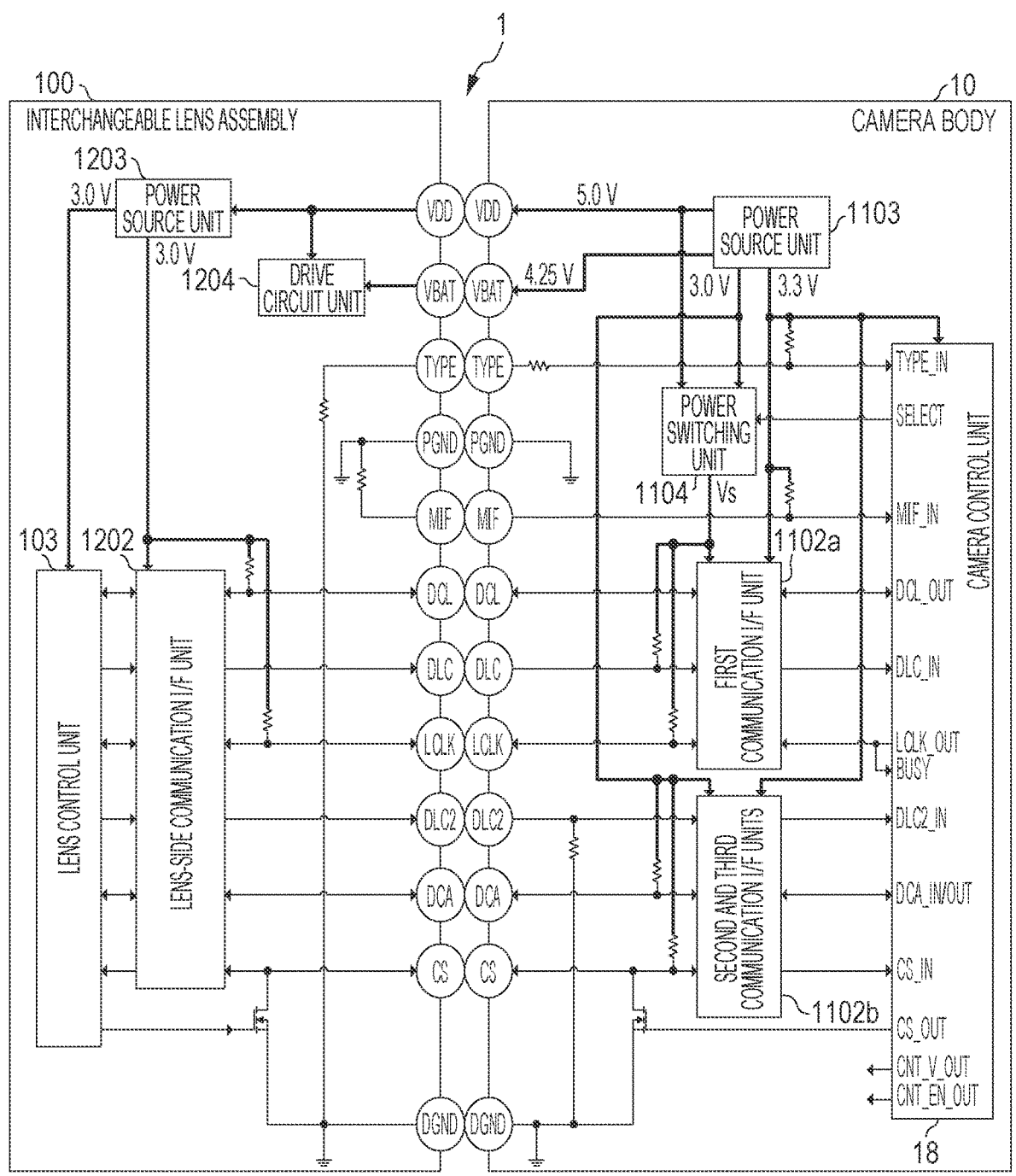
FIG. 1B is a block diagram of terminals of the camera and the interchangeable lens assembly according to the exemplary embodiment.

DESCRIPTION OF THE EMBODIMENTS (Configuration of Camera System)

Referring first to FIG. 1A, a camera system that is an exemplary embodiment of the present invention will be described. As illustrated in FIG. 1A, the camera system according to the present exemplary embodiment includes an interchangeable lens assembly (an optical apparatus, an accessory, a lens apparatus) 100 that is a camera accessory, and a camera body (an image pickup apparatus) 10 on which the interchangeable lens assembly 100 is detachably mounted. In other words, the interchangeable lens assembly 100 can be mounted to and dismounted from the camera body 10.

(Configuration of Interchangeable Lens Assembly 100)

The interchangeable lens assembly 100 includes a lens 101, and a lens drive unit 102 including an actuator that moves or operates optical members, such as a lens unit and an aperture (both not shown), included in the lens 101. The interchangeable lens assembly 100 includes a lens control unit 103 including a microcomputer that controls communication between a camera control unit 18 through a mount 1 and that controls the lens drive unit 102. The lens 101 may include only a single lens unit or may include a plurality of lens units. The same applies to the aperture.

Herein, the lens unit is a term denoting a single lens element, a single cemented lens, or a collective plurality of lenses, in which an interval with an adjacent lens unit changes when zooming or focusing. The lens 101 also includes a zooming lens unit that is a lens unit that moves in an optical axis direction to perform zooming, and a focusing lens unit that moves in the optical axis direction to perform focusing. The lens 101 further includes a shift lens unit that moves in directions different from the optical axis direction to perform camera shake correction. However, the lens 101 does not have to include the zooming lens unit and the shift lens unit.

(Configuration of Camera Body 10)

The camera body 10 includes an image sensor (an image pickup element) 11 that is a charge-storage type solid-state image pickup element that outputs an electric signal after photoelectrically converting an image of a subject, which is an optical image formed by the lens 101 in the interchangeable lens assembly 100. The camera body 10 further includes an A/D conversion unit 12 that converts an analog electrical signal output from the image sensor 11 into a digital signal, and an image processor 13 that generates an image signal by performing various types of image processing on the digital signal converted by the A/D conversion unit 12.

The image signal (a still image or a moving image) generated with the image processor 13 is displayed on a display unit 14 or is recorded in a recording medium 15. The camera body 10 includes a memory 16 that functions as a buffer when processing is performed on the image signal, and a memory 16 that stores an operation program used by a camera control unit 18 described below. The camera body 10 further includes a camera operation input unit 17 including a power switch that turns the power source on and off, a shooting switch that starts recording of a video signal, and a selecting/setting switch to perform setting of various menus.

The camera body 10 further includes the camera control unit 18 that includes a microcomputer. The camera control unit 18 performs various settings based on signals input from the camera operation input unit 17, and controls communication between the lens control unit 103 included in the interchangeable lens assembly 100 through the mount 1.

(Configuration of Electrical Connection between Camera Body 10 and Interchangeable Lens Assembly 100)

Referring next to FIG. 1B, a configuration of the electrical connection between the camera body 10 and the interchangeable lens assembly 100 will be described. FIG. 1B illustrates an electric circuit configuration when the camera body 10 and the interchangeable lens assembly 100 are connected to each other through the mount 1, terminals (electrical contacts) provided in the mount 1 to electrically connect the camera body 10 and the interchangeable lens assembly 100 to each other, and a state in which the terminals are connected to each other.

The mount 1 in the camera system includes a mount portion (a first mount portion) A on the camera body 10 side and a mount portion (a second mount portion) B on the interchangeable lens assembly 100 side. The mount portion A and the mount portion B include a plurality of terminals (contact points or electrical contacts) that is capable of being electrically connected to the counterparts. More specifically, the mount 1 includes VDD terminals and VBAT terminals that supply power to the interchangeable lens assembly 100 from the camera body 10, DGND terminals and PGND terminals that are ground terminals. The mount 1 further includes LCLK terminals, DCL terminals, DLC terminals, DLC2 terminals, CS terminals, and DCA terminals that are communication terminals for the camera control unit 18 and the lens control unit 103 to communicate with each other. As other terminals, the mount 1 further includes MIF terminals for detecting that the interchangeable lens assembly 100 has been mounted on the camera body 10, and TYPE terminals for distinguishing the type of camera accessory that has been mounted on the camera body 10. Hereinafter, a more detailed description of the terminals will be given.

As described in FIG. 1B, a camera power source unit 1103 generates communication control power (VDD) as a power that supplies power to the mounted accessory via the VDD terminals, or as a power to be supplied to a first communication I/F unit 1102*a* via a power switching unit 1104. The camera power source unit 1103 also generates driving power (VBAT) as a power to supply power to the mounted accessory via the VBAT terminals.

The camera power source unit 1103 also generates 3.3 V power as a power to be supplied to the camera control unit 18, the first communication I/F unit 1102*a*, and a second and third communication I/F unit 1102*b*. The camera power source unit 1103 also generates 3.0 V power as a power to be supplied to the first communication I/F unit 1102*a* via the power switching unit 1104, and to the second and third communication I/F unit 1102*b*.

The power switching unit 1104 is connected to camera power source unit 1103. The power switching unit 1104 supplies only one of the VDD and the 3.0 V power generated by the camera power source unit 1103 to the first communication I/F unit 1102*a*, as a power source Vs for communication interface. Switching of power voltages is executed based on an instruction from the camera control unit 18.

A lens power source unit 1203 generates 3.0 V power as a power to be supplied to a lens control unit 103 and a lens side communication I/F unit 1205 based on a VDD supplied from the camera body 10. In a state where the interchangeable lens assembly 100 is mounter to the camera body 10, the driving power (VBAT) is supplied from the camera power source unit 1103 to a drive circuit unit 1204 in an interchangeable lens assembly 100 side via the VBAT terminals.

In the present exemplary embodiment, power source voltage levels for the lens control unit 103 and the lens side communication I/F unit 1205 are the same (3.0 V). However, a voltage level that lens control unit 103 indicates may be set to 3.3 V. Since it is necessary to supply power having voltage levels of 3.0 V and 3.3 V, in this case, the lens power source unit 1203 generates 3.0 V and 3.3. V power.

(Power Terminals)

The VDD terminals are terminals that supply communication control power (VDD), which is communication power used mainly to control communication, to the interchangeable lens assembly 100 from the camera body 10. In the present exemplary embodiment, the communication control power is 5.0 V. The VBAT terminals are terminals that supply driving power (VBAT), which is driving power used in operations other than the above communication control, such as operations of mechanical drive systems mainly including a motor, to the interchangeable lens assembly 100 from the camera body 10. In the present exemplary embodiment, the driving power is 4.25 V.

(Ground Terminals)

The DGND terminals are terminals that connect the camera body 10 and the communication control system of the interchangeable lens assembly 100 to the ground. In other words, the DGND terminals are ground (GND) terminals corresponding to the VDD power source described above. Grounding herein is setting to a level that is the same as the level of the negative electrode-side of the power source, such as a battery. The PGND terminals are terminals that connect the camera body 10 and the mechanical drive system, such as a motor, provided in the interchangeable lens assembly 100 to the ground. In other words, the PGND terminals are grounding (GND) terminals that correspond to the VBAT power source described above.

(Communication Terminals)

The communication terminals include a terminals group (the LCLK, DCL, and DLC terminals) that is a first communication unit to perform the first communication, and terminals (the DLC2 terminals) that are a second communication unit to perform the second communication independent of the first communication. The communication terminals further include a terminals group (the CS, and DCA terminals) that is a third communication unit to perform the third communication independent of the first and second communications. The camera control unit 18 and the lens control unit 103 are capable of performing the first, second, and third communications that are independent of each other via these communication terminals.

The LCLK terminals are terminals for communication clock signals output from the camera body 10 to the interchangeable lens assembly 100, and are also terminals in which the camera body 10 monitors a busy state of the interchangeable lens assembly 100. The DCL terminals are terminals for two-way communication data between the camera body 10 and the interchangeable lens assembly 100, and are CMOS interfaces. The DLC terminals are terminals for communication data output from the interchangeable lens assembly 100 to the camera body 10, and are CMOS interfaces.

The DLC2 terminals are terminals for communication data output from the interchangeable lens assembly 100 to the camera body 10, and are CMOS interfaces. The DCA terminals are terminals for two-way communication data between the camera body 10 and the interchangeable lens assembly 100, and are CMOS interfaces. The CS terminals are terminals for a communication request signal between the camera body 10 and the interchangeable lens assembly 100, and are open interfaces.

(Other Terminals)

MIF terminals are terminals for detecting whether the interchangeable lens assembly 100 has been mounted on the camera body 10, and whether the interchangeable lens assembly 100 has been dismounted from the camera body 10. After detecting that the interchangeable lens assembly 100 has been mounted on the camera body 10 by detecting the change in the voltage level of the MIF terminals, the camera control unit 18 starts supplying power to the VDD terminals and the VBAT terminals, and starts communication. In other words, the MIF terminals make triggers that start the supply of power from the camera body 10 to the interchangeable lens assembly 100.

As described above, the TYPE terminals are terminals that distinguish the type of camera accessory mounted on the camera body 10. The camera control unit 18 detects the voltages of the signals of the TYPE terminals, and based on the value of the voltages, distinguishes the type of camera accessory mounted on the camera body 10. The interchangeable lens assembly 100 is pull-down connected to the DGND terminals at a predetermined resistance value described below. In the present exemplary embodiment, in a case in which the interchangeable lens assembly 100 is mounted on the camera body 10, communication is performed while the interface voltages of the first communication unit, the second communication unit, and the third communication unit are set to 3.0 V.

(Configuration of Mechanical Connection between Camera Body 10 and Interchangeable Lens Assembly 100)

Figure 2A:
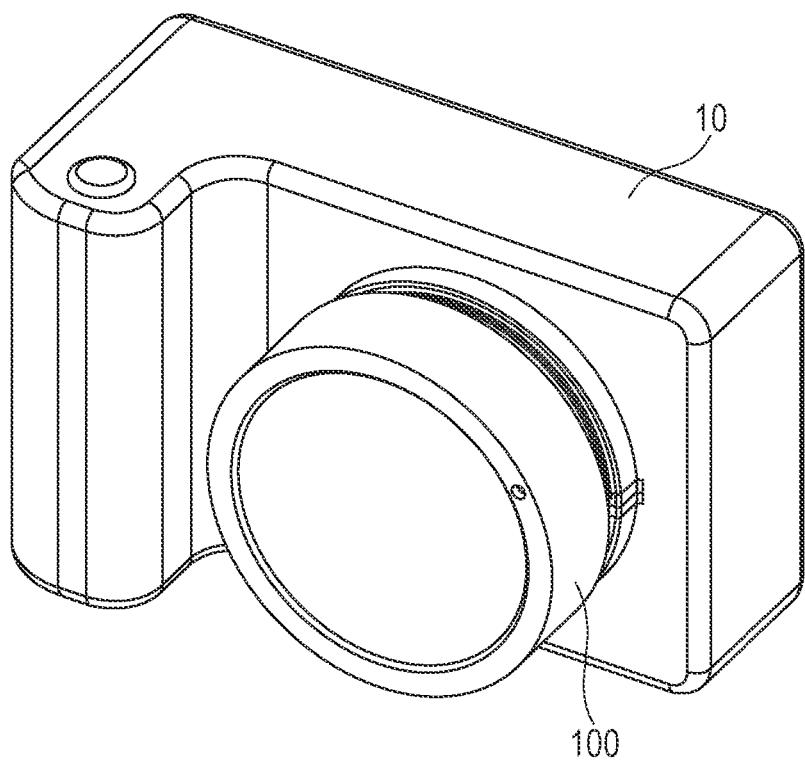
FIG. 2A is an overall schematic view of a camera and an interchangeable lens assembly according to the exemplary embodiment.
Figure 2B:
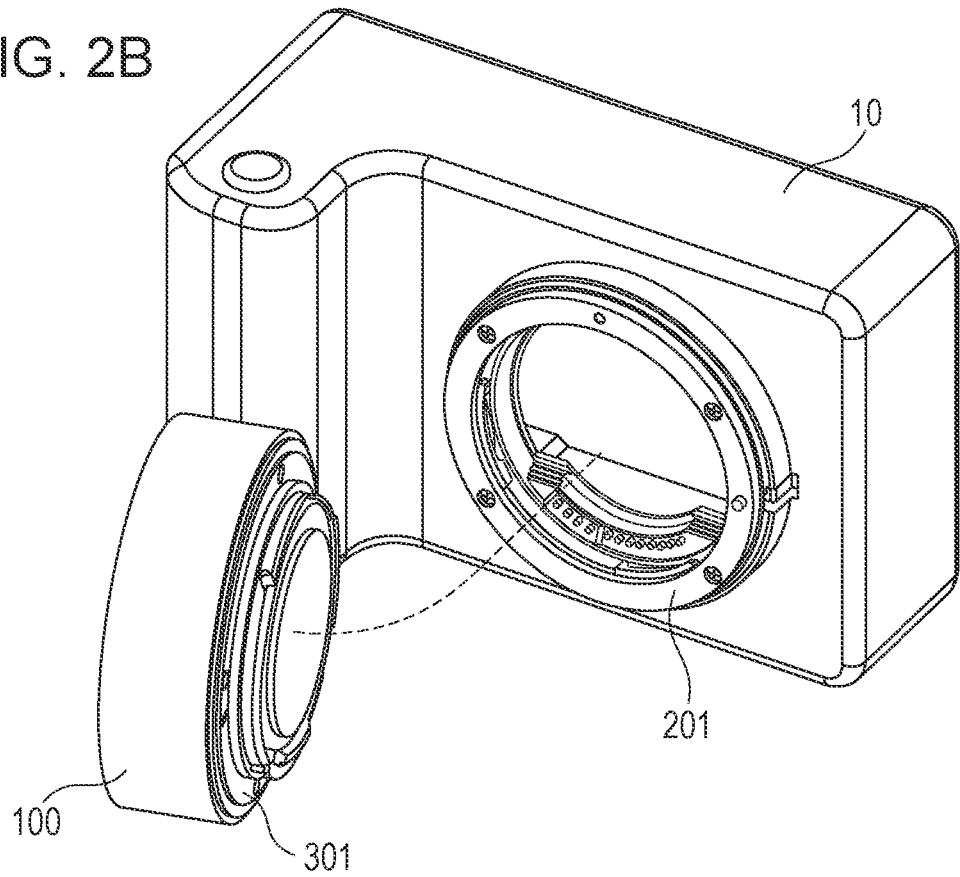
FIG. 2B is an overall schematic view illustrating a state in which the interchangeable lens assembly according to the exemplary embodiment has been dismounted from the camera.

FIG. 2A and FIG. 2B illustrate perspective views of external appearances of the camera body 10 and the interchangeable lens assembly 100. FIG. 2A illustrates a state in which the interchangeable lens assembly 100 is mounted on the camera body 10. FIG. 2B illustrates a state in which the interchangeable lens assembly 100 has been dismounted from the camera body 10. The camera body 10 and the interchangeable lens assembly 100 are connected to each other by moving the interchangeable lens assembly 100 in the unlocking position to the locking position while reference surfaces of a camera mount 201 and a lens mount 301 are in contact with each other. Herein, the camera mount 201 is a mount portion (a first mount portion) on an image pickup apparatus side, and the lens mount 301 is a mount portion (a second mount portion) on an optical apparatus side.

In the following description, a second conversion adapter 70 has a camera mount 1201 having the same configuration as that of the camera mount 201 of the camera body 10 has. A first conversion adapter 40 has a lens mount 1301 having the same configuration as that of the lens mount 301 of the first lens 100 (the interchangeable lens assembly 100) has.

The shape of the camera mount 201 and the lens mount 301 is a ring shape, but the shape described below may be applied. For example, a shape of the camera mount 201 and the lens mount 301, particularly a shape of the opening or a shape of a portion in contact with the other side may be an arc shape. In other words, the shape of the camera mount 201 and the lens mount 301, particularly the shape of the opening or the shape of the portion in contact with the other side may be a ring shape in which a part of the ring is missing.

Figure 3A:
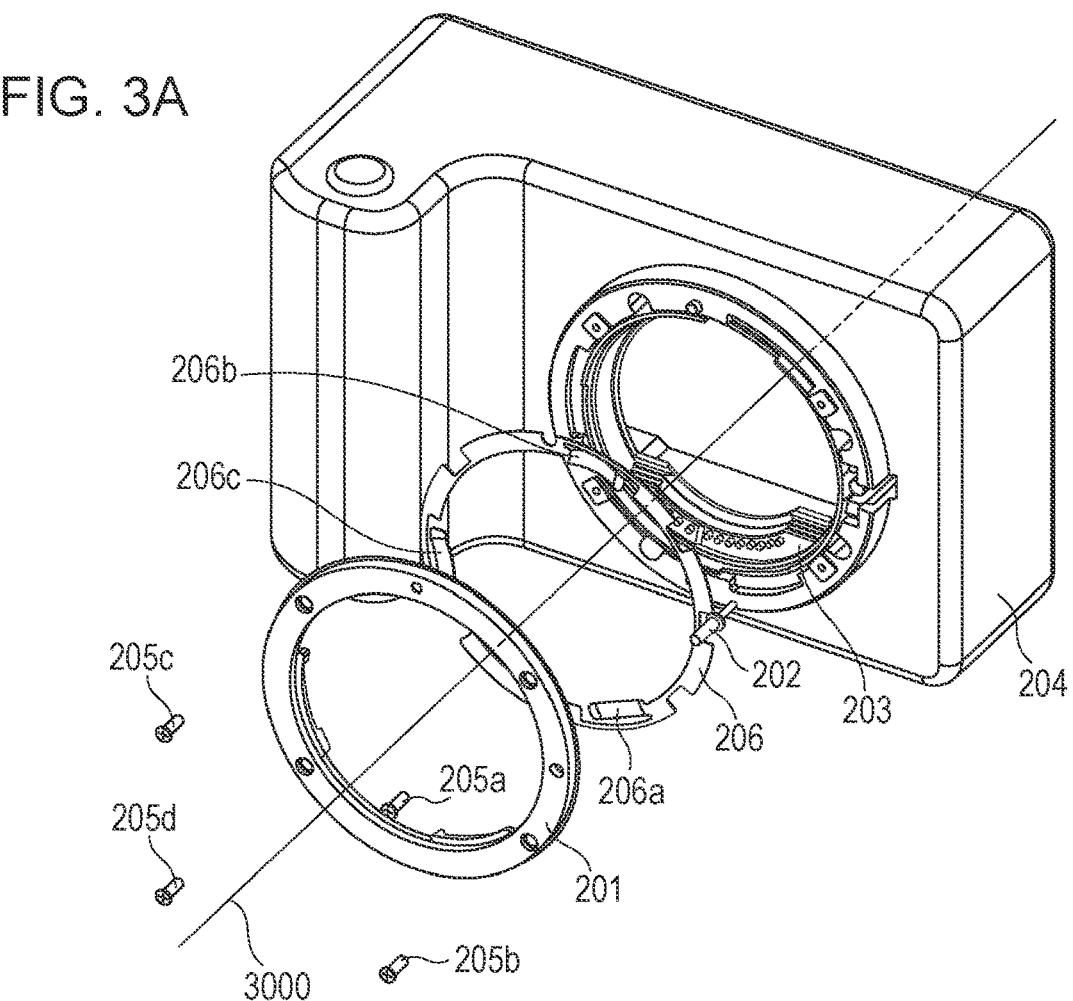
FIG. 3A is an exploded perspective view of the camera according to the present exemplary embodiment.
Figure 3B:
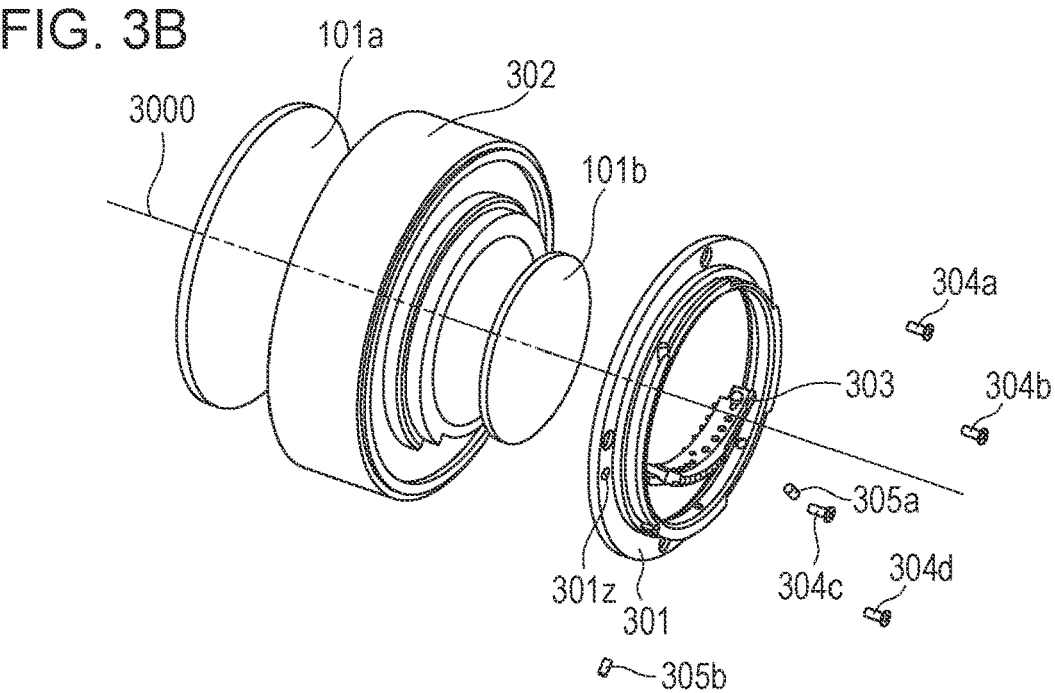
FIG. 3B is an exploded perspective view of the interchangeable lens assembly according to the present exemplary embodiment.

FIG. 3A and FIG. 3B illustrate exploded perspective views of the camera body 10 and the interchangeable lens assembly 100. FIG. 3A illustrates an exploded perspective view of the camera body 10, and FIG. 3B illustrates an exposed perspective view of the interchangeable lens assembly 100. An optical axis 3000 is an optical axis of the lens 101 of the interchangeable lens assembly 100, and a light flux for imaging passing along the optical axis 3000 can enter the image sensor 11 in a state in which the interchangeable lens assembly 100 is mounted on the camera body 10.

(Members Included in Camera Body 10)

Each of members included in the camera body 10 will now be described.

A lock pin 202 is a restriction member (a locking member, a convex portion) that restricts (locks) a mounted state of the camera body 10 and the camera accessory. The lock pin 202 can be advanced and retreated in a direction parallel to the optical axis 3000. Specifically, the lock pin 202 enters a lock pin groove (a recess, a groove portion) 301z of the lens mount 301 to lock the mounted state in which the interchangeable lens assembly 100 and the camera body 10 are locked to each other, when the interchangeable lens assembly 100 is mounted on the camera body 10.

A holding member 203 is a camera-side terminal holding member that holds a plurality of terminal pins 203a to 203k, and 203m provided on the camera body 10 side.

A camera body member 204 is a camera housing that holds the members of the camera body 10. Specifically, the camera mount 201 and the holding member 203 described above are fastened to the camera body member 204 with fastening screws 205a to 205d for the camera mount 201 and fastening screws for the holding member 203 (not illustrated). The camera body member 204 holds an image pickup unit (not illustrated) on which the image sensor 11 is mounted and a shutter unit (not illustrated).

A lens mount biasing member 206 is a camera-side biasing member that draws in described-later first to third lens claw portions (a plurality of second engagement portions and a plurality of second bayonet claw portions) 301d to 301f provided in the lens mount 301 towards a camera mount 201 side. The lens mount biasing member 206 is interposed in a space between the camera mount 201 and the camera body member 204.

(Members Included in Interchangeable Lens Assembly 100)

Each of members included in the interchangeable lens assembly 100 will now be described.

A front lens 101a and a rear lens 101b are optical members included in the lens 101. The lens 101 may include lenses other than the front lens 101a and the rear lens 101b.

The lens mount 301 is a mount portion on the interchangeable lens assembly 100 side. A lens barrel (an accessory main body) 302 is a lens holding member that holds the lens 101. The lens mount 301 is fastened to the lens barrel 302 with lens mount fastening screws 304a to 304d.

A holding member 303 is a lens-side terminal holding member that holds a plurality of terminal surfaces 303a to 303k, and 303m provided on the interchangeable lens assembly 100 side. The holding member 303 is fastened to the lens mount 301 with lens contact holding portion fastening screws 305a and 305b.

(Configuration of Camera Mount 201)

Referring next to FIGS. 4A to 6B, a configuration of the camera mount 201 will be described.

Figure 4A:
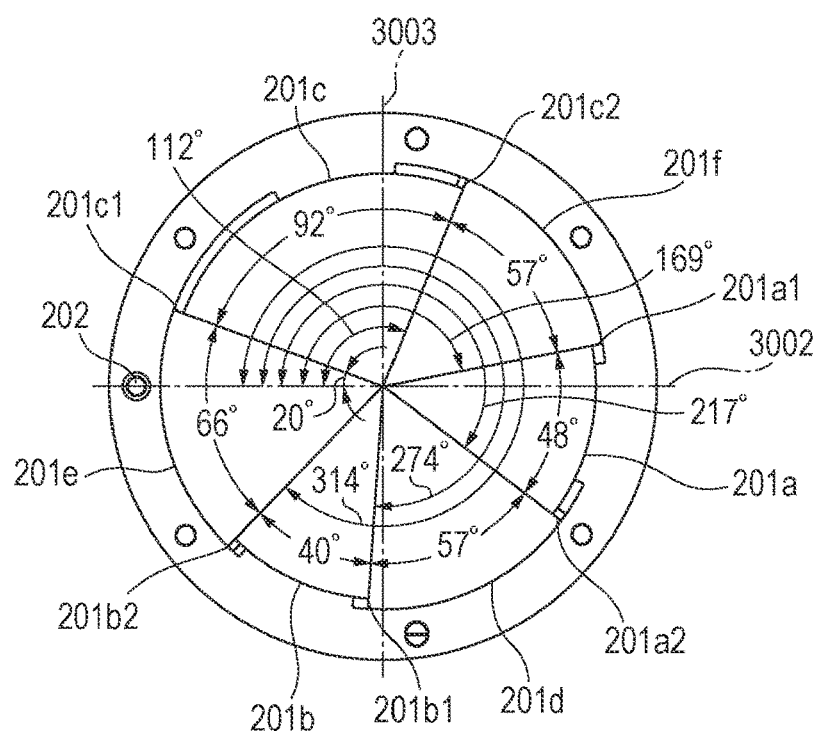
FIG. 4A is a detailed diagram of a camera mount according to the present exemplary embodiment.
Figure 4B:
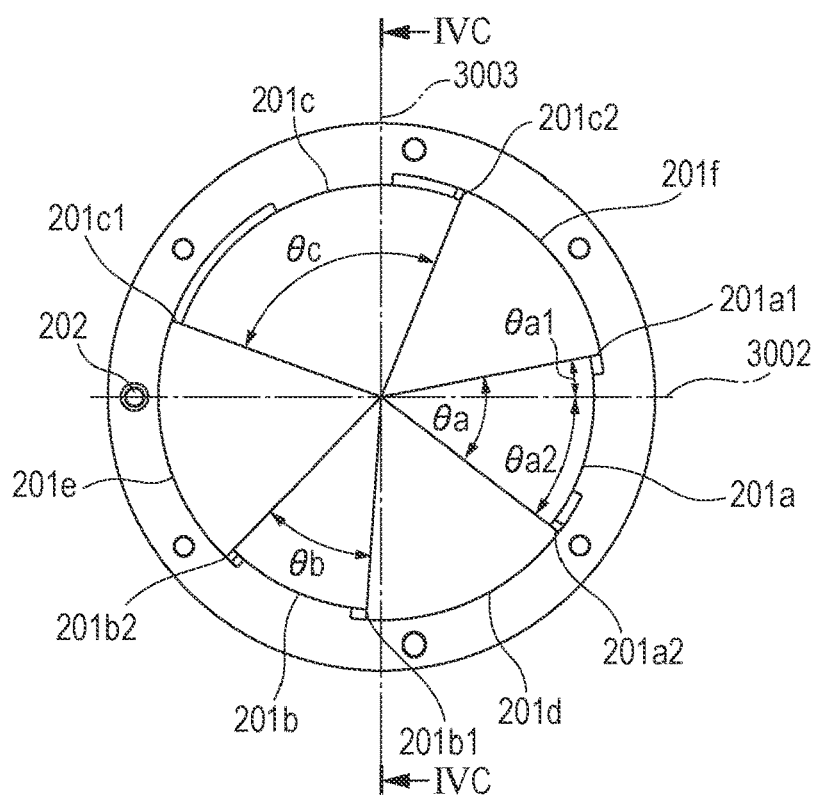
FIG. 4B is a detailed diagram of the camera mount according to the present exemplary embodiment.
Figure 5A:
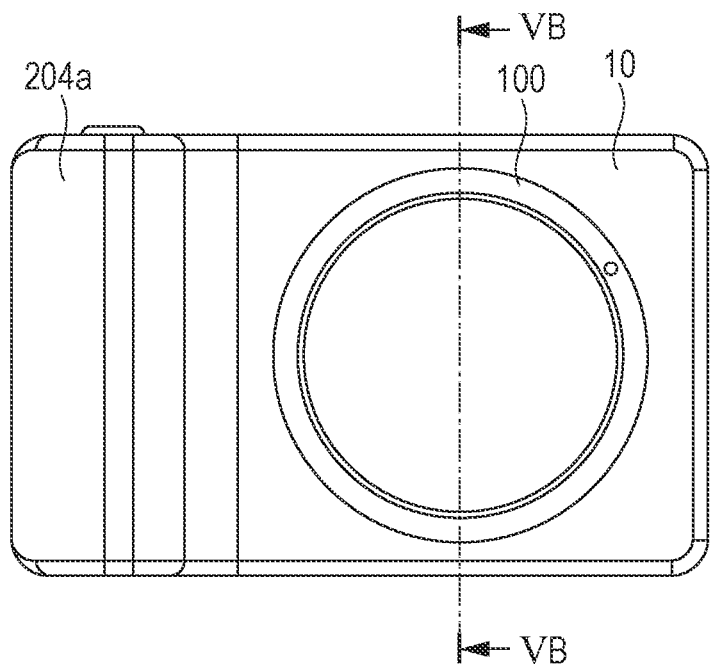
FIG. 5A is a front view of a camera according to the present exemplary embodiment in a normal position.
Figure 5B:
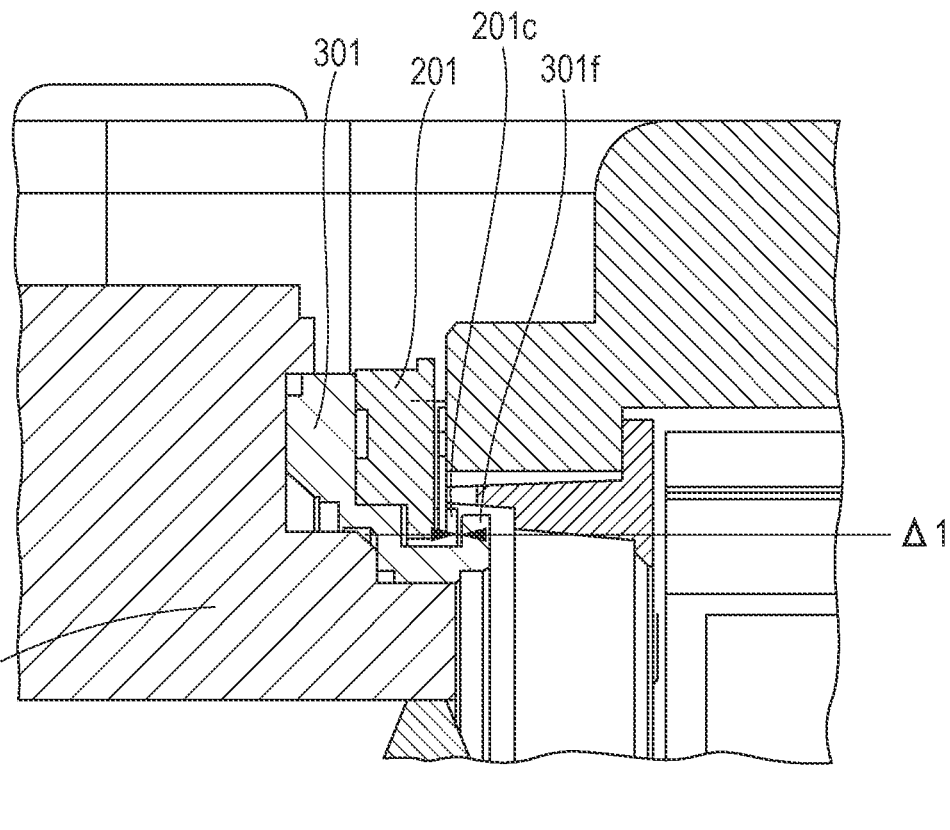
FIG. 5B is a cross-sectional view of the camera according to the present exemplary embodiment in a normal position state taken along a line VB-VB.
Figure 6A:
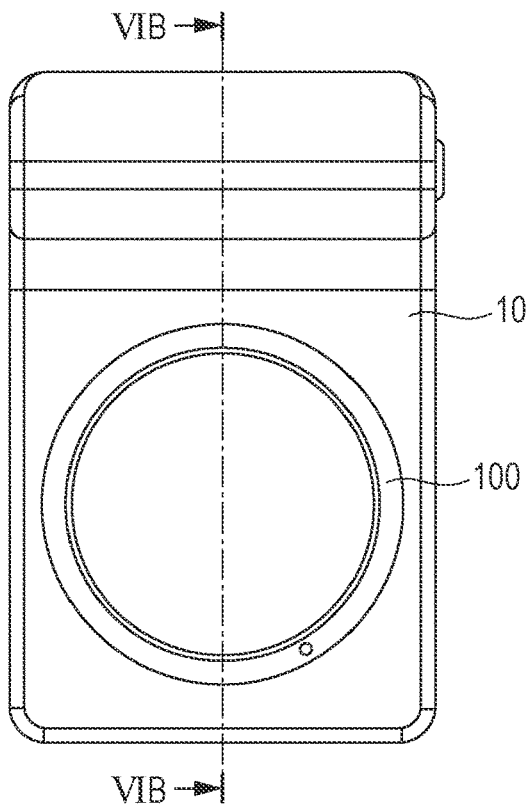
FIG. 6A is a front view of a camera according to the present exemplary embodiment in a vertical position.
Figure 6B:
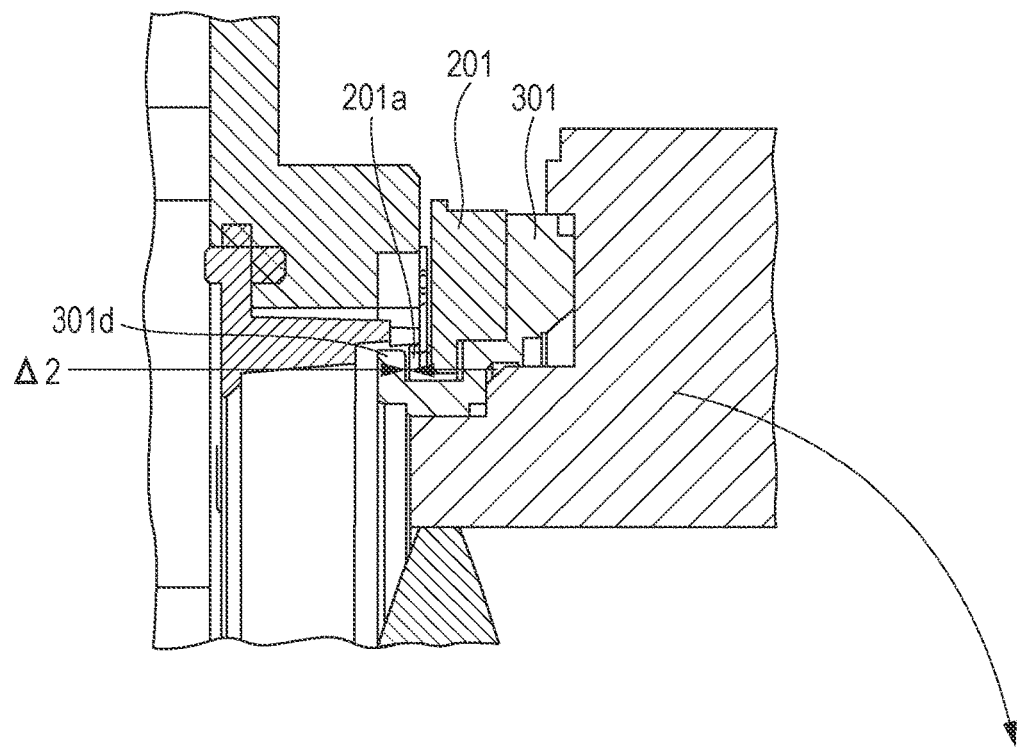
FIG. 6B is a cross-sectional view of the camera according to the present exemplary embodiment in a vertical position state taken along a line VIB-VIB.

FIGS. 4A and 4B are diagrams of the camera mount 201 in a state viewed from a photographer side (a rear side of the camera body 10) of the camera body 10. FIG. 5A is a drawing illustrating a normal position state, which is a state most frequently used when the interchangeable lens assembly 100 is mounted on the camera body 10. In the normal position state, a camera grip 204a of the camera body 10 is positioned on the left side when viewed from a subject side. FIG. 5B is a partially enlarged cross-sectional view of the camera body 10 taken in a VB-VB direction. In FIG. 5B, the interchangeable lens assembly 100 is mounted and the camera body 10 is in the normal position state. The VB-VB direction is a vertical direction that passes the center of the camera mount 201. FIG. 6A is a diagram illustrating a vertical position state, which is a state used second most frequently with respect to the normal position state when the interchangeable lens assembly 100 is mounted on the camera body 10. In the vertical position state, the camera body 10 is set such that the camera grip 204a is on the upper side (the lock pin 202 being positioned on the lower side when the camera mount 201 is viewed from the photographer side). FIG. 6B is a partially enlarged cross-sectional view of the camera body 10 taken in a VIB-VIB direction. In FIG. 6B, the interchangeable lens assembly 100 is mounted and the camera body 10 is in the vertical position state. The VIB-VIB direction passes the center of the camera mount 201, and extends in the vertical direction, which is orthogonal to the VB-VB direction.

As illustrated in FIGS. 4A and 4B, a plurality of camera claw portions is provided in the camera mount 201. The plurality of camera claw portions is a plurality of first engagement portions (a plurality of first bayonet claw portions) included in the camera mount 201, each of the plurality of camera claw portions having widths in a radial direction and a circumferential direction of an opening. The plurality of camera claw portions herein is a first camera claw portion (a camera-side bayonet claw portion) 201a, a second camera claw portion 201b, and a third camera claw portion 201c.

In FIGS. 4A and 4B, a space between the first camera claw portion 201a and the second camera claw portion 201b is referred to as a first camera notch portion (a first camera recess) 201d, and a space between the second camera claw portion 201b and the third camera claw portion 201c is referred to as a second camera notch portion 201e. A space between the third camera claw portion 201c and the first camera claw portion 201a is referred to as a third camera notch portion 201f.

Herein, both ends of the first camera claw portion 201a are referred to as a first end 201a1 and a second end 201a2, and both ends of the second camera claw portion 201b are referred to as a third end 201b1 and a fourth end 201b2. Furthermore, both ends of the third camera claw portion 201c are referred to as a fifth end 201c1 and a sixth end 201c2.

An angle formed by a line connecting a center of the camera mount 201 and the first end 201a1, and a line connecting the center of the camera mount 201 and the second end 201a2 is assumed to be θa. An angle formed by a line connecting the center of the camera mount 201 and the third end 201b1, and a line connecting the center of the camera mount 201 and the fourth end 201b2 is assumed to be θb. An angle formed by a line connecting the center of the camera mount 201 and the fifth end 201c1, and a line connecting the center of the camera mount 201 and the sixth end 201c2 is assumed to be θc. As illustrated in FIGS. 4A and 4B, θa=48°, θb=40°, θc=92° are satisfied in the present exemplary embodiment. Each of θa, θb, and θc are angles of the corresponding camera claw portions in the circumferential direction.

When assuming that an angle formed by the line connecting the center of the camera mount 201 and the second end 201a2, and the line connecting the center of the camera mount 201 and the third end 201b1 is an angle of the first camera notch portion 201d in the circumferential direction, the formed angle is 57° in the present exemplary embodiment. Similarly, an angle of the second camera notch portion 201e in the circumferential direction is 66°, and an angle of the third camera notch portion 201f in the circumferential direction is 57°.

A line segment connecting the center of the camera mount 201 and a center of the lock pin 202 is referred to as a reference line. An angle in which the first camera claw portion 201a is disposed is assumed to be in the range of an angle formed between the line connecting the center of the camera mount 201 and the first end 201a1 and the reference line and an angle formed between the line connecting the center of the camera mount 201 and the second end 201a2 and the reference line. At this time, an angle in which the first camera claw portion 201a is disposed is in the range of 169° to 217°. Similarly, an angle in which the second camera claw portion 201b is disposed is in the range of 274° to 314°, and an angle in which the third camera claw portion 201c is disposed is in the range of 20° to 112°.

Herein, θa is divided by a center line 3002 a line that passes the center of the lock pin 202 and the center of the camera mount 201 into an angle θa1 on the upper side of the center line 3002 and an angle θa2 on the lower side of the center line 3002. In the present exemplary embodiment, the camera claw portions and the camera notch portions are disposed such that relationships θc≥θa+θb, and θa1+θc>θa2+θb are satisfied.

By employing such a configuration, the strength of the camera claw portion above the center line 3002, which is a center line that extends in the horizontal direction of the camera mount 201, can be increased. Thus, in the camera body 10 in the normal position state on which the interchangeable lens assembly 100 has been mounted, deformation of the camera claw portions supporting the weight of the interchangeable lens assembly 100 can be suppressed and tilting of the interchangeable lens assembly 100 in the vertical direction can be reduced.

In the present exemplary embodiment, the third camera claw portion 201c is disposed such that a center line 3003 passing the center of the camera mount 201 passes at least a portion of third camera claw portion 201c when the camera body 10 is in the normal position state. The center line 3003 passing the center of the camera mount 201 is a line orthogonal to the center line 3002 that passes the center of the lock pin 202 and the center of the camera mount 201.

The center line 3003 extends in the vertical direction from a center axis parallel to the optical axis 3000. In other words, the center line 3003 is a vertical line orthogonal to the center axis of the camera mount 201 and passes though the center axis of the camera mount 201 when the camera body 10 is placed on a horizontal plane.

With the above configuration, a below-described space Δ1 between the third lens claw portion 301f and the third camera claw portion 201c can be reduced in a direction parallel to the optical axis 3000 in the normal position state, as illustrated in FIG. 5B. When the camera body 10 and the interchangeable lens assembly 100 are in the normal position state, the space created by the interchangeable lens assembly 100 in the gravity direction (a direction orthogonal to the optical axis) with respect to the camera body 10 while the camera mount 201 supports the weight of the interchangeable lens assembly 100 can thereby be reduced.

In the present exemplary embodiment, the first camera claw portion 201a is disposed such that the center line 3002 passing the center of the camera mount 201 when the camera body 10 is in the normal position state passes at least a portion of the first camera claw portion 201a.

With the above configuration, a space Δ2 between the first lens claw portion 301d and the first camera claw portion 201a can be reduced in a direction parallel to the optical axis 3000 in the vertical position state, as illustrated in FIG. 6B. When the camera body 10 is in the vertical position state on which the interchangeable lens assembly 100 has been mounted, the space created by the interchangeable lens assembly 100 in the gravity direction with respect to the camera body 10 while the camera mount 201 supports the weight of the interchangeable lens assembly 100 can thereby be reduced.

(Configuration of Lens Mount 301)

A configuration of the lens mount 301 will now be described with reference to FIG. 7 through FIGS. 9A and 9B.

Figure 7A:
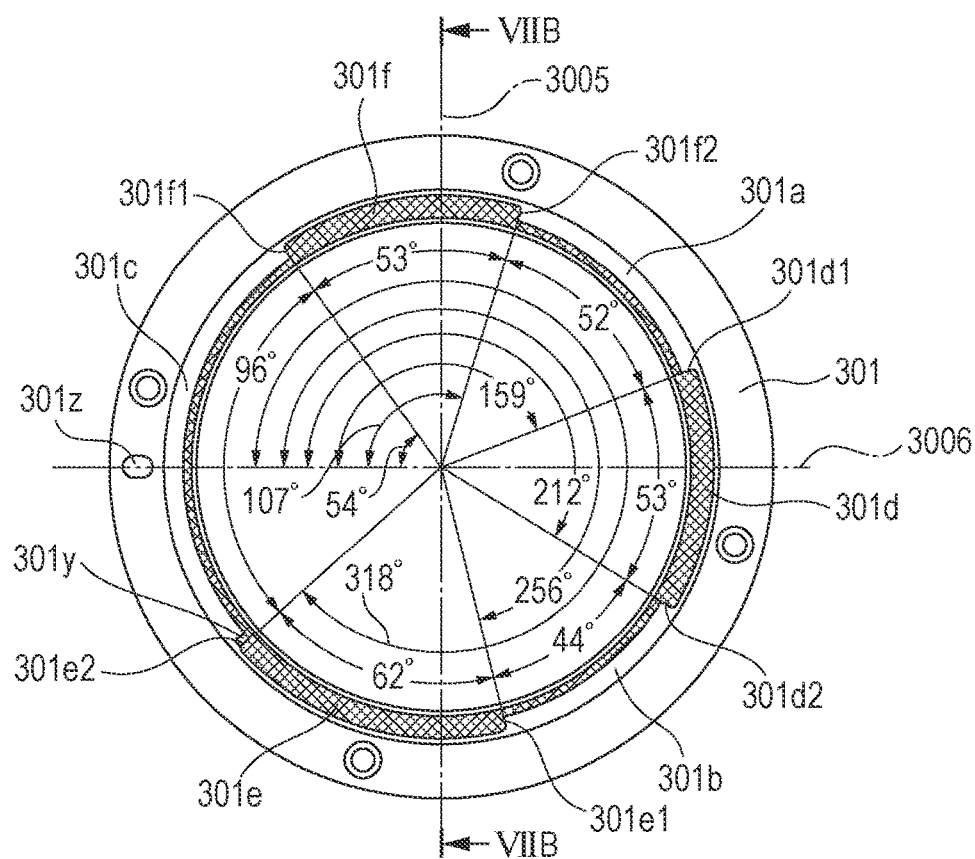
FIG. 7A is a detailed diagram of a lock phase state of a lens mount according to the present exemplary embodiment.
Figure 7B:
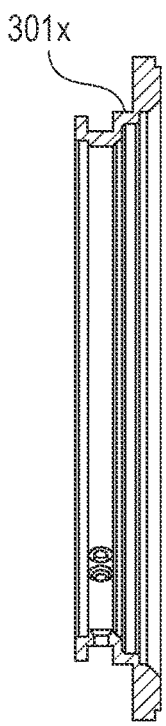
FIG. 7B is a detailed diagram of the lock phase state of the lens mount according to the present exemplary embodiment.

FIG. 7 is a diagram of the lens mount 301 of the interchangeable lens assembly 100, viewed from the photographer side, in a state (a lock phase state) in which the lens mount 301 is locked to the camera body 10 in the normal position state, which is a state where the lock pin groove 301z is positioned on the left side when viewed from the photographer side.

The lens mount 301 are provided with the first lens claw portion (a lens-side bayonet claw portion) 301d, the second lens claw portion 301e, and the third lens claw portion 301f as a plurality of second engagement portions having widths in the radial direction and the circumferential direction of the opening included in the lens mount 301. The lens mount 301 is further provided with a circumferential-direction positioning pin 301y that prevents the interchangeable lens assembly 100 from rotating excessively from the desired position when the interchangeable lens assembly 100 is mounted on the camera body 10. By having the positioning pin 301y come in contact with the fourth end 201b2, the interchangeable lens assembly 100 is stopped from rotating past the desired position described above.

Referring to FIG. 7, a space between the third lens claw portion 301f and the first lens claw portion 301d is referred to as a first lens notch portion 301a, and a space between the first lens claw portion 301d and the second lens claw portion 301e is referred to as a second lens notch portion 301b. A space between the second lens claw portion 301e and the third lens claw portion 301f is referred to as a third lens notch portion 301c.

Both ends of the first lens claw portion 301d are referred to as a first end 301d1 and a second end 301d2, and both ends of the second lens claw portion 301e are referred to as a third end 301e1 and a fourth end 301e2. Furthermore, both ends of the third lens claw portion 301f are referred to as a fifth end 301f1 and a sixth end 301f2.

As illustrated in FIG. 7, an angle of the first lens claw portion 301d in the circumferential direction is 53°, an angle of the second lens claw portion 301e in the circumferential direction is 62°, and an angle of the third lens claw portion 301f in the circumferential direction is 53°. The angle of the first lens claw portion 301e in the circumferential direction herein is an angle formed between a line connecting a center of the lens mount 301 and the first end 301d1, and a line that connects the center of the lens mount 301 and the second end 301d2. The angles of the second lens claw portion 301e and the third lens claw portion 301f in the circumferential direction can also be defined in a similar manner to the definition of the angle of the first lens claw portion 301d in the circumferential direction.

Assuming that an angle formed by a line connecting the center of the lens mount 301 and the fifth end 301f1, and a line connecting the center of the lens mount 301 and the first end 301d1 is an angle of the first lens notch portion 301a in the circumferential direction, the formed angle is 52° in the present exemplary embodiment. Similarly, an angle of the second lens notch portion 301b in the circumferential direction is 44°, and an angle of the third lens notch portion 301c in the circumferential direction is 96°.

A line segment connecting the center of the lens mount 301 and a center of the lock pin groove 301z is referred to as a reference line. An angle in which the first lens claw portion 301d is disposed is assumed to be in the range of an angle formed between the line connecting the center of the lens mount 301 and the first end 301d1 and the reference line, and an angle formed between a line connecting the center of the lens mount 301 and the second end 301d2 and the reference line. In this case, the angle in which the first lens claw portion 301d is disposed is in the range of 159° to 212°. Similarly, an angle in which the second lens claw portion 301e is disposed is in the range of 256° to 318°, and an angle in which the third lens claw portion 301f is disposed is in the range of 54° to 107°.

In the normal position state, a center line that passes the center of the lens mount 301 and that is orthogonal to a center line 3006 that passes the center of the lock pin groove 301z and the center of the lens mount 301 is referred to as a center line 3005. In this case, the center line 3005 passes at least a portion of the second lens claw portion 301e and at least a portion of the third lens claw portion 301f. Thus, deformation of the lens claw portions due to the above-described space Δ1 illustrated in FIG. 5B and the interchangeable lens assembly 100 attempting to tilt in the vertical direction can be reduced. The center line 3005 is a vertical line that passes through a center axis of the lens mount 301 and that is orthogonal to the center axis of the lens mount 301 when the camera body 10 to which the interchangeable lens assembly 100 is attached is placed on a horizontal plane.

The first lens claw portion 301d is disposed such that the center line 3006 passes at least a portion of the first lens claw portion 301d. Thus, deformation of the lens claw portions due to the above-described space Δ2 illustrated in FIG. 6B and the interchangeable lens assembly 100 attempting to tilt in the vertical direction can be reduced.

(Dispositional Relationship between Camera Mount 201 and Camera-Side Terminals)

Figure 8A:
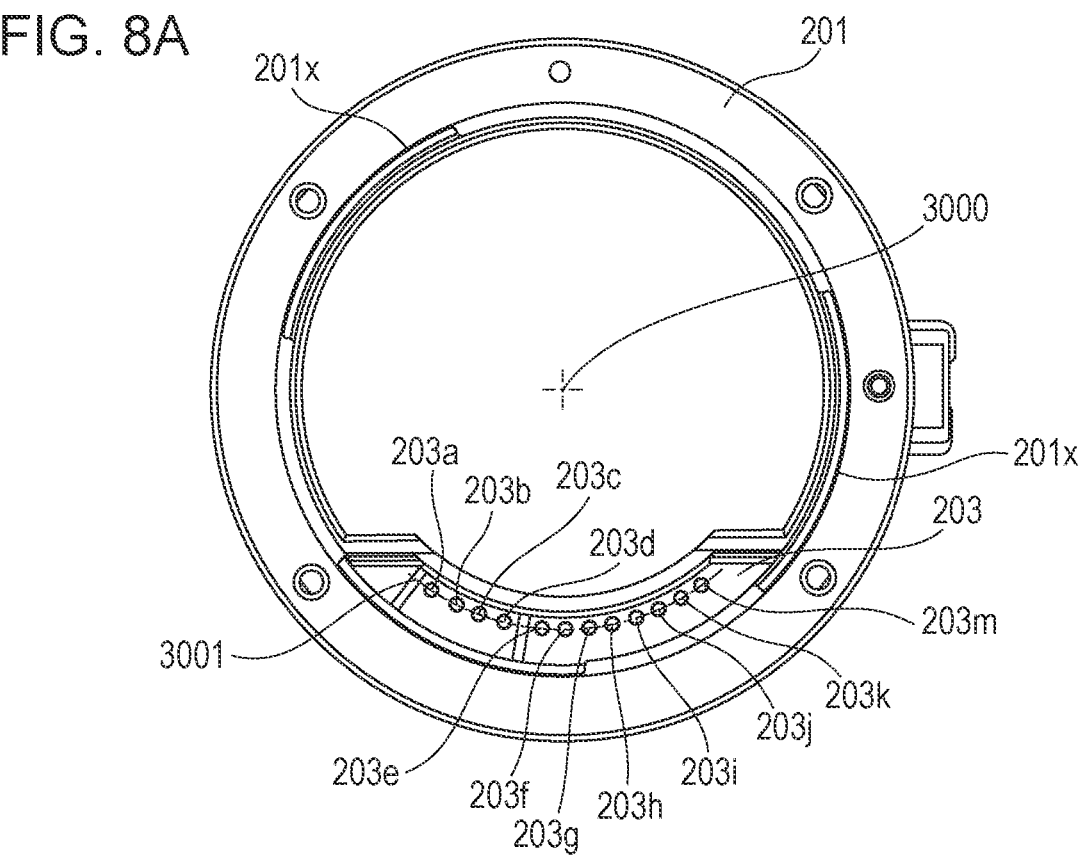
FIG. 8A is a detailed diagram illustrating a dispositional relationship of a camera contact pin according to the present exemplary embodiment.
Figure 8B:
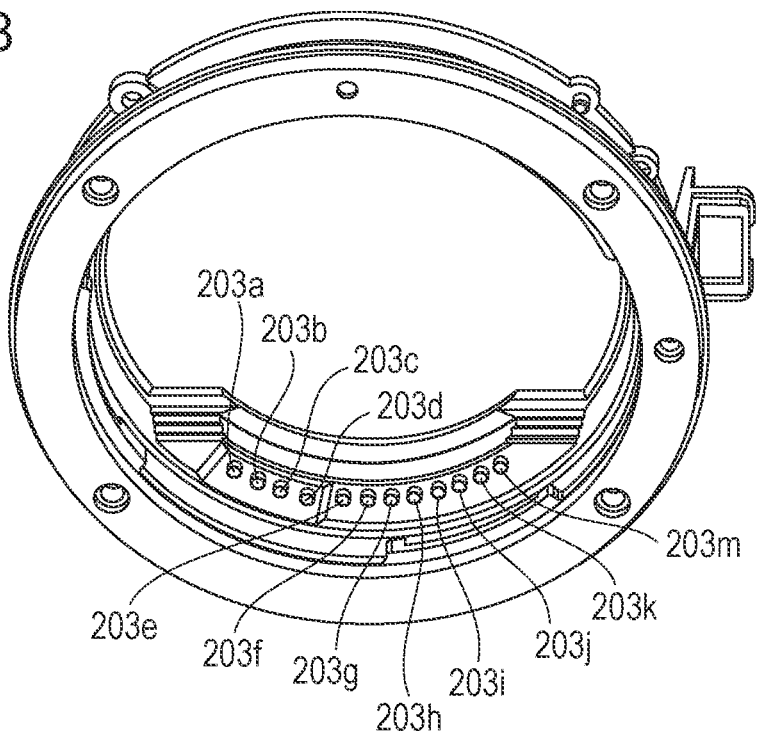
FIG. 8B is a detailed diagram illustrating the dispositional relationship of the camera contact pin according to the present exemplary embodiment.

Referring next to FIGS. 8A and 8B, the dispositional relationship between the camera mount 201 and camera-side terminals described above will be described.

FIG. 8A is a diagram of the dispositional relationship between the camera mount 201, the plurality of terminal pins 203a to 203k, and 203m that is the plurality of camera-side terminals (first terminals), and the holding member 203 viewed from the subject side (a front side of the camera body 10). FIG. 8B is a diagram of the camera mount 201, the terminal pins 203a to 203k, and 203m, and the holding member 203 viewed from obliquely above and from the subject side (the front side of the camera body 10).

As illustrated in FIG. 8A, in the holding member 203, the terminal pins 203a to 203k, and 203m are arranged on a camera terminal pin arrangement line 3001. The terminal pins 203a to 203k, and 203m are each a movable terminal that can be advanced and retreated in a direction parallel to the optical axis 3000, and are biased towards the interchangeable lens assembly 100 side with not-illustrated springs.

The relationship between the terminals illustrated in FIG. 1B described above and the terminal pins is as follows. In other words, the terminal pin 203a is the camera-side VDD terminal, the terminal pin 203b is the camera-side VBAT terminal, the terminal pin 203c is the camera-side TYPE terminal, the terminal pin 203d is the camera-side PGND terminal, and the terminal pin 203e is the camera-side MIF terminal. Furthermore, the terminal pin 203f is the camera-side DCL terminal, the terminal pin 203g is the camera-side DLC terminal, the terminal pin 203h is the camera-side LCLK terminal, the terminal pin 203i is the camera-side DLC2 terminal, and the terminal pin 203j is the camera-side DCA terminal. The terminal pin 203k is the camera-side CS terminal, and the terminal pin 203m is the camera-side DGND terminal.

As illustrated in FIG. 8B, heights of the terminal pins 203a, 203b, 203c, and 203d in an optical axis 3000 direction are higher than heights of the terminal pins 203e, 203f, 203g, 203h, 203i, 203j, 203k, and 203m in the optical axis 3000 direction. This is because the holding member 203 includes two surfaces, which have different heights in the optical axis 3000 direction, in which the terminal pins 203a, 203b, 203c, and 203d are provided in the higher surface and the rest of the terminal pins are provided in the lower surface.

In other words, all of the terminal pins of the present exemplary embodiment are not provided in surfaces at the same height. By having such a configuration, the present exemplary embodiment is capable of suppressing abrasion of the terminals caused by the camera-side terminals sliding against the lens-side terminals when the interchangeable lens assembly 100 is mounted on the camera body 10. More specifically, when the interchangeable lens assembly 100 is rotated from the locking position to the unlocking position to mount the interchangeable lens assembly 100 on the camera body 10, there is a period in which the terminal pins 203e to 203k, and 203m are not in contact with the lens-side terminals. The abrasion of the terminals described above can thereby be suppressed.

(Relationship between Lens Mount 301 and Lens-Side Terminals)

Referring next to FIGS. 9A and 9B, the dispositional relationship between the lens mount 301 and lens-side terminals described above will be described. FIG. 9A is a diagram of the dispositional relationship between the lens mount 301 in which the interchangeable lens assembly 100 is in the lock phase state, the terminal surfaces 303a to 303k, and 303m that are the plurality of lens-side terminals (second terminals), and the holding member 303 viewed from the photographer side. FIG. 9B is a diagram of the lens mount 301, the terminal surfaces 303a to 303k, and 303m, and the holding member 303 viewed from obliquely above from the photographer side in a case in which the interchangeable lens assembly 100 is in the lock phase state and in which the interchangeable lens assembly 100 is mounted on the camera body 10.

As illustrated in FIG. 9A, in the holding member 303, the terminal surfaces 303a to 303k, and 303m are arranged on a lens contact point arrangement line 3004. The relationship between the terminals illustrated in FIG. 1B described above and the terminal surfaces is as follows. Specifically, the terminal surface 303a is the lens-side VDD terminal, the terminal surface 303b is the lens-side VBAT terminal, the terminal surface 303c is the lens-side TYPE terminal, the terminal surface 303d is the lens-side PGND terminal, and the terminal surface 303e is the lens-side MIF terminal.

Furthermore, the terminal surface 303f is the lens-side DCL terminal, the terminal surface 303g is the lens-side DLC terminal, the terminal surface 303h is the lens-side LCLK terminal, the terminal surface 303i is the lens-side DLC2 terminal, and the terminal surface 303j is the lens-side DCA terminal. Furthermore, the terminal surface 303k is the lens-side CS terminal, and the terminal surface 303m is the lens-side DGND terminal.

As illustrated in FIG. 9B, heights of the terminal surfaces 303a, 303b, 303c, and 303d in the optical axis 3000 direction are lower than heights of the terminal surfaces 303e, 303f, 303g, 303h, 303i, 303j, 303k, and 303m in the optical axis 3000 direction. The above is because the holding member 303 includes two surfaces that have different heights in the optical axis 3000 direction in which the terminal surfaces 303a, 303b, 303c, and 303d are provided on the lower surface and the rest of the terminal surfaces are provided on the higher surface. By having the above configuration of the lens-side terminals with respect to the configuration of the camera-side terminals described above, the abrasion of the terminals described above can be suppressed.

Guiding inclined faces 303n and 303p push the terminal pins towards the image sensor 11 side when the interchangeable lens assembly 100 is rotated for mounting the interchangeable lens assembly 100 on the camera body 10. By providing the guiding inclined faces, the contact pressure against the lens mount 301 of the terminal pins provided on the camera body 10 side changes in a gentle and stepwise manner; deformation of the terminal pins provided on the camera body 10 side can be reduced, accordingly.

(Operation of Attaching Interchangeable Lens Assembly 100 on Camera Body 10)

Figure 10A:
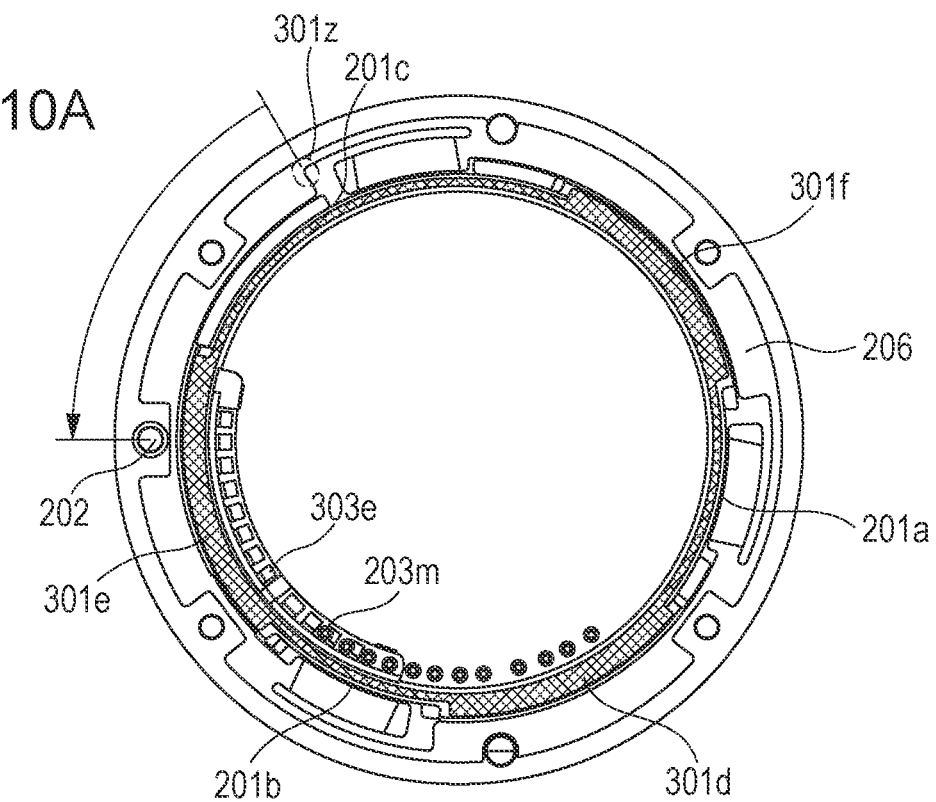
FIG. 10A is a diagram illustrating an insertion phase state when an interchangeable lens assembly is attached to a camera according to the present exemplary embodiment viewed from a camera photographer side.
Figure 10B:
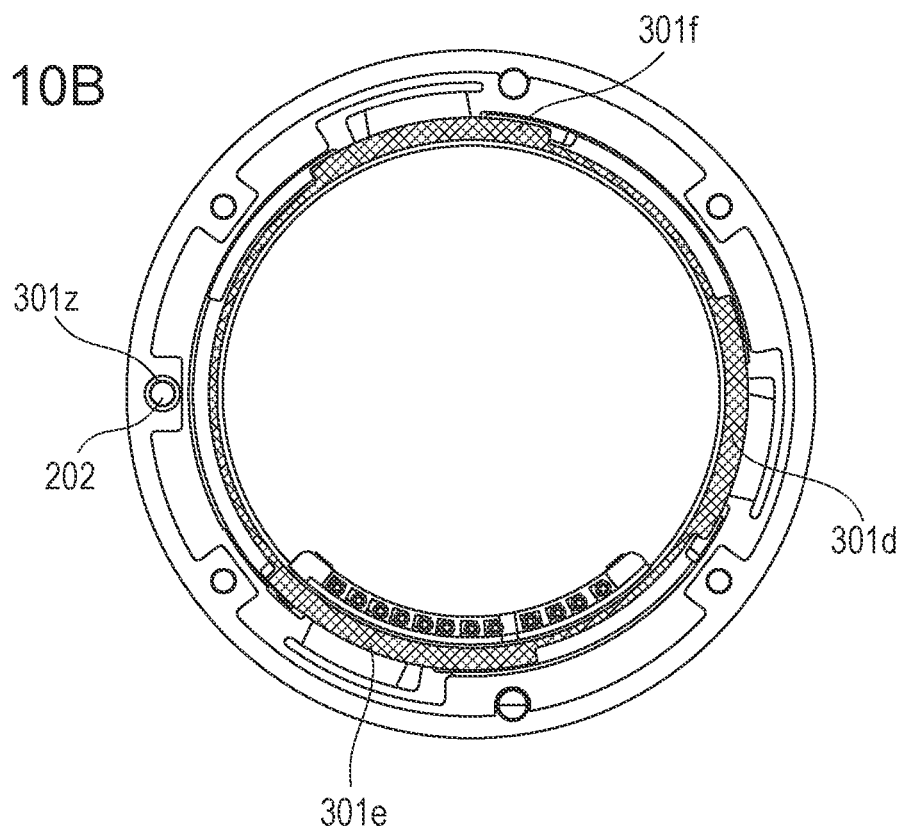
FIG. 10B is a diagram illustrating a lock phase state when the interchangeable lens assembly is attached to the camera according to the present exemplary embodiment viewed from the camera photographer side.

Referring next to FIGS. 10A and 10B, an operation of fitting the interchangeable lens assembly 100 on the camera body 10 will be described.

The operation of mounting a camera accessory, such as the interchangeable lens assembly 100, on the camera body 10 can be broadly separated into a first operation and a second operation described next.

Figure 4C:
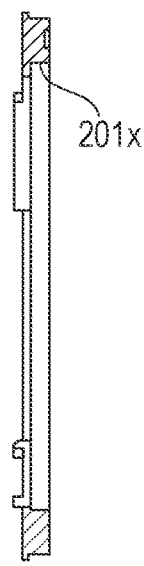
FIG. 4C is a detailed diagram of the camera mount according to the present exemplary embodiment.

The first operation is an operation in which the interchangeable lens assembly 100 is inserted into the camera body 10 by setting the positions of the camera body 10 and the interchangeable lens assembly 100 to predetermined positions in the rotation direction so as to allow the lens claw portions enter the camera notch portions. The first operation is also an operation in which a lens-side diameter fitting portion 301x illustrated in FIG. 7B and a camera-side diameter fitting portion 201x illustrated in FIG. 4C are diametrically fitted to each other. The second operation is an operation in which, while the lens-side diameter fitting portion 301x and the camera-side diameter fitting portion 201x are diametrically fitted to each other, the camera body 10 and the interchangeable lens assembly 100 are relatively rotated towards the locking position. The second operation is also an operation that brings the camera body 10 and the interchangeable lens assembly 100 to a bayonet coupled state.

FIG. 10A is a diagram illustrating an insertion phase state (a first state) when the camera body 10 is attached to the interchangeable lens assembly 100 of the present exemplary embodiment viewed from the camera mount 201 side (the photographer side). The insertion phase state refers to a state in which the first lens claw portion 301d is inserted in the first camera notch portion 201d, the second lens claw portion 301e is inserted in the second camera notch portion 201e, and the third lens claw portion 301f is inserted in the third camera notch portion 201f. In this state, the lens-side diameter fitting portion 301x and the camera-side diameter fitting portion 201x are diametrically fitted to each other.

FIG. 10B is a diagram illustrating a lock phase state (a second state) when the camera body 10 is attached to the interchangeable lens assembly 100 of the present exemplary embodiment viewed from the camera mount 201 side (the photographer side). The lock phase state is a state in which the interchangeable lens assembly 100 is, from the insertion phase state illustrated in FIG. 10A described above, rotated 60° in the clockwise direction when viewed from the subject side of the interchangeable lens assembly 100 to engage the lens claw portions and the camera claw portions to each other.

More specifically, in the lock phase state, the first lens claw portion 301d is positioned on the image sensor 11 side of the first camera claw portion 201a, and the second lens claw portion 301e is positioned on the image sensor 11 side of the second camera claw portion 201b. The third lens claw portion 301f is positioned on the image sensor 11 side of the third camera claw portion 201c. The lens claw portions and the camera claw portions are engaged with each other in the above state, and the lock pin 202 is inserted in the lock pin groove 301z; rotation of the interchangeable lens assembly 100 is locked, accordingly. In the lock phase state, the lens claw portions are biased towards the image sensor 11 with the lens mount biasing member 206. In place of the lens mount biasing member 206, a flat spring portion may be provided in each camera claw portion.

When the interchangeable lens assembly 100 is transitioned from the insertion phase state to the lock phase state, the terminal pins on the camera body 10 side are pressed towards the image sensor 11 side with the above-described guiding inclined faces 303n and 303q.

While being continuously pressed, each of the terminal pins on the camera body 10 side come in contact with the corresponding terminal surfaces 303a to 303k, and 303m. The terminal pin 203m and the terminal surface 303e come in contact with each other first.

(Dispositional Relationship between Lens Claw Portions and Lens-Side MIF Terminals)

As illustrated in FIG. 9A, in the present exemplary embodiment, the terminal surface 303e, which is the lens-side MIF terminal, is inside an angle range C where the second lens claw portion 301e is provided. The angle range C herein is, viewed in the direction in which the optical axis 3000 extends (viewed in a central axis direction of the optical apparatus), a range between a half line extending from the optical axis 3000 (the central axis of the optical apparatus) and passing the third end 301e1, and a half line extending from the optical axis 3000 and passing the fourth end 301e2. The terminal surfaces 303e being inside angle range C, which is where the second lens claw portion 301e is provided, can be paraphrased as bellow. In other words, in a case in which, when viewed in the optical axis 3000 direction, a first line is assumed to be a half line in which the optical axis 3000 is an end thereof and is a half line that passes the third end 301e1, and a second line is assumed to be a half line in which the optical axis 3000 is and end thereof and is a half line that passes the fourth end 301e2. The terminal surface 303e is in the region surrounded by the outer periphery of the lens-side diameter fitting portion 301x, the first line, and the second line. The expression of angle ranges D and E described below can be paraphrased in a similar manner to angle range C described above.

As described above, the MIF terminal is a terminal that detects that the interchangeable lens assembly 100 has been mounted on the camera body 10. When it is detected with the MIF terminal that the interchangeable lens assembly 100 has been mounted on the camera body 10, power supply to the VDD terminal and the VBAT terminal is started, and communication between the camera body 10 and the interchangeable lens assembly 100 is started. It is therefore desirable that the terminal pin 203e the MIF terminal on the camera side and the terminal surface 303e the MIF terminal on the lens side are in contact with the counterparts in a stable manner.

In the present exemplary embodiment, the camera-side MIF terminal, which determines whether the interchangeable lens assembly 100 has been mounted on the camera body 10, can thus be in contact with the lens-side MIF terminal in a more stable manner with the configuration described above illustrated in FIG. 9A. Since the camera-side MIF terminal and the lens-side MIF terminal are in contact with each other in a stable manner, communication between the camera body 10 and the interchangeable lens assembly 100 can be stated in a stable manner. Furthermore, operation of the communication protocol between the camera body 10 and the interchangeable lens assembly 100 becomes stable and high-speed communication can be performed.

As described above, according to the present exemplary embodiment, communication between the camera body 10 and the interchangeable lens assembly 100 can be performed in a stable manner. As a result, through further increase in the communication speed, usability of the camera body 10 and the interchangeable lens assembly 100 can be improved, and new pieces of information can be exchanged between the camera body 10 and the interchangeable lens assembly 100; a new function can thereby be added to the camera system.

The terminal surface 303e, which is the above-described lens-side MIF terminal, being inside angle range C, which is where the second lens claw portion 301e is provided, can be paraphrased as bellow. In other words, as illustrated in FIG. 9A, when viewed in the central axis direction of the lens mount 301, a half line that passes the terminal surface 303e, which is the lens-side MIF terminal, and the central axis of the lens mount 301 passes the second lens claw portion 301e, which is a predetermined second bayonet claw portion.

In a case where the accessory is an interchangeable lens assembly, the central axis of the lens mount 301 may be the optical axis of the interchangeable lens assembly, or may be the central axis of the opening of the lens mount 301.

As illustrated in FIG. 9A, in the present exemplary embodiment, the plurality of lens-side terminals is provided at positions that are different from those of the plurality of lens-side bayonet claw portions. More specifically, while the plurality of lens-side bayonet claw portions is positioned outside the opening included in the lens mount 301, the plurality of lens-side terminals is positioned inside the opening.

(Dispositional Relationship between Lens Claw Portions and Lens-Side Communication Terminals)

In the present exemplary embodiment, in addition to the terminal surface 303e that is the lens-side MIF terminal, the lens-side communication terminals are also provided inside angle range C that is where the second lens claw portion 301e is provided. The lens-side communication terminals herein are the terminal surface 303f, the terminal surface 303g, the terminal surface 303h, the terminal surface 303i, the terminal surface 303j, and the terminal surface 303k. As illustrated in FIG. 9A, in the present exemplary embodiment, all of the above-described lens-side communication terminals are inside angle range C, which is where the second lens claw portion 301e is provided. With such a configuration, when the interchangeable lens assembly 100 is attached to the camera body 10, the lens-side communication terminals are positioned in the region or near the region that is stable due to the bayonet coupling between the camera claw portions and the lens claw portions. When imaging is actually carried out, communication between the interchangeable lens assembly 100 and the camera body 10 can thereby be performed in a further stable manner. In the present exemplary embodiment, all of the lens-side communication terminals are inside angle range C where the second lens claw portion 301e is provided. However, for example, it is only sufficient that half or more of the lens-side communication terminals, more preferably, 80 percent or more thereof are inside angle range C, where the second lens claw portion 301e is provided.

All of the above-described lens-side communication terminals being inside angle range C, where the second lens claw portion 301e is provided, can be paraphrased as follows. In other words, as illustrated in FIG. 9A and FIG. 9B, when viewed in the central axis direction of the lens mount 301, half lines that pass the plurality of lens-side communication terminals and the central axis of the lens mount 301 all pass the second lens claw portion 301e, which is a predetermined second bayonet claw portion. In other words, when viewed in the central axis direction of the lens mount 301, all of the plurality of half lines extending from the central axis of the lens mount 301 and passing the plurality of lens side communication terminals pass the second lens claw portion 301e, which is the predetermined second bayonet claw portion.

As illustrated in FIG. 9A and FIG. 9B, in the present exemplary embodiment, a length of the holding member 303, which is a lens-side terminal holding portion, in the circumferential direction is longer than a length of a single lens-side bayonet claw portion. All of the lens-side terminals cannot be disposed inside angle range C, accordingly. Thus, in the present exemplary embodiment, as described above, the terminal surface 303e, which is the lens-side MIF terminal that is important, and all of the lens-side communication terminals are priority disposed inside angle range C.
(Dispositional Relationship between Lens Claw Portions and Positioning Pin 303p)

Figure 11:
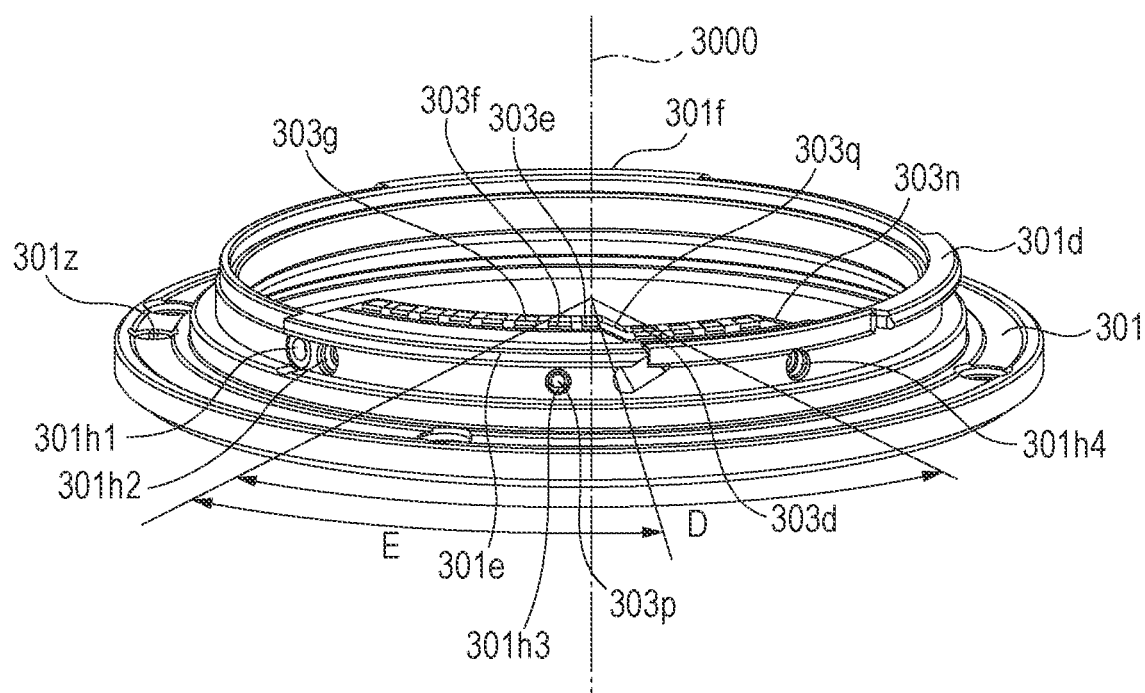
FIG. 11 is a perspective view of a lens mount and a lens-side terminal holding member.

Referring next to FIG. 11, a dispositional relationship between the lens claw portions and the positioning pin (a protrusion) 303p will be described.

The positioning pin 303p is provided in the holding member 303, and is a pin that extends outwardly in the radial direction of the opening included in the lens mount 301. By inserting the positioning pin 303p in a hole portion 301h3 provided in the lens mount, the position of the holding member 303 with respect to the lens mount 301 is determined. In a state in which the positioning pin 303p is inserted in the hole portion 301h3, the holding member 303 can be fixed to the lens mount 301 by using hole portions 301h2 and 301h4 provided in the lens mount 301 and screws (not shown). A hole portion 301h1 is a hole portion in which the positioning pin 301y described above is inserted to suppress the interchangeable lens assembly 100 from rotating past the desired position. In the present exemplary embodiment, the hole portions are through holes; however, for example, the hole portion 301h3 may be a recess with a bottom and does not have to be a through hole as long as the hole portion 301h3 engages with the positioning pin 303p.

As described above, in the present exemplary embodiment, the terminal surface 303e, which is the lens-side MIF terminal, is inside an angle range C that is where the second lens claw portion 301e is provided. In addition to the above, as illustrated in FIG. 11, in the present exemplary embodiment, the positioning pin 303p is also inside angle range C, where the second lens claw portion 301e is provided. With such a configuration, when the interchangeable lens assembly 100 is attached to the camera body 10, the positioning pin 303p is positioned in the region or near the region that is stable due to the bayonet coupling between the camera claw portions and the lens claw portions. When imaging is actually carried out, in a case in which external force, such as a vibration or an impact when dropped, is applied to the interchangeable lens assembly 100 or the camera body 10, deviation in the position of the holding member 303 can be suppressed.

The above-described positioning pin 303p as well as being inside angle range C, where the second lens claw portion 301e is provided, can also be paraphrased as follows. In other words, when viewed in the central axis direction of the lens mount 301, a half line that passes the positioning pin 303p and the central axis of the lens mount 301 passes the second lens claw portion 301e, which is a predetermined second bayonet claw portion.
(Dispositional Relationship between Terminal Surface 303e and Positioning Pin 303p)

As described above, when the interchangeable lens assembly 100 transitions from the insertion phase state to the lock phase state, the first terminal pin and the terminal surface that come into contact with each other are the terminal pin 203m and the terminal surface 303e. When the interchangeable lens assembly 100 is attached to the camera body 10, it is therefore desirable that the terminal surface 303e is stable. Accordingly, in the present exemplary embodiment, the terminal surface 303e is provided in the vicinity of the positioning pin 303p in the circumferential direction of the lens mount 301. With the above arrangement, the terminal surface 303e, which is the terminal surface that comes in contact with the terminal pin first, and the terminal pin can be in contact with each other in a more stable manner, when the interchangeable lens assembly 100 transitions from the insertion phase state to the lock phase state.

As described above, the terminal surface 303e being provided in the vicinity of the positioning pin 303p, can also be described as follows. In other words, in an interchangeable lens assembly 100 in the normal position state (the lock pin groove 301z is on the left side), the positioning pin 303p is provided within the angle range D between a line passing a center of the terminal surface 303d and the optical axis 3000, and a line passing a center of the terminal surface 303g and the optical axis 3000. The terminal surface 303d is a terminal surface next to the terminal surface 303e in an anticlockwise direction, and the terminal surface 303g is a terminal surface that is two terminal surfaces next to the terminal surface 303e in the clockwise direction. It is also desirable that positioning pin 303p be positioned in angle range E between a line passing a center of the terminal surface 303e and the optical axis 3000, and a line passing the center of the terminal surface 303g and the optical axis 3000.

The dispositional relationship between the terminal surface 303e and the positioning pin 303p can also be described as follows. In other words, while having the terminal surface 303e that is a lens-side MIF terminal as a reference terminal, a lens-side terminal that is, when viewed from the terminal surface 303e, nearest to the terminal surface 303e in a first direction (the anticlockwise direction in FIG. 9A) among the plurality of lens-side terminals is referred to as a first adjacent terminal. In the present exemplary embodiment, the first adjacent terminal is the terminal surface 303d. Among the plurality of lens-side terminals, a lens-side terminal that is, when viewed from the terminal surface 303e, nearest to the terminal surface 303e in a second direction (the clockwise direction in FIG. 9A), which is a direction opposite to the first direction, is referred to as a second adjacent terminal. In the present exemplary embodiment, the second adjacent terminal is the terminal surface 303f. Among the plurality of lens-side terminals, a lens-side terminal that is nearest to the second adjacent terminal in the second direction is referred to as a third adjacent terminal. In the present exemplary embodiment, the third adjacent terminal is the terminal surface 303g.

In the above description, the positioning pin 303p and the hole portion 301h3 are inside angle range D ranging from the terminal surface 303d to the terminal surface 303g. More preferably, the positioning pin 303p and the hole portion 301h3 are inside angle range E ranging from the terminal surface 303e to the terminal surface 303g (FIG. 9A). The angle range D herein is, when viewed in the optical axis 3000 direction, a half line extending from the optical axis 3000 and passing the center of the terminal surface 303d, and a half line extending from the optical axis 3000 and passing the center of the terminal surface 303g. Using the optical axis 3000, the center of the terminal surface 303e, and the center of the terminal surface 303g, angle range E can be defined in a similar manner to angle range D.

The dispositional relationship above can also be described as follows. In other words, when viewed in the central axis direction of the lens mount 301, the positioning pin 303p and the hole portion 301h3 are inside a region between a half line that passes the central axis of the lens mount 301 and the first adjacent terminal, and a half line that passes the central axis of the lens mount 301 and the third adjacent terminal.

When viewed in the central axis direction of the lens mount 301, the positioning pin 303p and the hole portion 301h3 are inside a region between a half line that passes the central axis of the lens mount 301 and the reference terminal, and a half line that passes the central axis of the lens mount 301 and the third adjacent terminal.

The center of the terminal surface is, when the terminal surface is rectangular, an intersection of the two diagonal lines of the terminal surface when viewed in the optical axis direction. In a case in which the terminal surface is rectangular or is not rectangular and has a round shape, or the like, the center of the terminal surface may be, when viewed in the optical axis direction, the center of gravity of the terminal surface.

In the present exemplary embodiment, as illustrated in FIGS. 9A, 9B and 11, the terminal surface 303c that is the lens-side TYPE terminal is not inside angle range C. In other words, when viewed in the central axis direction of the lens mount 301, a half line that passes the terminal surface 303c that is the lens-side TYPE terminal that distinguishes the type of accessory mounted on the camera, and the central axis of the lens mount 301 passes the notch portion between the plurality of second bayonet claw portions.
(Modifications)

While a preferable embodiment of the present disclosure has been described above, the present disclosure is not limited to the embodiment and may be deformed and modified within the gist of the present disclosure.

For example, in the present exemplary embodiment, the configuration of the interchangeable lens assembly 100 has been described by exemplifying an interchangeable lens assembly 100 serving as the optical apparatus; however, the optical apparatus of the present disclosure is not limited to the interchangeable lens assembly 100. For example, an adapter that can be interposed between the interchangeable lens assembly 100 and the camera body 10 may serve as the optical apparatus (the accessory) of the present disclosure, and a mount of the adapter on the interchangeable lens assembly 100 side may be the mount having the same configuration as that of the interchangeable lens assembly 100. Whether in the interchangeable lens assembly 100, or in the adapter, a member to which the lens mount 301 is fixed with the fastening screws (mount fixing members) 304a to 304d is referred to as the accessory main body.

In the present exemplary embodiment, a configuration in which the holding member 303 includes the positioning pin 303p, and the lens mount 301 includes the hole portion 301h3 has been described. However, the present disclosure is not limited to such a configuration, and the holding member 303 may include a hole portion or a recess, and the lens mount 301 may include a protrusion that engages with the hole portion or the recess. In other words, between the holding member 303 and the lens mount 301, either one may include a protrusion, and the other one may include a hole portion or a recess.

The three bayonet claw portions provided in the mounts in the exemplary embodiment described above may each be divided so as to be further divided into segments. In other words, a single bayonet claw portion may be formed as a collection of a plurality of bayonet claw portions (a group of bayonet claw portions). For example, the above corresponds to a case in which a groove portion is provided in a single bayonet claw portion. In such a case, the angle range of the group of bayonet claw portions arranged in the circumferential direction of each mount is as in the exemplary embodiment described above.

In the exemplary embodiment described above, a configuration has been described in which a device that includes either one of the camera mount and the accessory mount is rotated relative to a device that includes the other one of the camera mount and the accessory mount to bayonet couple the devices to each other; however, the configuration is not limited to the above configuration. For example, a configuration that allows the camera mount and the accessory mount to be bayonet coupled to each other by having the camera mount and the accessory mount be relatively rotated against each other may be employed. Hereinafter, the detail of the above will be described specifically.

Figure 12:
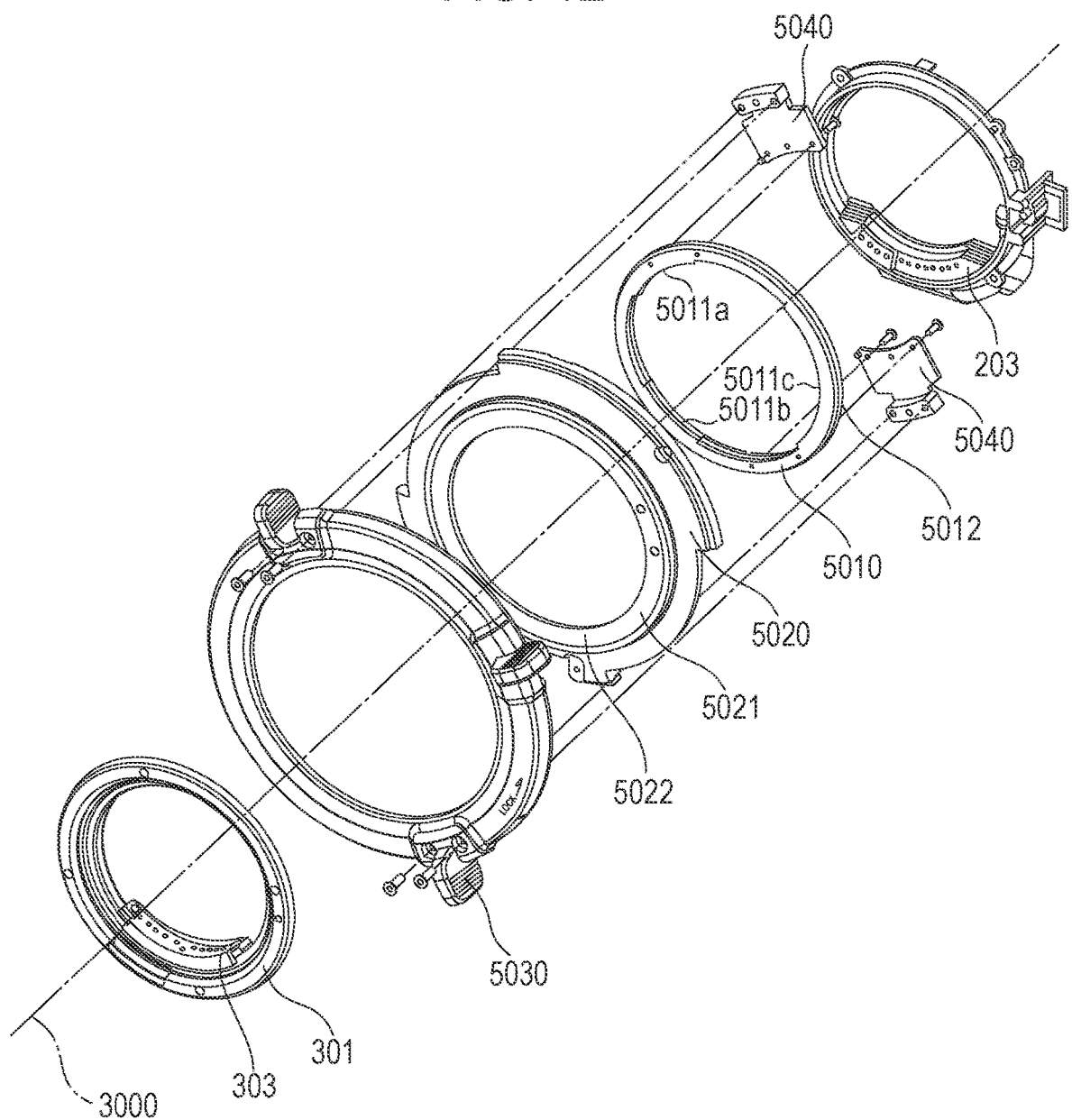
FIG. 12 is an exploded perspective view of a mount mechanism according to a modification.
Figure 13A:
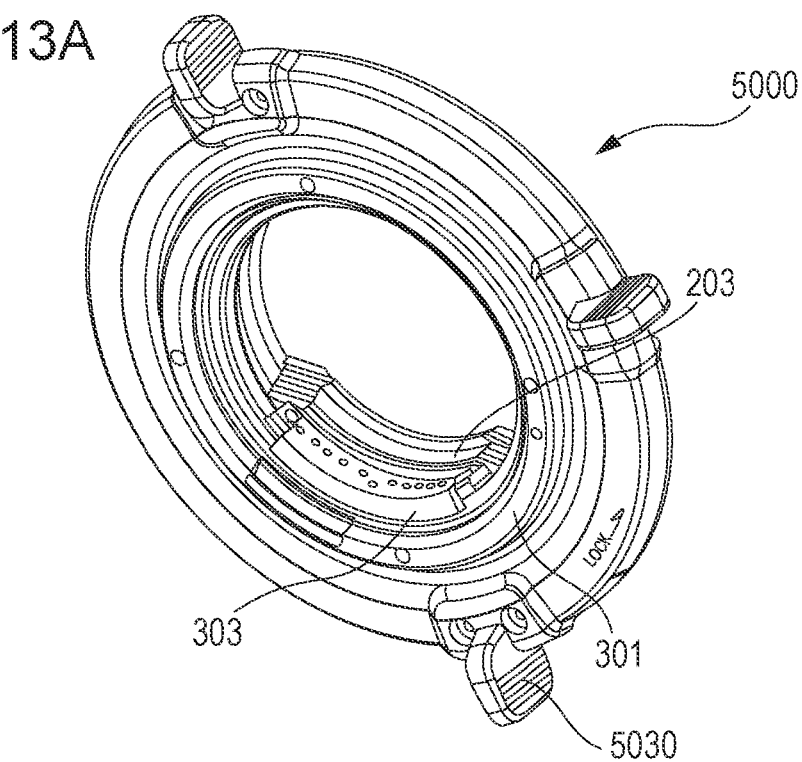
FIG. 13A is a drawing illustrating a mount mechanism according to the modification in a non-connected state.
Figure 13B:
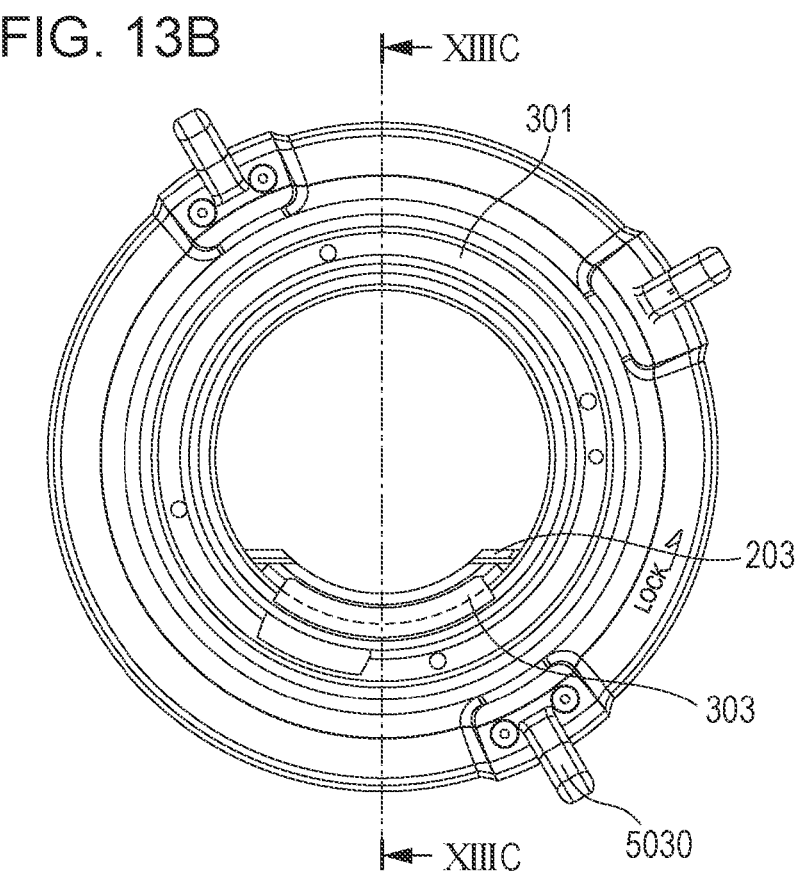
FIG. 13B is a drawing illustrating the mount mechanism according to the modification in the non-connected state.
Figure 13C:
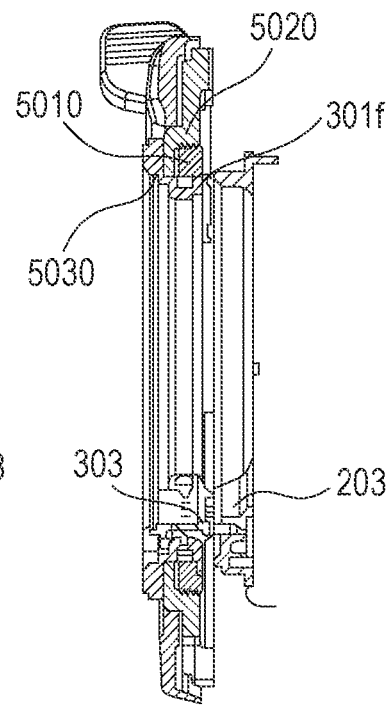
FIG. 13C is a drawing illustrating the mount mechanism according to the modification in the non-connected state.
Figure 14A:
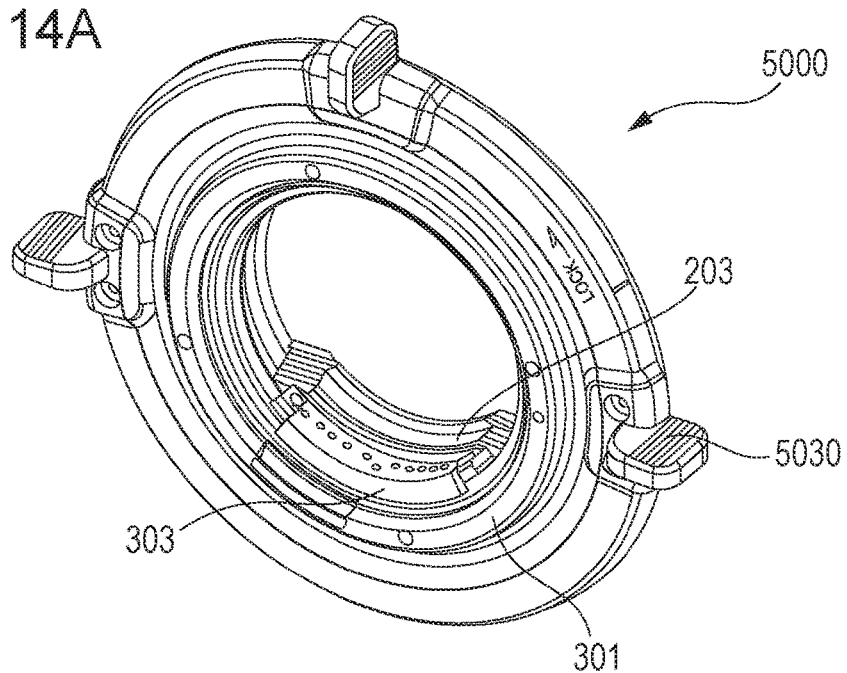
FIG. 14A is a diagram illustrating a mount mechanism according to the modification in a connected state.
Figure 14B:
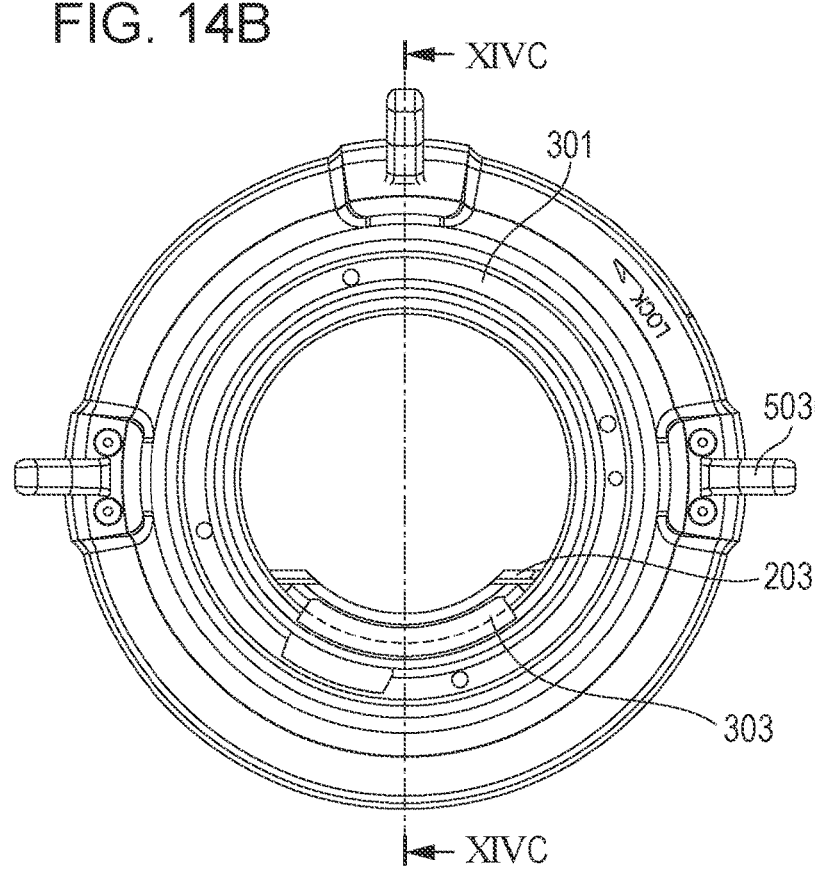
FIG. 14B is a diagram illustrating the mount mechanism according to the modification in the connected state.
Figure 14C:
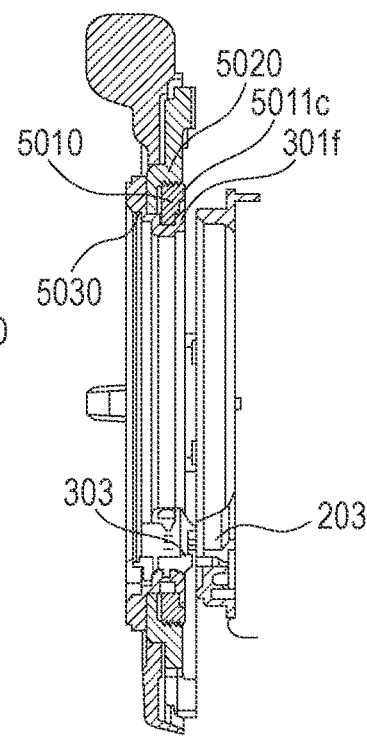
FIG. 14C is a diagram illustrating the mount mechanism according to the modification in the connected state.

FIG. 12 is an exploded perspective view of a mount mechanism 5000 according to a modification of the present disclosure. FIG. 13A, FIG. 13B and FIG. 13C illustrate diagrams that exemplify a non-connected state of the mount mechanism 5000 according to the modification of the present disclosure. FIG. 14A, FIG. 14B and FIG. 14C illustrate diagrams that exemplify a connected state of the mount mechanism 5000 according to the modification of the present disclosure. In FIGS. 12 to 14C, a movable mount portion 5010 of the mount mechanism 5000, and a lens mount 301 that is capable of being bayonet coupled to the movable mount portion 5010 of the mount mechanism 5000 are illustrated at the same time, for the sake of description. Description of members that are the same as those of the exemplary embodiment is omitted and the same reference numerals are attached to the members.

As illustrated in FIG. 12, in the mount mechanism 5000 of the present modification, an operation portion 5030, a fixed mount portion 5020, the movable mount portion 5010, a contact point holding member 203 that have an optical axis 3000 as the central axis are disposed in that order from the side on which the lens mount 301 is attached. The operation portion 5030 is a ring-shaped operation member rotatable about the central axis, and is fixed to the movable mount portion 5010 with arm portions 5040 and screws. In the present modification, the operation portion 5030 and the movable mount portion 5010 are fixed to each other at two portions using two arm portions 5040 disposed in a direction orthogonal to the central axis. With the above configuration, the movable mount portion 5010 is also rotated about the central axis in accordance with the rotating operation of the operation portion 5030 in an integrated manner.

Movable mount claw portions 5011a, 5011b, and 5011c capable of being bayonet coupled to bayonet claw portions 301a to 301c provided in the lens mount 301 are provided in the movable mount portion 5010. A screw portion 5012 threaded about the central axis is provided in the movable mount portion 5010. The state in which the screw portion 5012 and a screw portion 5022 of the fixed mount portion 5020 described below are screwed to each other changes in accordance with the rotation of the movable mount portion 5010 about the central axis.

The fixed mount portion 5020 includes a camera mount surface 5021 that abuts against a mount surface of the lens mount 301, and the screw portion 5022 that is screwed to the screw portion 5012 of the movable mount portion 5010 described above. Different from the movable mount portion 5010 described above, the fixed mount portion 5020 does not rotate about the central axis in accordance with the rotating operation of the operation portion 5030.

Referring next to FIGS. 13A to 14C, a bayonet coupling method of the mount mechanism according to the present modification will be described. While in a state in which the bayonet claw portions are inserted in an opening portion of the operation portion 5030 and an opening portion of the fixed mount portion 5020, the bayonet claw portions provided on the lens mount 301 are engageable with the movable mount claw portions 5011a to 5011c of the movable mount portion 5010. In the state illustrated in FIG. 13A, FIG. 13B and FIG. 13C, the operation portion 5030 is positioned in the unlocking position. In the above state, while a lens mount surface of the lens mount 301 and the camera mount surface 5021 of the fixed mount portion 5020 abut against each other, the claw portions of the lens mount 301 and the claw portions of the movable mount portion 5010 do not engage or overlap each other when viewed in the central axis direction. FIG. 13C is a cross-sectional diagram taken along a cross-section XIIIC-XIIIC illustrated in FIG. 13B. FIG. 14A, FIG. 14B and FIG. 14C illustrate an exemplification of the mount mechanism 5000 in a state in which the rotation operation has been performed on the operation portion 5030 from the above state.

In the state illustrated in FIG. 14A, FIG. 14B and FIG. 14C, the operation portion 5030 is positioned in the locking position. In the above state, when viewed in the central axis direction, the claw portions of the lens mount 301 and the claw portions of the movable mount portion 5010 overlap each other to engage with each other in the central axis direction. Furthermore, in the above state, in accordance with the rotating operation of the operation portion 5030, the state in which the screw portion 5022 of the fixed mount portion 5020 and the screw portion of the movable mount portion 5010 are screwed to each other changes and the movable mount portion 5010 moves in the central axis direction towards the image pickup apparatus side. FIG. 14C is a cross-sectional diagram taken along a cross-section XIVC-XIVC illustrated in FIG. 14B. As illustrated in FIGS. 13C and 14C, the movable mount portion 5010 moves away from the fixed mount portion 5020 in a center axis direction of the mount depend on a non-locking state of the mount mechanism 5000 changing in a lock state of the mount mechanism 5000. With the above configuration, the movable mount claw portions 5011a to 5011c engaged with the bayonet claw portions on the lens mount 301 side each move towards the image pickup apparatus side.

As described above, in the mount mechanism 5000 of the present modification, by having the movable mount portion including the claw portions that can be engaged with the claw portions on the lens mount side be rotated about the central axis, the movable mount portion can be moved in the central axis direction relative to the fixed mount portion. With such a configuration, in a state in which the lens mount and the camera-side mount are connected to each other, the mount mechanism 5000 of the present modification can reduce the occurrence of the gap (the space) created between the lens mount and the camera-side mount.

In the modification described above, a configuration in which the mount mechanism 5000 is provided on the image pickup apparatus side has been described; however, the present disclosure can be applied to, for example, a configuration in which the mount mechanism 5000 is provided on the camera accessory side, such as the interchangeable lens assembly side.

As described above, for example, in the present exemplary embodiment, the configuration of the interchangeable lens assembly 100 has been described by exemplifying an interchangeable lens assembly 100 serving as the optical apparatus; however, the optical apparatus of the present disclosure is not limited to the interchangeable lens assembly 100. For example, an adapter that can be interposed between the interchangeable lens assembly 100 and the camera body 10 may serve as the optical apparatus (the accessory) of the present disclosure. Hereinafter, a more detailed description of this adapter will be given.

Figure 15A:
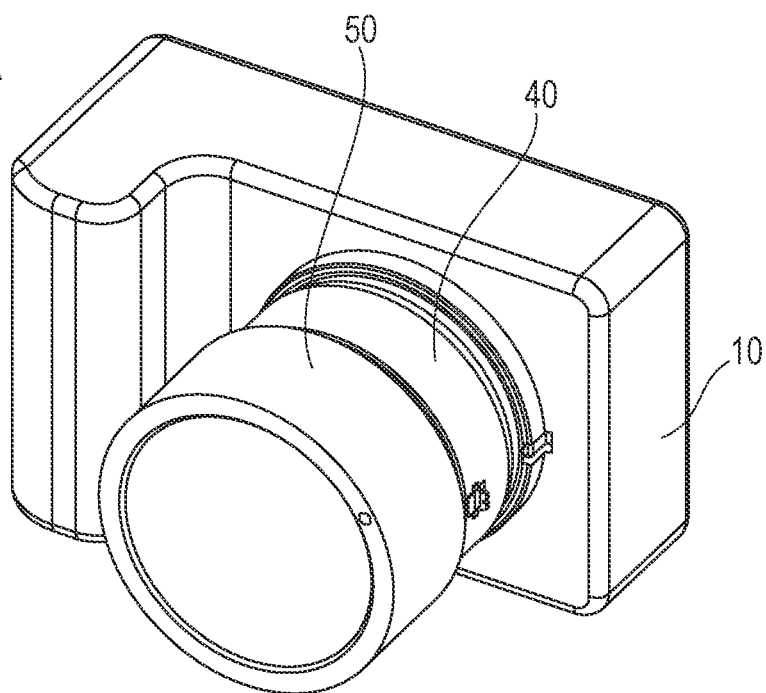
FIG. 15A is a diagram illustrating a first conversion adapter 40 mountable to a camera body 10, and a second interchangeable lens assembly 50.
Figure 15B:
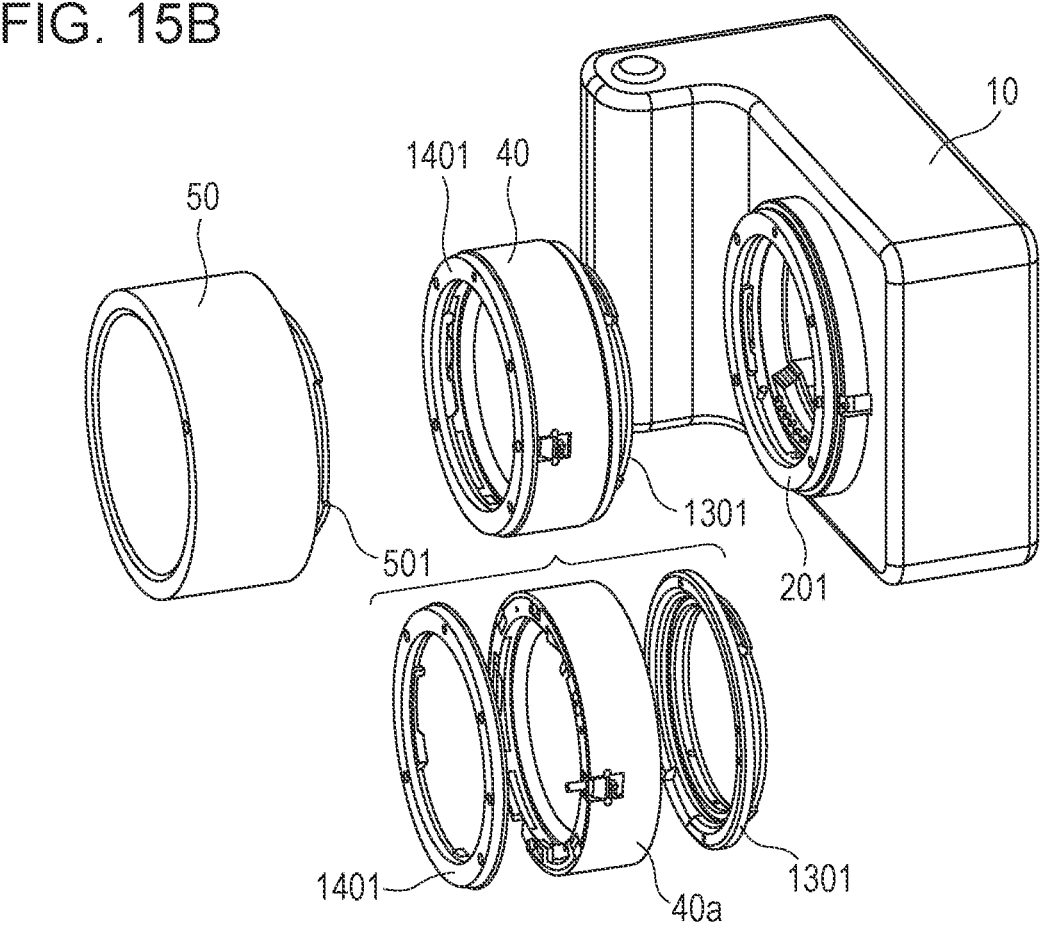
FIG. 15B is a diagram illustrating the first conversion adapter 40 mountable to the camera body 10, and the second interchangeable lens assembly 50.

Firstly, the basic configuration of a conversion adapter (adapter device) that is a camera accessory mountable to the camera mount 201 of the above-described camera body 10 will be described with reference to FIGS. 15A through 16B. FIG. 15A and FIG. 15B illustrate diagrams describing a first conversion adapter 40 mountable to the camera body 10, and a second interchangeable lens assembly 50. FIG. 15A illustrates an external perspective view of the second interchangeable lens assembly 50 having been mounted to the camera body 10 via the first conversion adapter 40. FIG. 15B illustrates an external perspective view of a state where the camera body 10, first conversion adapter 40, and second interchangeable lens assembly 50 have each been detached. The second interchangeable lens assembly (hereinafter referred to as second lens) 50 has a lens mount 501 that is short in flange focal distance, but has the same mount diameter as the camera mount 201, as to the camera body 10. That is to say, the second lens 50 has the same mount diameter as the above-described interchangeable lens assembly (hereinafter referred to as first lens) 100, but unlike the first lens 100, is a camera accessory that is not compatible with direct mounting to the camera body 10.

Figure 16A:
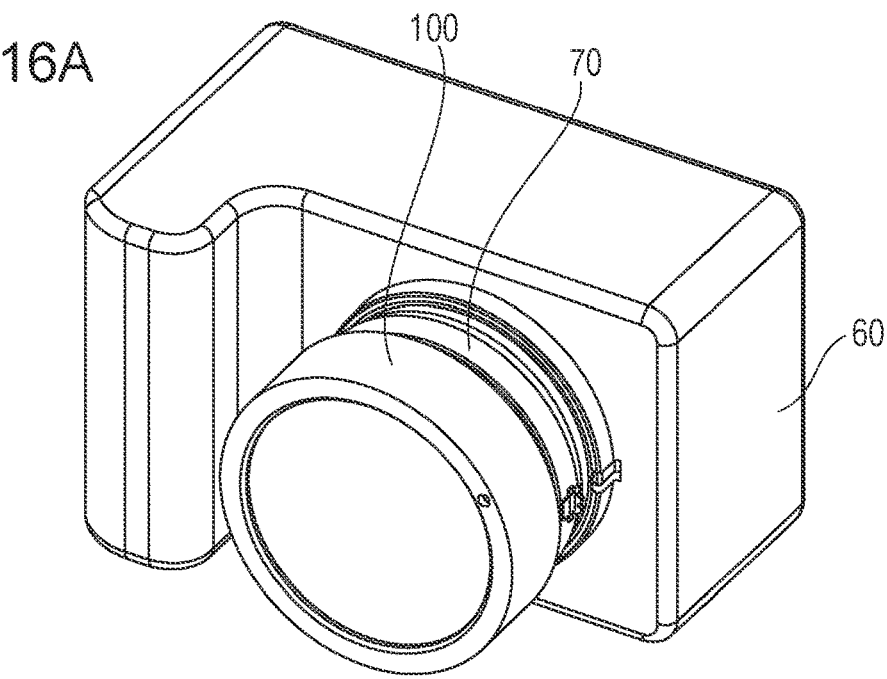
FIG. 16A is a diagram illustrating a second conversion adapter 70 mountable to a camera body 60, and a first interchangeable lens assembly 100.
Figure 16B:
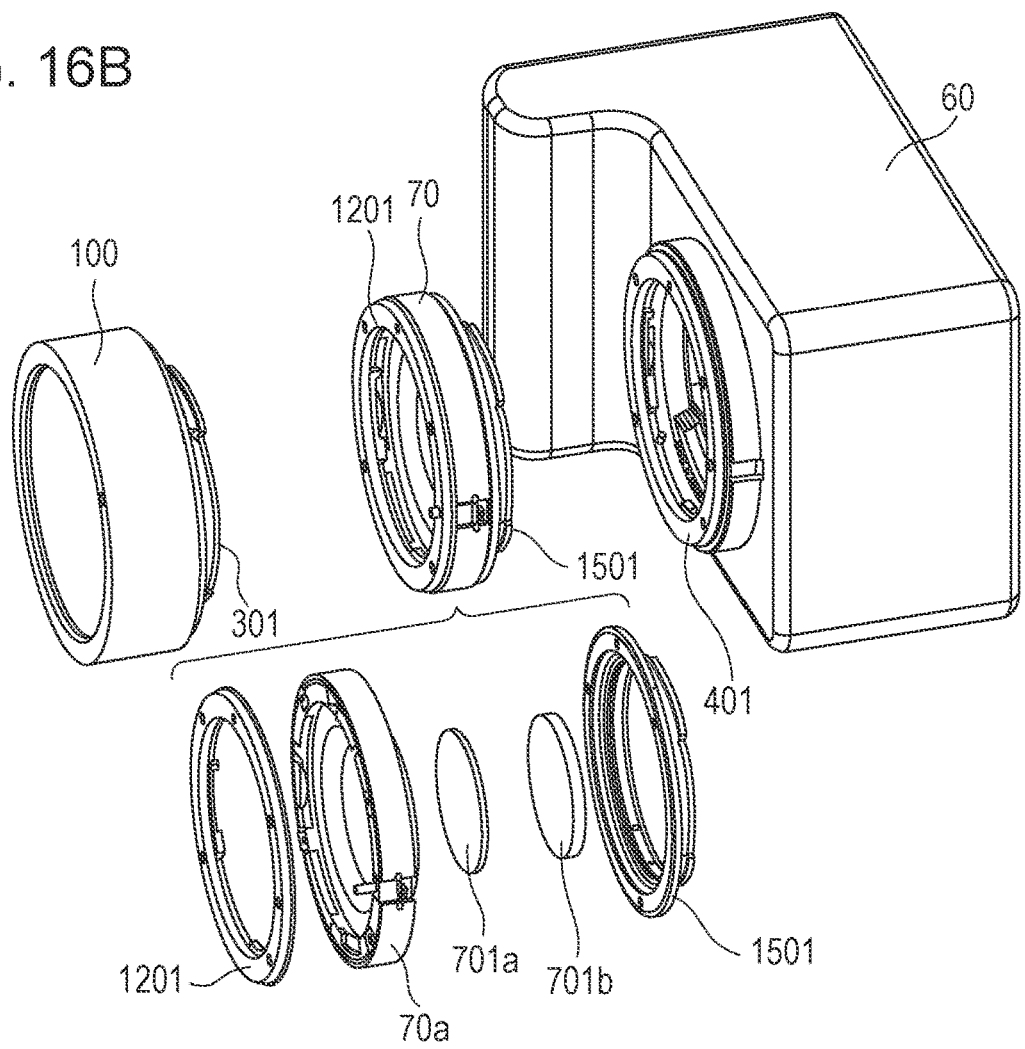
FIG. 16B is a diagram illustrating the second conversion adapter 70 mountable to the camera body 60, and the first interchangeable lens assembly 100.

FIG. 16A and FIG. 16B illustrate diagrams for describing a second conversion adapter 70 mountable to a camera body 60 and the first lens 100. FIG. 16A illustrates an external perspective view of a state where the first lens 100 is mounted to the camera body 60 via the second conversion adapter 70, and FIG. 16B illustrates an external perspective view where the camera body 60, second conversion adapter 70, and first lens 100 have each been detached.

In a case where an interchangeable lens assembly with a long flange focal distance is directly mounted to an image pickup apparatus with a short flange focal distance, trouble will occur, such as the focal point not being formed at an accurate position, and imaging a subject in this way will result in an unnatural image being obtained. For example, the above problem occurs if the second lens 50 that has a long flange focal distance is mounted to the above-described camera body 10.

In the same way, in a case where an interchangeable lens assembly with a short flange focal distance is directly mounted to an image pickup apparatus with a long flange focal distance, a trouble, such as the focal point not being formed at an accurate position, occurs and imaging a subject in this way will result in an unnatural image being obtained. For example, the above problem occurs if the first lens 100 that has a short flange focal distance is mounted to the camera body 60 serving as a second image pickup apparatus that has a longer flange focal distance than the above-described camera body 10.

In particular, since the camera body 10 and camera body 60, and the first lens 100 and second lens 50, have the same mount diameter, it is difficult for a user to judge which image pickup apparatuses and which interchangeable lens assemblies have flange focal distances that are compatible for direct mounting.

It is therefore preferable that only interchangeable lens assemblies that are compatible can be directly mounted to a certain image pickup apparatus so that image pickup apparatuses and interchangeable lens assemblies that have mutually incompatible flange focal distances are not erroneously directly mounted.

Also, in a case of mounting an incompatible interchangeable lens assembly to an image pickup apparatus, a conversion adapter needs to be interposed between the two to adjust the flange focal distance. However, in a case where one side of the conversion adapter is mounted to the image pickup apparatus and an interchangeable lens assembly compatible with direct mounting to the image pickup apparatus is mounted to the other side of the conversion adapter, the focal point may not be accurately formed, as described above. The one side and other side of the conversion adapter preferably have configurations to restrict image pickup apparatuses and camera accessories that are directly mountable, accordingly.

Specifically, in a case of mounting an interchangeable lens assembly having a long flange focal distance to an image pickup apparatus having a short flange focal distance, a conversion adapter is preferable where one end side is only mountable to this image pickup apparatus, and the other end side is only mountable to this interchangeable lens assembly. In a case of mounting an interchangeable lens assembly having a short flange focal distance to an image pickup apparatus having a long flange focal distance, a conversion adapter is preferable where one end side is only mountable to this image pickup apparatus, and the other end side is only mountable to this interchangeable lens assembly.

The first conversion adapter 40 has the lens mount 1301 attached to an adapter barrel 40a by fastening screws (not illustrated), at one end side in the optical axis direction. This lens mount 1301 is an accessory mount that is attachable to and detachable from the camera mount 201 provided to the camera body 10 described above.

A camera mount 1401 is attached to the adapter barrel 40a by fastening screws (not illustrated), at the other end side of the first conversion adapter 40 in the optical axis direction. This camera mount 1401 is a camera mount that is attachable to and detachable from the lens mount 501 of the second lens 50. The camera mount 1401 of the first conversion adapter 40 is attached such that the imaging plane of the image sensor 11 of the will be situated at a position corresponding to the flange focal distance of the second lens 50.

The second conversion adapter 70 has the lens mount 1501 attached to an adapter barrel 70a by fastening screws (not illustrated), at one end side in the optical axis direction. This lens mount 1501 is an accessory mount that is attachable to and detachable from the camera mount 401 provided to the camera body 60.

The camera mount 1201 is attached to the adapter barrel 70a by fastening screws (not illustrated), at the other end side of the second conversion adapter 70 in the optical axis direction. This camera mount 1201 is a camera mount that is attachable to and detachable from the lens mount 301 of the first lens 100, as described above.

A first optical member 701a and a second optical member 701b are provided to the second conversion adapter 70, between the adapter barrel 70a and the lens mount 1501 in the optical axis direction. The first optical member 701a and second optical member 701b enable the second conversion adapter 70 to extend length of the flange focal distance of the first lens 100 in accordance with the imaging plane of the imaging sensor disposed in the camera body 60. While the optical members have been illustrated as two lenses for the sake of convenience, this is not restrictive.

Figure 17A:
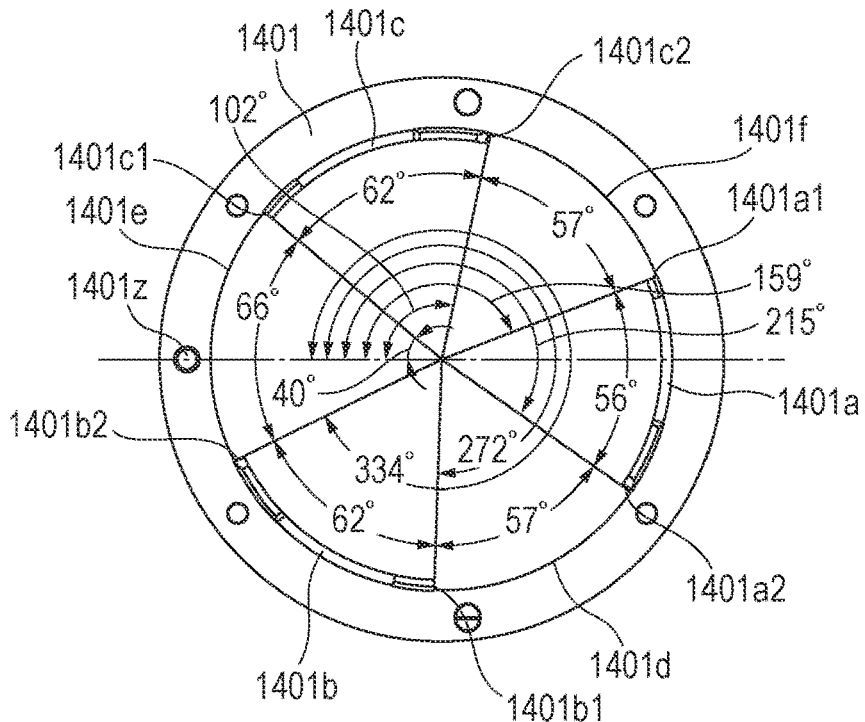
FIG. 17A is a diagram exemplarily illustrating disposition angles of bayonet claw portions in a camera mount 1401 provided on one end of a first conversion adapter 40.
Figure 17B:
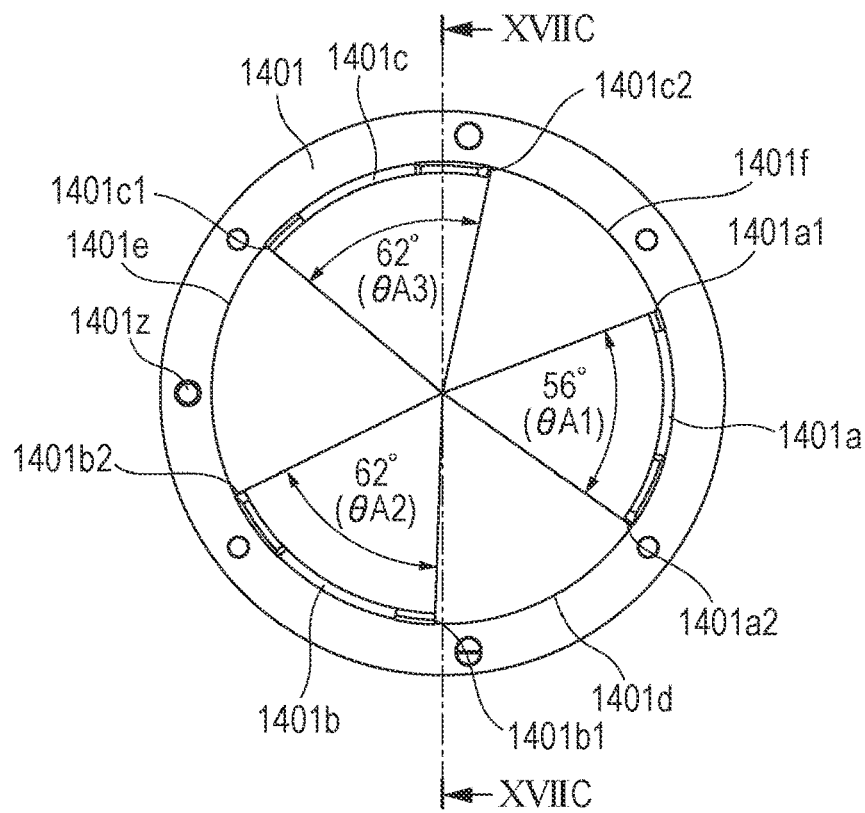
FIG. 17B is a diagram exemplarily illustrating disposition angles of the bayonet claw portions in the camera mount 1401 provided on the one end of the first conversion adapter 40.
Figure 17C:
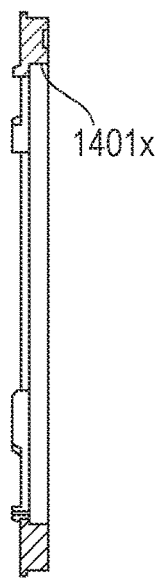
FIG. 17C is a diagram exemplarily illustrating disposition angles of the bayonet claw portions in the camera mount 1401 provided on the one end of the first conversion adapter 40.

Next, the angles (phases) at which bayonet claw portions are disposed on the circumferential direction of the camera mount and lens mount of the first conversion adapter 40 will be described with reference to FIG. 17A through FIG. 21D. FIG. 17A, FIG. 17B and FIG. 17C illustrate diagrams for exemplarily describing displacement angles of bayonet claw portions in the camera mount 1401 provided on one end of the first conversion adapter 40. FIG. 17A is a diagram illustrating angle ranges that camera claw portions and camera notch portions occupy in the circumferential direction of the camera mount 1401 with the lock pin 1401z as a reference, as viewed from the rear face side (camera body 10 side). FIG. 17B is a diagram illustrating angle ranges that multiple camera claw portions 1401a through 1401c occupy in the circumferential direction of the camera mount 1401, as viewed from the rear face side (camera body 10 side). FIG. 17C is a cross-sectional diagram taken along a cross-section XVIIB-XVIIB illustrated in FIG. 17B.

The first conversion adapter 40 is a mount adapter used for mounting the second lens 50 that has a long flange focal distance to the camera body 10 that has a short flange focal distance. Thus, it is preferable for the first conversion adapter 40 to be configured such that the camera body 60 that has a long flange focal distance cannot be directly mounted to the lens mount 1301, and the first lens 100 that has a short flange focal distance cannot be directly mounted to the camera mount 1401. According to this configuration, the positional relation of claw portions and notch portions can be satisfied so that the lens mount 1301 provided to one end (first end) side of the first conversion adapter 40 and the camera mount 1401 provided to the other end (second end) side cannot each be directly mounted.

A first camera claw portion 1401a, second camera claw portion 1401b, and third camera claw portion 1401c, are provided in order, to the camera mount 1401 in the circumferential direction (inner radial direction). When viewing the camera mount 1401 from the rear face side as illustrated in FIG. 17A, the camera claw portion that is provided at a position farthest from the lock pin 1401z is the first camera claw portion 1401a. The second camera claw portion 1401b and third camera claw portion 1401c are then consecutively provided in order from the first camera claw portion 1401a in a clockwise direction.

Notch portions that are a first camera notch portion 1401d, second camera notch portion 1401e, and third camera notch portion 1401f are provided in order, to the camera mount 1401 in the circumferential direction (inner radial direction). When viewing the camera mount 1401 from the rear face side as illustrated in FIG. 17A, the notch portion provided at a position nearest to the lock pin 1401z is the second camera notch portion 1401e. The third camera notch portion 1401f and first camera notch portion 1401d are then consecutively provided in order from the second camera notch portion 1401e in a clockwise direction.

As illustrated in FIG. 17C, a fitting member 1401x that restricts movement of the camera accessory in a direction parallel to the optical axis when the camera accessory is mounted, is provided to the camera mount 1401 side. In the present embodiment, the diameter of the fitting member 1401x in a direction orthogonal to the optical axis at the camera mount 1401 side is the mount diameter.

The way of bayonet coupling of the first conversion adapter 40 and second lens 50 is the generally the same as the way of bayonet coupling of the camera body 10 and first lens 100 described above, and thus description will be omitted.

The end portions of the camera claw portions 1401a, 1401b, and 1401c, in the circumferential direction, will be referred to as first end portion 1401a1, second end portion 1401a2, third end portion 1401b1, fourth end portion 1401b2, fifth end portion 1401c1, and end portion 1401c2, for the sake of description. The end portions are denoted with part numerals in order from the first camera claw portion 1401a in the clockwise direction, when viewing the camera mount 1401 from the rear face side, as described above.

As illustrated in FIG. 17A, the angles that the camera claw portions and camera notch portions occupy in the circumferential direction of the camera mount 1401 (angle ranges) in the first conversion adapter 40 according to the present embodiment are stipulated as follows. For the first camera claw portion 1401a, the angle θA1=56°. For the second camera claw portion 1401b, the angle θA2=62°. For the third camera claw portion 1401c, the angle θA3=62°. For the first camera notch portion 1401d, the angle is 57°. For the second camera notch portion 1401e, the angle is 66°. For the third camera notch portion 1401f, the angle is 57°. That is to say, the camera mount 1401 has different angles for the camera claw portions with respect to the above-described camera mount 201 of the camera body 10, but the angles of the camera notch portions are the same.

Also, when viewing the camera claw portions from the rear face side of the first conversion adapter 40, the angles where the camera claw portions are disposed on the circumferential direction of the camera mount 1401 with the position of the lock pin 402 (referred to as reference position) as a reference are stipulated as follows. The first camera claw portion 1401a is disposed between 159° and 215° with the reference position as a start point. The second camera claw portion 1401b is disposed between 272° and 334° with the reference position as a start point. The third camera claw portion 1401c is disposed between 40° and 102° with the reference position as a start point.

Figure 18A:
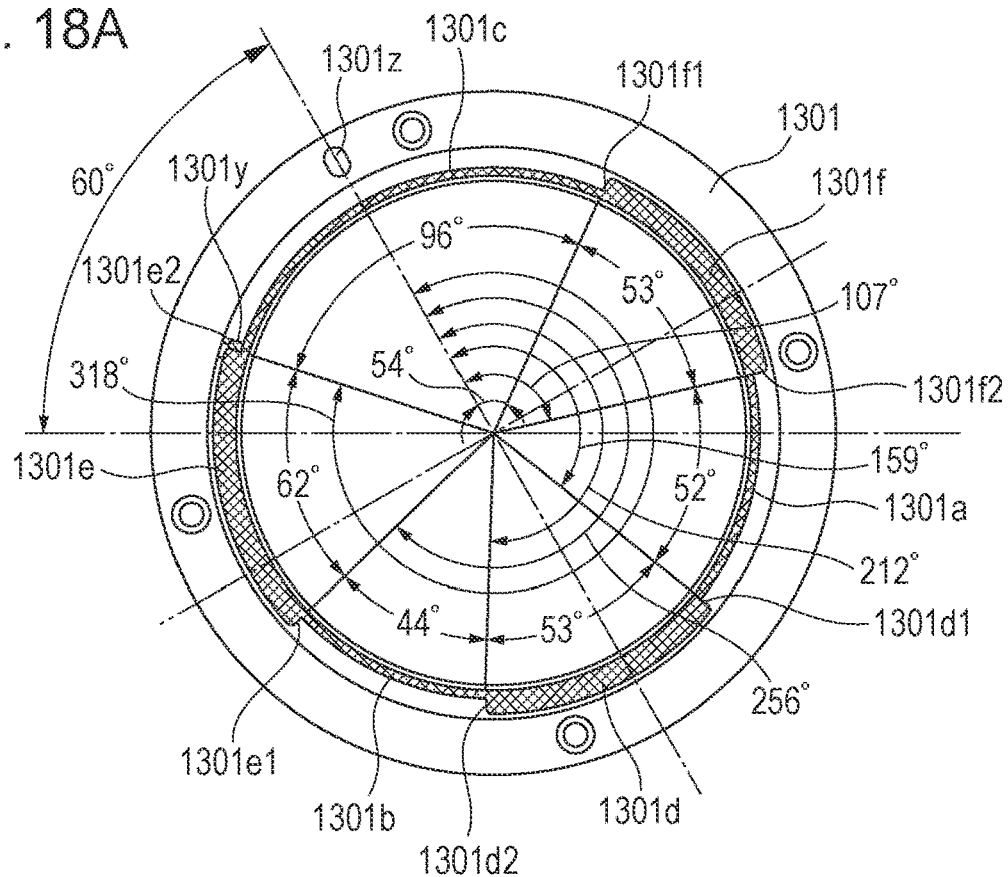
FIG. 18A is a diagram exemplarily illustrating disposition angles of bayonet claw portions in a lens mount 1301 provided on another end of a first conversion adapter 40.
Figure 18B:
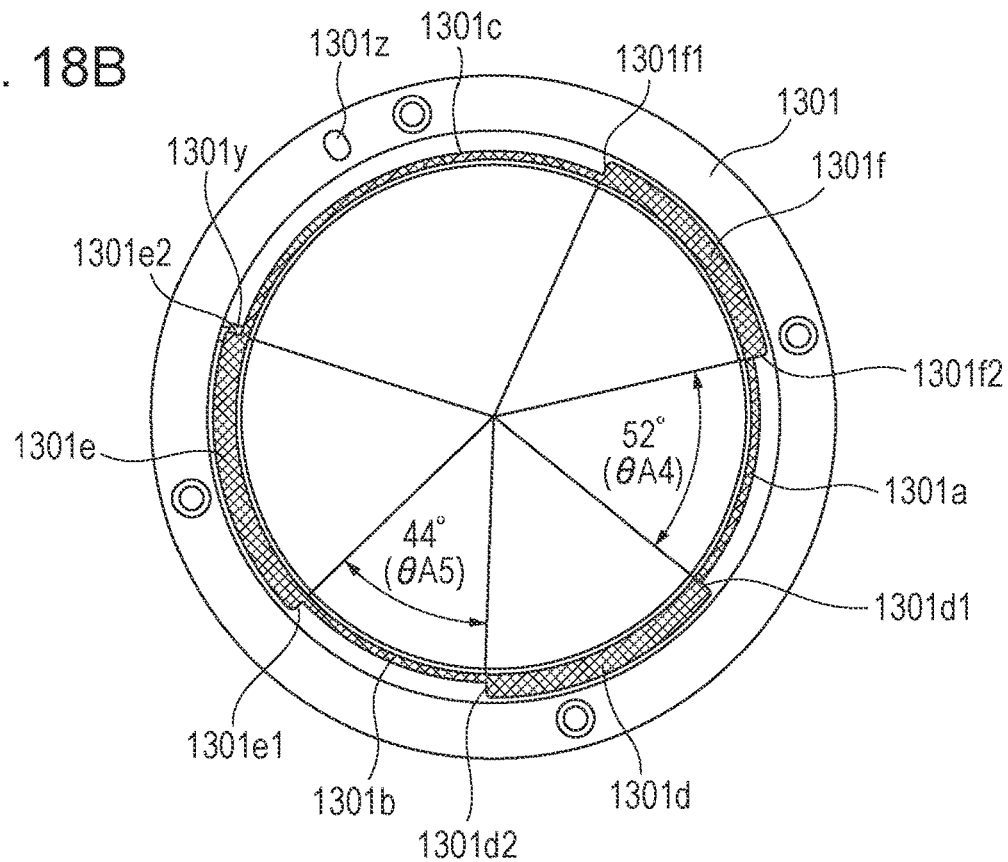
FIG. 18B is a diagram exemplarily illustrating the disposition angles of the bayonet claw portions in the lens mount 1301 provided on the other end of the first conversion adapter 40.

Next, FIG. 18A and FIG. 18B illustrate diagrams exemplarily describing angles of disposing the bayonet claw portions on the lens mount 1301 provided to the other end of the first conversion adapter 40. FIG. 18A is a diagram illustrating angle ranges that camera claw portions and camera notch portions occupy in the circumferential direction of the camera mount 1401 with the lock groove 1301z as a reference, as viewed from the rear face side. FIG. 18B is a diagram illustrating angle ranges that multiple lens notch portions 1301a through 1301c occupy in the circumferential direction of the lens mount 1301, as viewed from the rear face side.

The angles (angle ranges) that the lens notch portions occupy in the circumferential direction of the lens mount 1301 are, represented by θA4 as the angle of the first lens notch portion 1301a and θA5 as the angle of the second lens notch portion 1301b, as illustrated in FIG. 18B. The angle of disposing the claw portions and notch portions on the lens mount 1301 of the first conversion adapter 40 is the same as the lens mount 301 of the first lens 100 described above, and accordingly description will be omitted.

The angles of the claw portions and notch portions in the circumferential direction, on the lens mount 1301 and camera mount 1401 provided to the first conversion adapter 40, will be compared. For example, at the lens mount 1301 side, the angle θA5 of the second lens notch portion 1301b having the smallest angle is 44°, whereas, at the camera mount 1401 side, the angle θA1 of first camera claw portion 1401a having the smallest angle is 56°. That is to say, the claw portion having the smallest angle at the camera mount 1401 side is larger than the notch portion having the smallest angle at the lens mount 1301 side (θA5<θA1). In this case, of the notch portions on the lens mount 1301 side and the claw portions on the camera mount 1401 side, at least one or more lens notch portion and camera claw portions will interfere with each other. Thus, even if an attempt is made to mount the interchangeable lens assembly to the camera body such that the optical axis at the camera mount 1401 side and lens mount 1301 side are generally parallel, the claw portions and notch portions interfere, and thereby the interchangeable lens assembly cannot be mounted to the camera body.

Figure 19A:
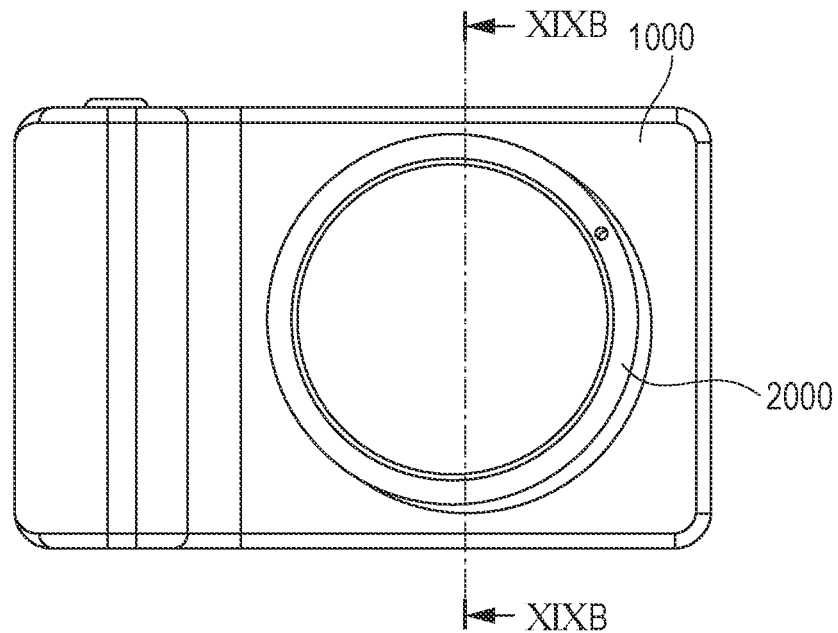
FIG. 19A is a diagram exemplarily illustrating a mounting method of a predetermined image pickup apparatus 1000 and a predetermined interchangeable lens assembly 2000 having claw portions and recesses that interfere with each other.
Figure 19B:
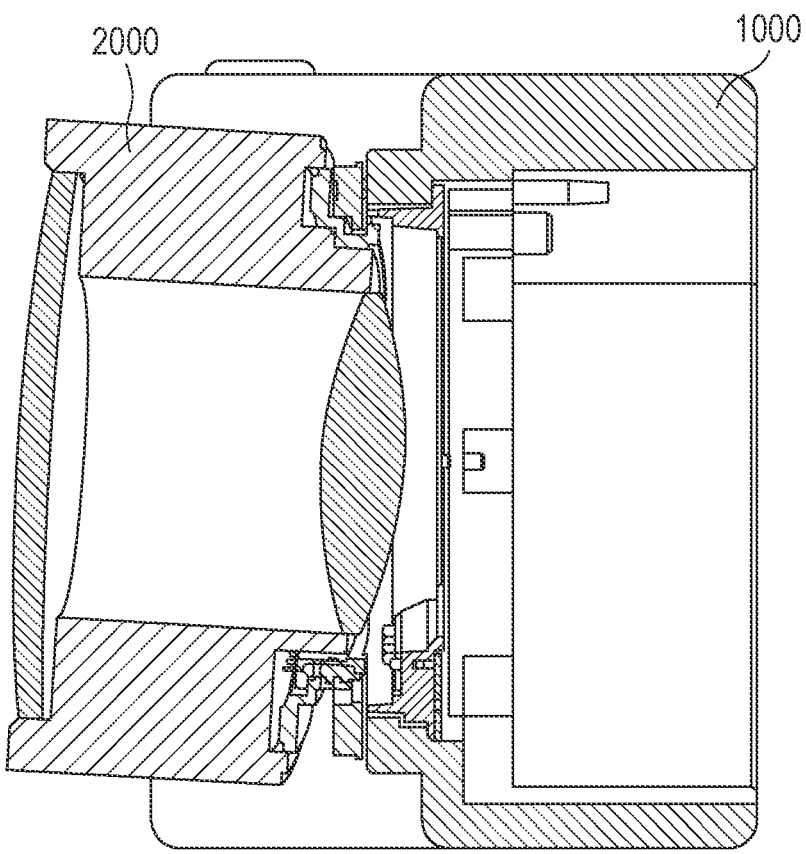
FIG. 19B is a diagram exemplarily illustrating the mounting method of the predetermined image pickup apparatus 1000 and the predetermined interchangeable lens assembly 2000 having the claw portions and recesses that interfere with each other.

However, if only one claw portion and notch portion are interfering, there may be cases where claw portions of the camera mount side can be inserted into notch portions of the lens mount side. FIG. 19A and FIG. 19B illustrate diagrams exemplarily describing a mounting method of a predetermined image pickup apparatus 1000 and a predetermined interchangeable lens assembly 2000 having claw portions and notch portions that interfere with each other. FIG. 19A is a diagram exemplarily describing a frontal view of partway through mounting a predetermined interchangeable lens assembly to a predetermined image pickup apparatus that have claw portions and notch portions that interfere with each other. FIG. 19B is a cross-sectional view taken along a cross-section XIXB-XIXB illustrated in FIG. 19A.

For example, as illustrated in FIGS. 19A and 19B, one end of a camera claw portion is inserted into a lens notch portion, and from this state, the lens mount and camera mount are rotated relatively to each other, in a state where the optical axis of the lens mount side is obliquely inclined as to the optical axis of the camera mount side. In this case, even if the camera claw portions and lens notch portions originally interfere with each other, this interference is resolved during the relative rotation of the lens mount and camera mount, and transition can be made to a state where the camera claw portion is inserted into this lens notch portion. In this case, the interchangeable lens assembly can be mounted to the camera body if there are no other camera claw portions and lens notch portions interfering.

In the present embodiment, the claw portions and notch portions on the lens mount 1301 side and camera mount 1401 side are disposed such that the angle of a predetermined lens notch portion adjacent to a reference lens claw portion is smaller than the angle of two camera claw portions adjacent to a reference camera notch portion.

Specifically, in the present embodiment, the angles θA4 and θA5 of the first lens notch portion 1301a and second lens notch portion 1301b adjacent to the first lens claw portion 1301d are smaller than the angles θA1 and θA2 of the first camera claw portion 1401a and second camera claw portion 1401b adjacent to the first camera notch portion 1401d. That is to say, θA4 (52°) is smaller than θA1 (56°), and θA5 (44°) is smaller than θA2 (62°) (θA4<θA1, θA5<θA2).

Figure 20A:
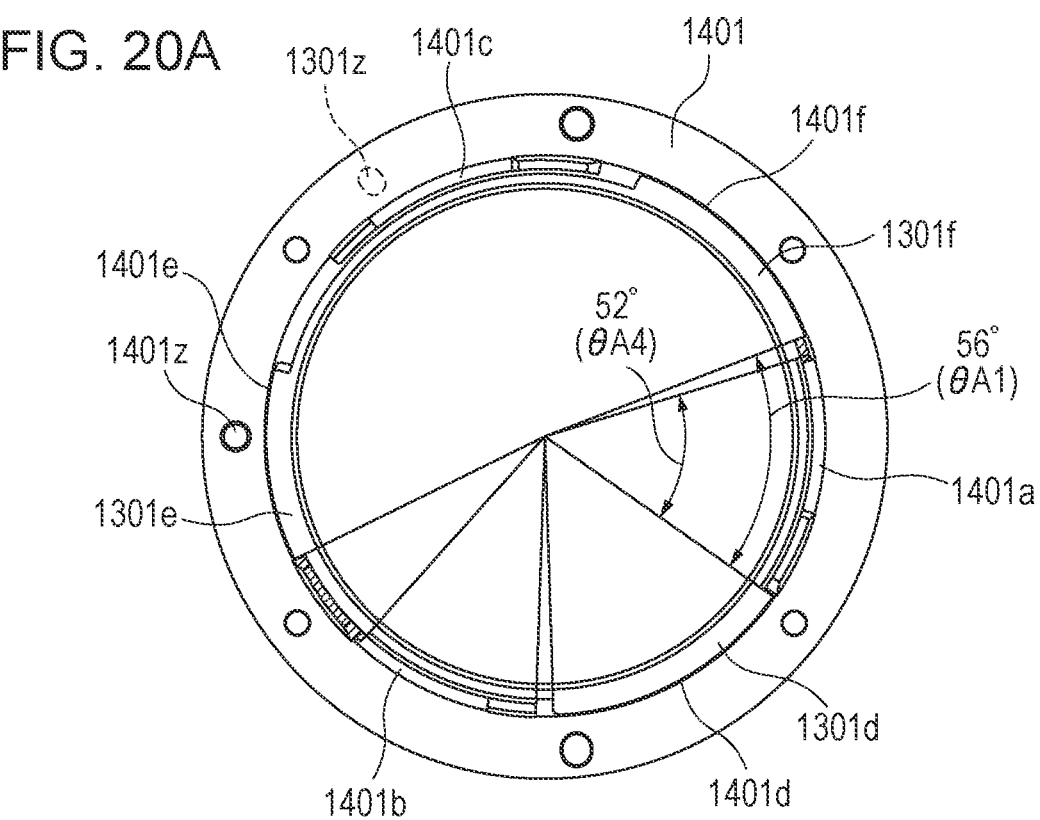
FIG. 20A is a diagram exemplarily illustrating a way in which claw portions interfere with each other when attempting to mount a lens mount 1301 side to a camera mount 1401 side according to an exemplary embodiment of the present invention.
Figure 20B:
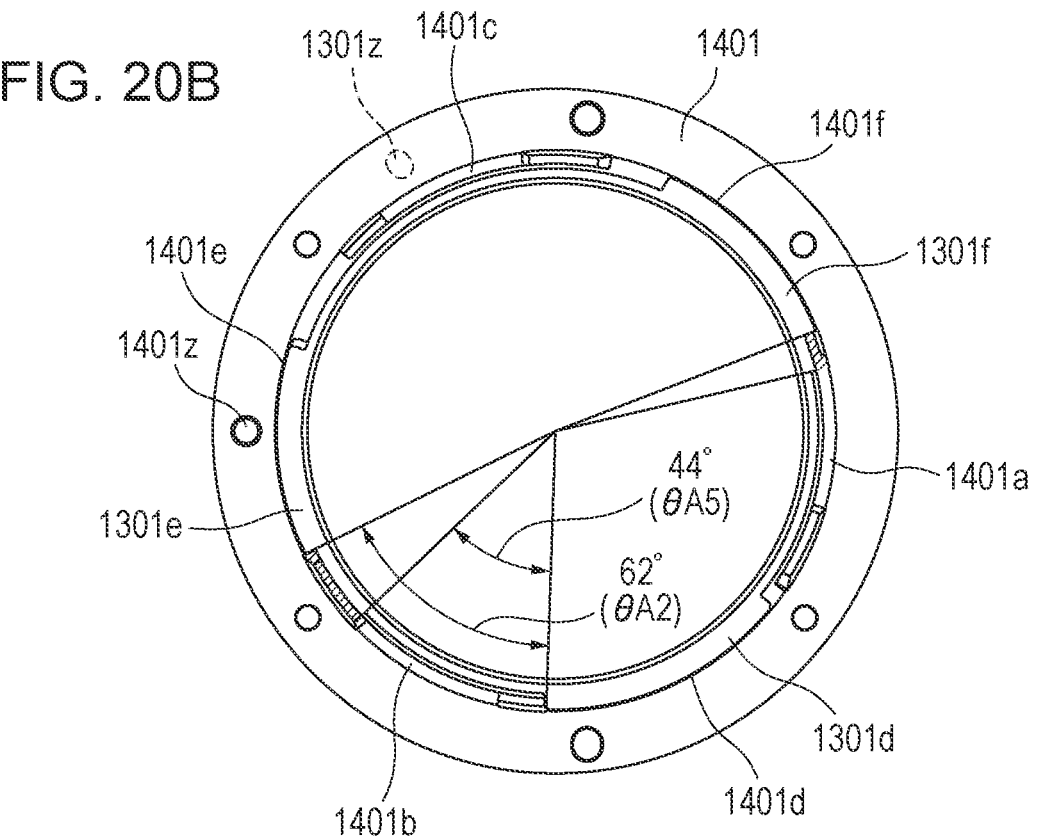
FIG. 20B is a diagram exemplarily illustrating the way in which the claw portions interfere with each other when attempting to mount the lens mount 1301 side to the camera mount 1401 side according to the exemplary embodiment of the present invention.

Accordingly, even if an attempt is made to insert the first lens claw portion 1301d into the first camera notch portion 1401d, the second lens claw portion 1301e interferes with the second camera claw portion 1401b in a sure manner, as well does the third lens claw portion 1301f with the first camera claw portion 1401a, as illustrated in FIG. 20A and FIG. 20B.

FIG. 20A and FIG. 20B illustrate diagrams exemplarily describing the way in which claw portions interfere with each other when attempting to mount the lens mount 1301 side to the camera mount 1401 side according to the embodiment of the present invention. FIG. 20A illustrates the way in which the third lens claw portion 1301f and the first camera claw portion 1401a interfere, and FIG. 20B illustrates the way in which the second lens claw portion 1301e and the second camera claw portion 1401b interfere.

As described above, incompatible interchangeable lens assemblies and image pickup apparatuses, and the mount portions of conversion adapters are configured such that two claw portions of each other out of the claw portions that an incompatible interchangeable lens assembly and image pickup apparatus have interfere with each other in the present embodiment. According to this configuration, the risk of an incompatible interchangeable lens assembly being erroneously mounted to an image pickup apparatus, or an incompatible interchangeable lens assembly and image pickup apparatus being erroneously mounted to mount units provided to both ends of a conversion adapter, can be reduced.

However, even in a case where the above conditions are satisfied, there may be cases where, when attempting to insert three claw portions into incompatible notch portions, for example, two claw portions are inserted into notch portions depending on the angles of the claw portions and notch portions.

The present embodiment further takes a configuration where the angles of at least two adjacent lens notch portions are smaller than the angles of all camera claw portions. Specifically, in the present embodiment, the angles $\theta A4$ and $\theta A5$ of the first lens notch portion 1301a and second lens notch portion 1301b in the circumferential direction are smaller than the angles $\theta A1$ through $\theta A3$ of the first through third camera claw portions 1401a through 1401c in the circumferential direction. That is to say, the relation between the claw portions and notch portions at the lens mount 1301 side and the camera mount 1401 side according to the present embodiment satisfy $\theta A4<\theta A1$, $\theta A4<\theta A2$, $\theta A4<\theta A3$, $\theta A5<\theta A1$, $\theta A5<\theta A2$, and $\theta A5<\theta A3$.

Figure 21A:
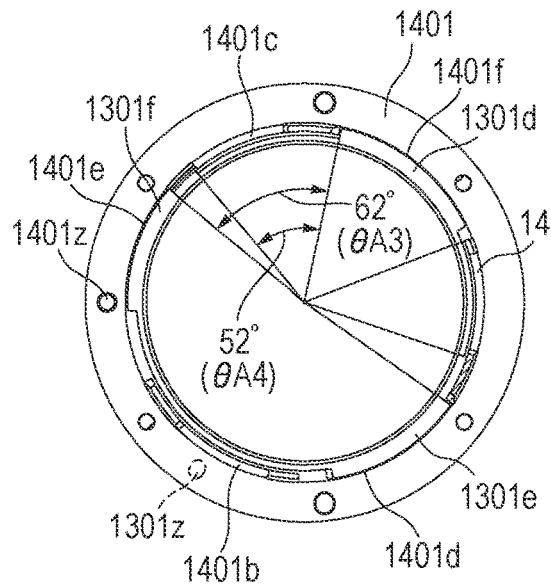
FIG. 21A is a diagram exemplarily illustrating a case of attempting to insert incompatible claw portions into recesses at a lens mount 1301 side and a camera mount 1401 side according to an exemplary embodiment of the present invention.
Figure 21C:
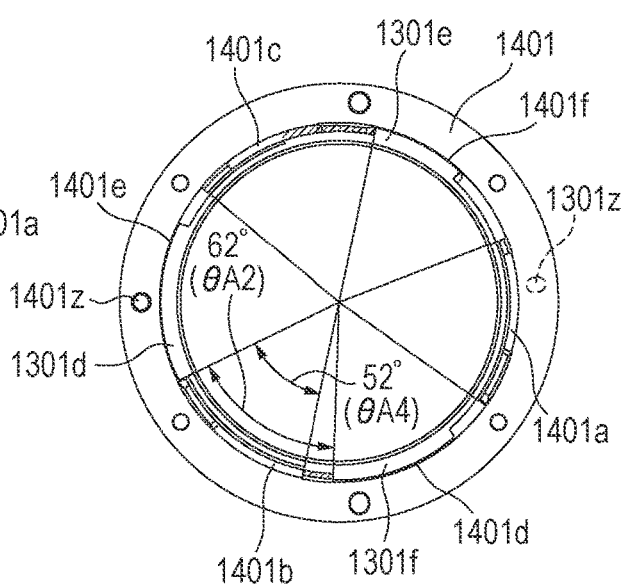
FIG. 21C is a diagram exemplarily illustrating the case of attempting to insert the incompatible claw portions into the recesses at the lens mount 1301 side and the camera mount 1401 side according to the exemplary embodiment of the present invention.
Figure 21B:
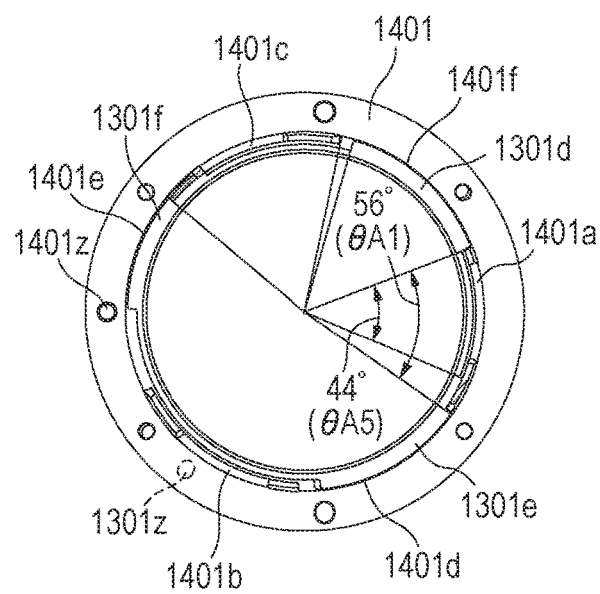
FIG. 21B is a diagram exemplarily illustrating the case of attempting to insert the incompatible claw portions into the recesses at the lens mount 1301 side and the camera mount 1401 side according to the exemplary embodiment of the present invention.
Figure 21D:
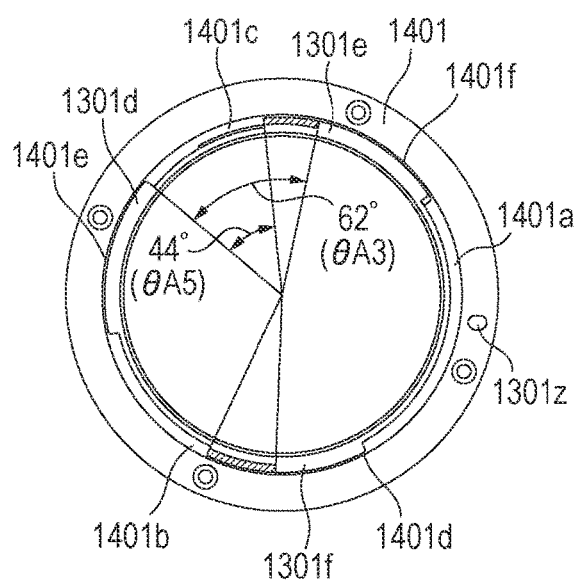
FIG. 21D is a diagram exemplarily illustrating the case of attempting to insert the incompatible claw portions into the recesses at the lens mount 1301 side and the camera mount 1401 side according to the exemplary embodiment of the present invention.

FIG. 21A, FIG. 21B, FIG. 21C and FIG. 21D are diagrams exemplarily describing a case of attempting to insert incompatible claw portions into notch portions at the lens mount 1301 side and camera mount 1401 side according to the embodiment of the present invention. FIG. 21A illustrates the way in which the third lens claw portion 1301f and third camera claw portion 1401c interfere in a case of attempting to insert the first lens claw portion 1301d into the third camera notch portion 1401f. FIG. 21B illustrates the way in which second lens claw portion 1301e and first camera claw portion 1401a interfere in a case of attempting to insert the first lens claw portion 1301d into the third camera notch portion 1401f. FIG. 21C illustrates the way in which the third lens claw portion 1301f and second camera claw portion 1401b interfere in a case of attempting to insert the first lens claw portion 1301d into the second camera notch portion 1401e. FIG. 21D illustrates the way in which the second lens claw portion 1301e and third camera claw portion 1401c interfere in a case of attempting to insert the first lens claw portion 1301d into the second camera notch portion 1401e.

As illustrated in FIGS. 21A through 21D, the lens claw portions and camera claw portions interfere in at least two places in the present embodiment, regardless of the relative rotational angle of the lens mount 1301 and camera mount 1401.

According to this configuration, erroneous mounting of an interchangeable lens assembly and conversion adapter having the lens mount 301 (1301) to an image pickup apparatus and conversion adapter having the camera mount 401 (1401) can be prevented even more effectively.

Next, the angles (phases) at which bayonet claw portions are disposed in the circumferential direction of the camera mount and lens mount of the second conversion adapter 70 will be described with reference to FIGS. 22A through 26.

The second conversion adapter 70 is a mount adapter used for mounting the first lens 100 that has a short flange focal distance to the camera body 60 that has a long flange focal distance. The lens mount 1501 is provided at one end (third end) side of the second conversion adapter 70, and the camera mount 1201 is provided at the other end (fourth end) side. That the camera mount 1201 of the second conversion adapter 70 has the same configuration as the camera mount 1201 of the camera body 10, which is the first image pickup apparatus described above. The lens mount 1501 of the second conversion adapter 70 has the same configuration as the lens mount 501 of the second lens 50 described above.

It is therefore preferable for the second conversion adapter 70 to be configured such that the camera body 10 that has a short flange focal distance cannot be directly mounted to the lens mount 1501, and the second lens 50 that has a long flange focal distance cannot be directly mounted to the camera mount 1201. This configuration can be realized by satisfying the positional relation of claw portions and notch portions such that the lens mount 1501 provided to one end (third end) of the second conversion adapter 70 and the camera mount 1201 provided to the other end (fourth end) cannot each be directly mounted.

Figure 22A:
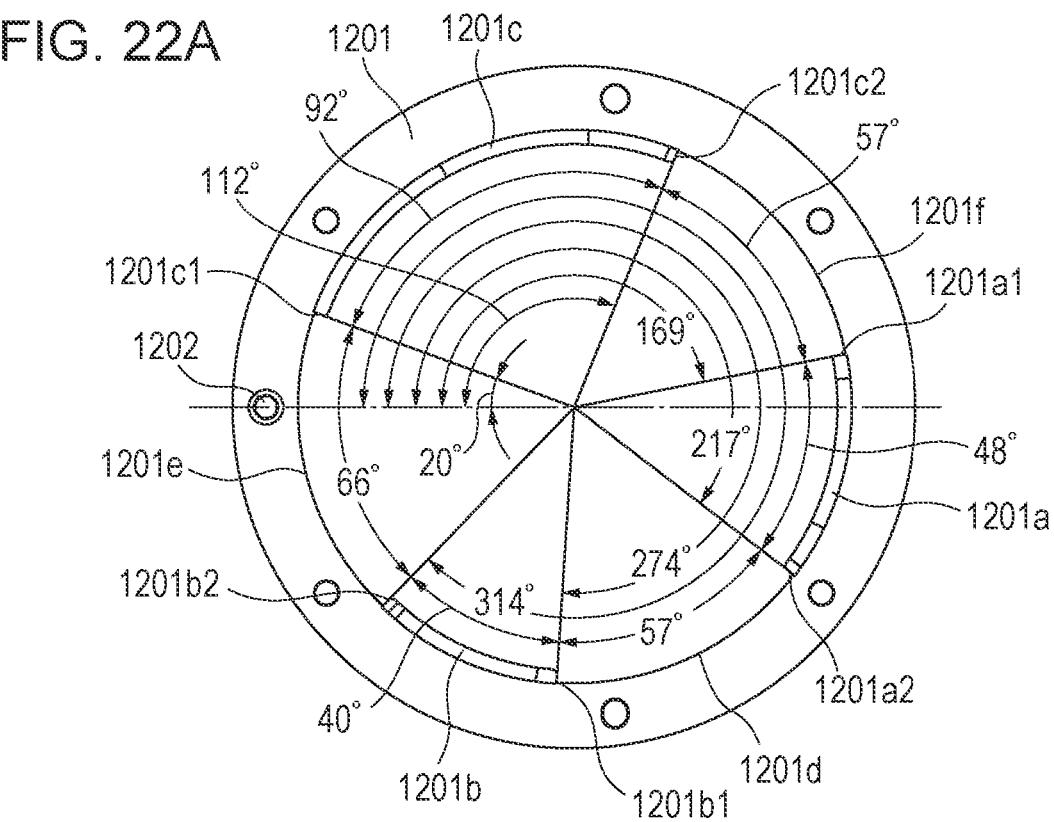
FIG. 22A is a diagram exemplarily illustrating disposition angles of bayonet claw portions in a camera mount 1201 provided on one end of a second conversion adapter 70.
Figure 22B:
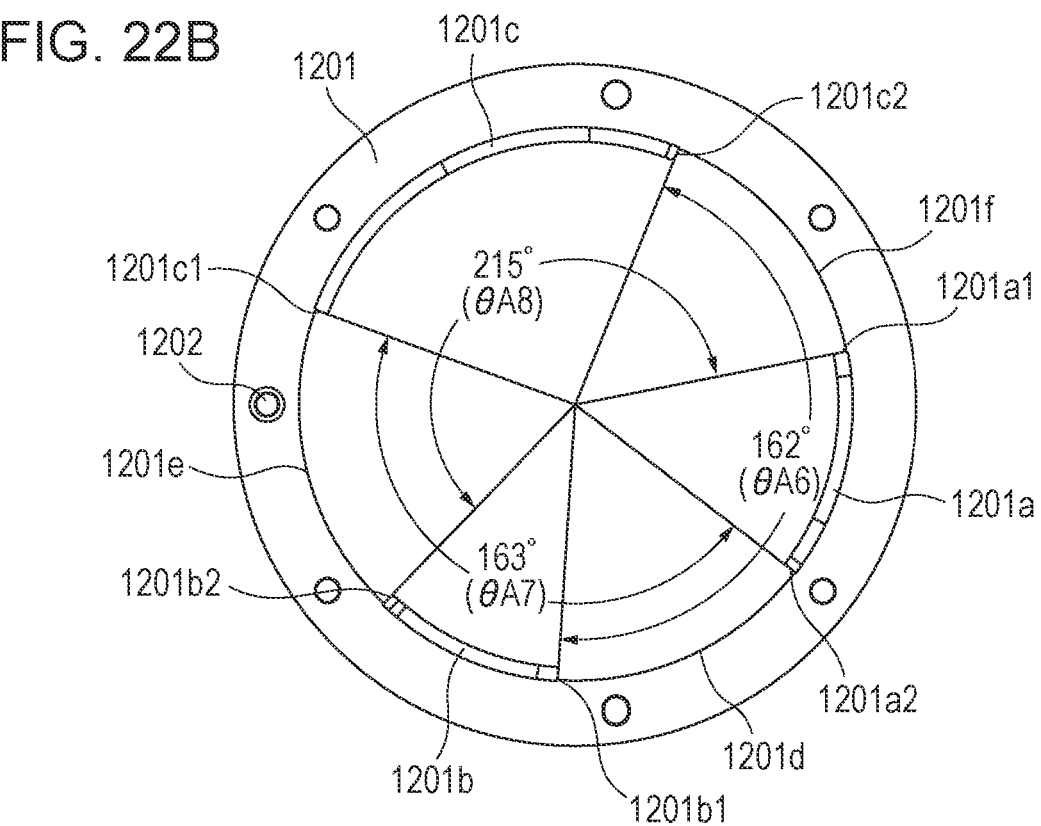
FIG. 22B is a diagram exemplarily illustrating disposition angles of the bayonet claw portions in the camera mount 1201 provided on the one end of the second conversion adapter 70.

FIG. 22A and FIG. 22B illustrate diagrams exemplarily describing angles of disposing bayonet claw portions in the camera mount 1201 provided on one end of the second conversion adapter 70. FIG. 22A is a diagram illustrating angle ranges that camera claw portions and camera notch portions occupy in the circumferential direction of the camera mount 1201 with the lock pin 1202 as a reference, as viewed from the rear face side. FIG. 22B is a diagram illustrating angle ranges that, regarding multiple camera claw portions 1201a through 1201c, the claw portions occupy in the circumferential direction of the camera mount 1201, as viewed from the rear face side. The angles of disposing the claw portions and notch portions on the camera mount 1201 of the second conversion adapter 70 are the same as the camera mount 201 of the camera body 10 described earlier, so description will be omitted.

As illustrated in FIG. 22B, the angle from the sixth end 1201c2 of the third camera claw portion 1201c to the third end 1201b1 of the second camera claw portion 1201b, in the circumferential direction of the camera mount 1201 including the first camera claw portion 1201a, is $\theta A6$ (162°). The angle from the second end 1201a2 of the first camera claw portion 1201a to the fifth end 1201c1 of the third camera claw portion 1201c, in the circumferential direction of the camera mount 1201 including the second camera claw portion 1201b, is $\theta A7$ (163°). The angle from the fourth end 1201b2 of the second camera claw portion 1201b to the first end 1201a1 of the first camera claw portion 1201a, in the circumferential direction of the camera mount 1201 including the third camera claw portion 1201c, is $\theta A8$ (215°).

Figure 23A:
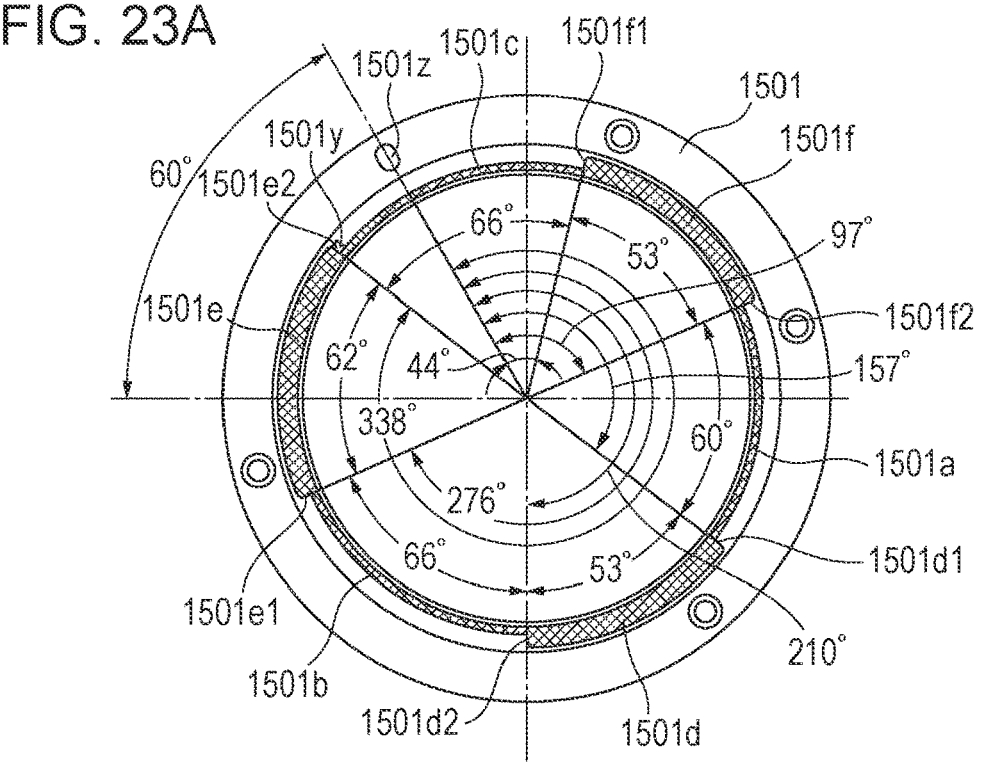
FIG. 23A is a diagram exemplarily illustrating disposition angles of bayonet claw portions in a lens mount 1501 provided on another end of a second conversion adapter 70.
Figure 23B:
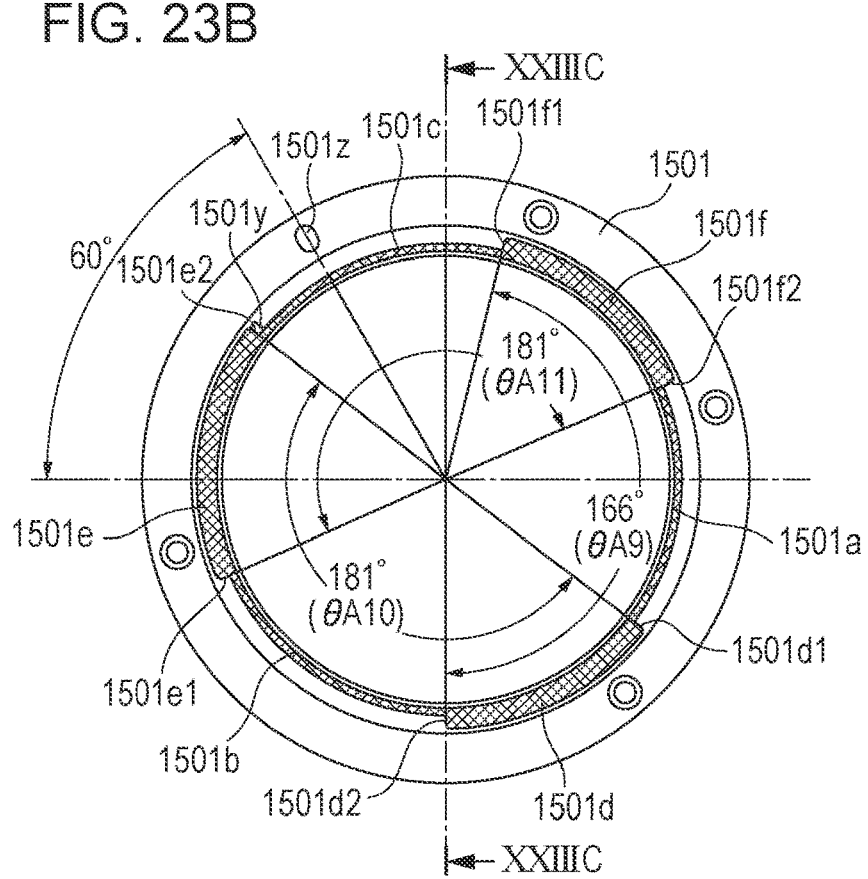
FIG. 23B is a diagram exemplarily illustrating the disposition angles of the bayonet claw portions in the lens mount 1501 provided on the other end of the second conversion adapter 70.
Figure 23C:
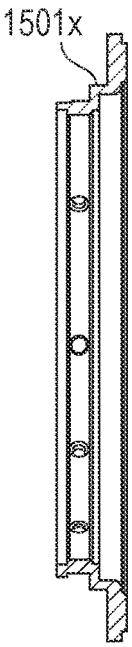
FIG. 23C is a diagram exemplarily illustrating the disposition angles of the bayonet claw portions in the lens mount 1501 provided on the other end of the second conversion adapter 70.

Next, FIG. 23A, FIG. 23B and FIG. 23C illustrate diagrams exemplarily describing angle so disposing bayonet claw portions in a lens mount 1501 provided on the other end of the second conversion adapter 70. FIG. 23A is a diagram illustrating angle ranges that lens claw portions and lens notch portions occupy in the circumferential direction of the lens mount 1501 with a groove 1501z where a lock pin is inserted as a reference, as viewed from the rear face side. FIG. 23B is a diagram illustrating angle ranges where notch portions are provided regarding the multiple lens notch portions 1501a through 1501c in the circumferential direction of the lens mount 1501, as viewed from the rear face side. FIG. 23C is a cross-sectional diagram taken along a cross-section XXIIIC-XXIIIC illustrated in FIG. 23B.

A first lens claw portion 1501d, second lens claw portion 1501e, and third lens claw portion 1501f, are provided in order, to the lens mount 1501 in the circumferential direction (inner radial direction). In a case of viewing the lens mount 1501 from the rear face side as illustrated in FIG. 23A, the lens claw portion provided at a position farthest from the groove 1501z where the lock pin is inserted is the first lens claw portion 1501d. The second lens claw portion 1501e and third lens claw portion 1501f are then consecutively provided in order from the first lens claw portion 1501d in a clockwise direction.

A first lens notch portion 1501a, second lens notch portion 1501b, and third lens notch portion 1501c are provided in order, to the lens mount 1501 in the circumferential direction (inner radial direction). In a case of viewing the lens mount 1501 from the rear face side as illustrated in FIG. 23A, the notch portion provided at a position nearest to the groove 1501z is the third lens notch portion 1501c. The first lens notch portion 1501a and second lens notch portion 1501b are then consecutively provided in order from the third lens notch portion 1501c in a clockwise direction.

End portions of the lens claw portions 1501d, 1501e, and 1501f, in the circumferential direction, will be referred to as a first end 1501d1, a second end 1501d2, a third end 1501e1, a fourth end 1501e2, a fifth end 1501f1, and a sixth end 1501f2, for the sake of description. The end portions are denoted with part numerals in order from the first lens claw portion 1501d in the clockwise direction, when viewing the lens mount 1501 from the rear face side, as described above.

As illustrated in FIG. 23A, the angles that the lens claw portions and lens notch portions occupy in the circumferential direction of the lens mount 1501 (angle ranges) are stipulated as follows. The angle of the first lens claw portion 1501d is 53°, the angle of the second lens claw portion 1501e is 62°, and the angle of the third lens claw portion 1501f is 53°. That is to say, the angles of the lens claw portions on the lens mount 1501 side are the same as the angles of the lens claw portions on the lens mount 301 side described above.

In contrast, the angles of the lens notch portions at the lens mount 1501 side differ from the angles of the lens notch portions at the lens mount 1301 side described above. Specifically, the angle of the first lens notch portion 1501a is 60°, the angle of the second lens notch portion 1501b is 66°, and the angle of the third lens notch portion 1501c is 66°.

When viewing the lens claw portions from the rear face side, the angles in the clockwise direction where the lens claw portions are disposed on the circumferential direction of the lens mount 1501 with the position of the lock groove 1501z (referred to as a reference position) as a reference are stipulated as follows. The first lens claw portion 1501d is disposed between 157° and 210° with the reference position as a start point. The second lens claw portion 1501e is disposed between 276° and 338° with the reference position as a start point. The third lens claw portion 1501f is disposed between 44° and 97° with the reference position as a start point.

As illustrated in FIG. 23C, a fitting member 1501x that restricts movement of the image pickup apparatus in a direction parallel to the optical axis when mounted to the image pickup apparatus is provided to the lens mount 1501 side. In the present embodiment, the diameter of the fitting member 1501x in a direction orthogonal to the optical axis at the camera mount 1201 side is the mount diameter. The mount diameters of the camera mounts and lens mounts described above are approximately the same length.

As illustrated in FIG. 23B, the angle from the fifth end 1501f1 of the third lens claw portion 1501f to the second end 1501d2 of the second lens claw portion 1501d, in the circumferential direction of the lens mount 1501 including the first lens notch portion 1501a, is θA9 (166°). The angle from the first end 1501d1 of the first lens claw portion 1501d to the fourth end 1501e2 of the second lens claw portion 1501e, in the circumferential direction of the lens mount 1501 including the second lens notch portion 1501b, is θA10 (181°). The angle from the third end 1501e1 of the second lens claw portion 1501e to the sixth end 1501f2 of the third lens claw portion 1501f, in the circumferential direction of the lens mount 1501 including the third lens notch portion 1501c, is θA11 (181°).

The angles of the claw portions and notch portions in the circumferential direction will be compared between the camera mount 1201 and lens mount 1501 provided to the second conversion adapter 70. For example, the angle (92°) of the third camera claw portion 1201c at the camera mount 1201 side is larger than the angles (66°) of the second and third lens notch portions 1501b and 1501c that are the largest angle of the lens notch portions at the lens mount 1501 side. That is to say, the angle of at least one camera claw portion at the camera mount 1201 side is larger than the angle of the lens notch portion having the largest angle at the lens mount 1501 side.

In this case, of the claw portions at the camera mount 1201 side and notch portions at the lens mount 1501 side, at least one or more camera claw portions and lens notch portions interfere with each other. Thus, even if an attempt is made to mount the interchangeable lens assembly to the camera body such that the optical axis at the camera mount 1201 side and lens mount 1501 side are substantially parallel to each other, the claw portions and notch portions interfere, and therefore the interchangeable lens assembly cannot be mounted to the camera body.

However, if only one claw portion and notch portion are interfering, there may be cases where claw portions of the camera mount side can be inserted into notch portions of the lens mount side, in the same way as the description of the first conversion adapter 40 made above. For example, there are cases where, in a state where the optical axis of the lens mount side is obliquely inclined as to the optical axis of the camera mount side, one end of a camera claw portion is inserted into a lens notch portion, and the lens mount and camera mount are rotated relative to each other, and the interchangeable lens assembly can be mounted to the camera body.

Figure 24A:
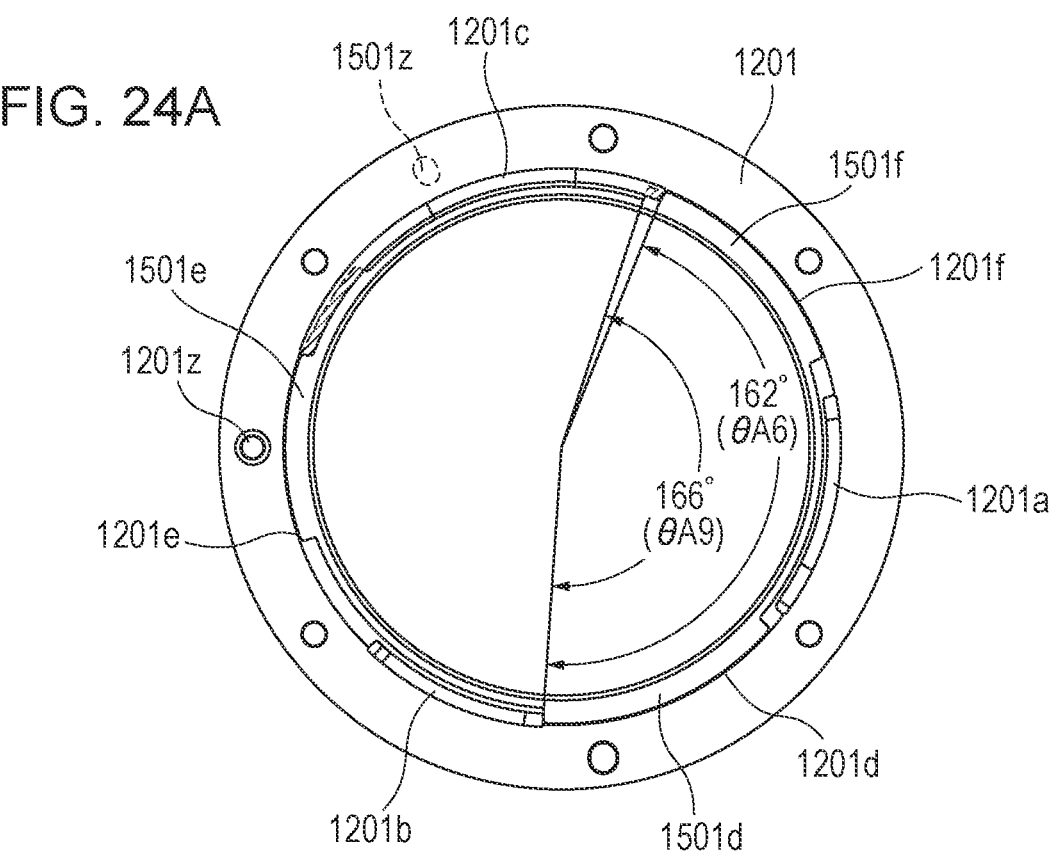
FIG. 24A is a diagram exemplarily illustrating a way in which claw portions interfere with each other, when attempting to mount a reference claw portion at a lens mount 1501 side to a reference recess at a camera mount 1201 side according to an embodiment of the present invention.
Figure 24B:
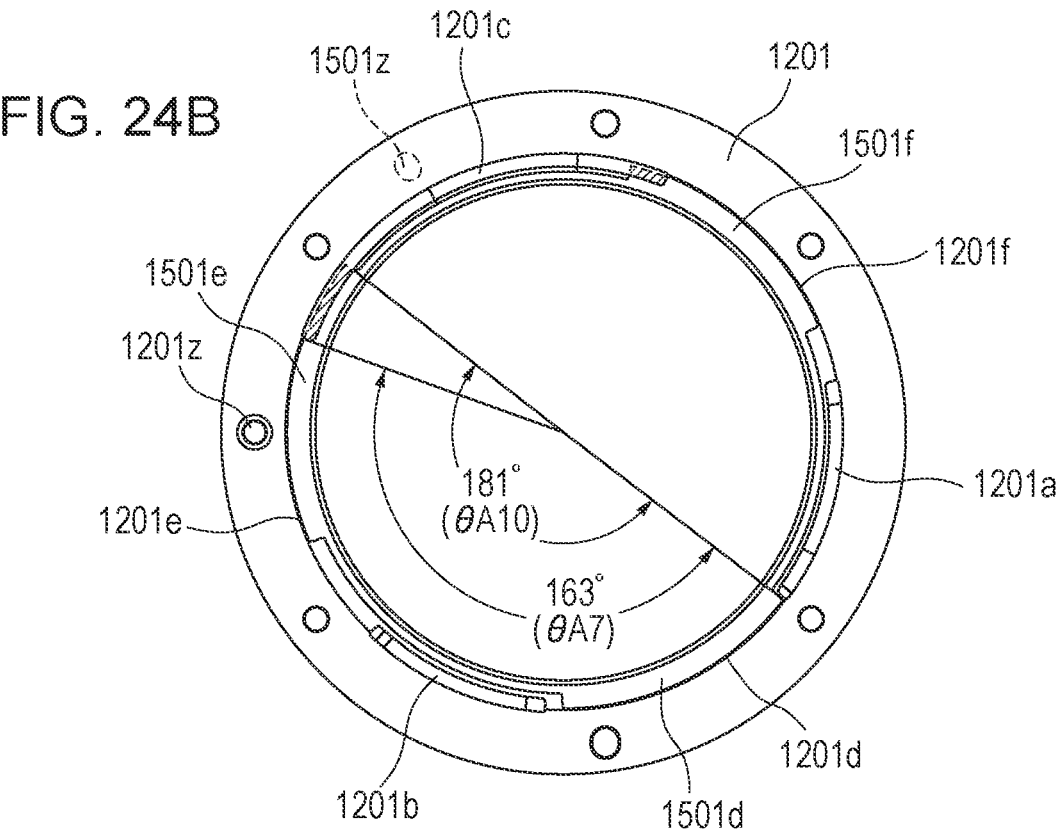
FIG. 24B is a diagram exemplarily illustrating a way in which the claw portions interfere with each other, when attempting to mount the reference claw portion at the lens mount 1501 side to the reference recess at the camera mount 1201 side according to the embodiment of the present invention.

In the present embodiment, the claw portions and notch portions at the camera mount 1201 side and the lens mount 1501 side are disposed so as to satisfy θA6<θA9 and θA7<θA10 in the circumferential direction. FIG. 24A and FIG. 24B illustrate diagrams exemplarily describing the way in which claw portions interfere with each other, when attempting to mount a reference claw portion on the lens mount 1501 side to a reference notch portion on the camera mount 1201 side according to the embodiment of the present invention. FIG. 24A illustrates the way in which the third lens claw portion 1501f and the third camera claw portion 1201c interfere, and FIG. 25B illustrates the way in which the second lens claw portion 1501e and the third camera claw portion 1201c interfere.

As illustrated in FIGS. 24A and 24B, in a case where the reference first lens claw portion 1501d is attempted to be inserted into the reference camera notch portion 1201d, for example, the third camera claw portion 1201c interferes with the second lens claw portion 1501e and the third lens claw portions 1501f.

That is to say, as viewed from the rear face side, the total sum of the angles of one reference lens claw portion, another lens claw portion adjacent thereto in the clockwise direction, and a lens notch portion situated between these lens claw portions, is taken as a first angle. As viewed from the rear face side, the total sum of the angles of one reference camera notch portion, another camera notch portion adjacent thereto in the clockwise direction, and a camera claw portion situated therebetween, is taken as a second angle. As viewed from the rear face side, the total sum of the angles of one reference lens claw portion, another lens claw portion adjacent thereto in the counterclockwise direction, and a lens notch portion situated between these lens claw portions, is taken as a third angle. Further, as viewed from the rear face side, the total sum of the angles of one reference camera notch portion, another camera notch portion adjacent thereto in the counterclockwise direction, and a camera claw portion situated therebetween, is taken as a fourth angle. According to the present embodiment, it is sufficient to layout the claw portions and notch portions at the camera mount 1201 side and lens mount 1501 side such that the first angle described above is larger than the second angle, and the third angle is larger than the fourth angle.

According to this configuration, at least two lens claw portions and one camera claw portion interfere with each other. Thus, the risk of an incompatible interchangeable lens assembly being erroneously mounted to an image pickup apparatus, or an incompatible interchangeable lens assembly and image pickup apparatus being erroneously mounted to mount units provided to both ends of a conversion adapter, can be reduced.

However, even in a case where the above conditions are satisfied, there may be cases where, when attempting to insert three claw portions into incompatible notch portions, for example, two claw portions are inserted into notch portions depending on the angles of the claw portions and notch portions.

The claw portions and notch portions at the camera mount 1201 side and lens mount 1501 side are therefore disposed in the circumferential direction so as to satisfy θA6<θA9, θA6<θA10, θA6<θA11, θA7<θA9, θA7<θA10, and θA7<θA11. That is to say, as viewed from the rear face side, the total sum of the angles of two claw portions other than the reference claw portion described above, and a lens notch portion situated therebetween, is taken as a fifth angle. According to the present embodiment, it is sufficient to layout the claw portions and notch portions at the camera mount 1201 side and lens mount 1501 side such that the second angle and fourth angle described above are smaller than any of the first angle, third angle, and fifth angle.

Figure 25A:
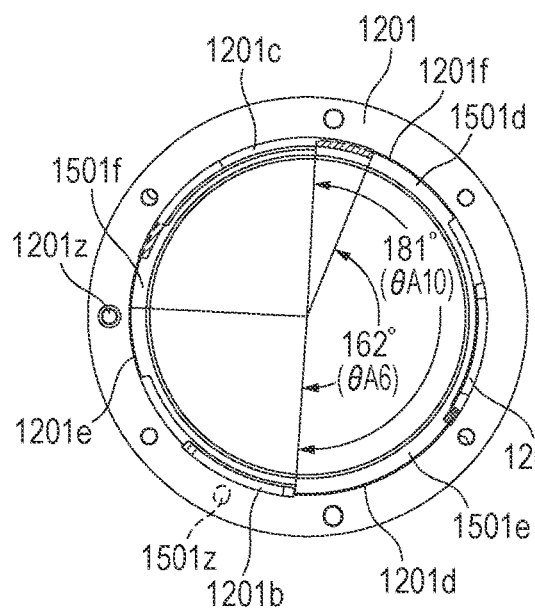
FIG. 25A is a diagram exemplarily illustrating a way in which claw portions interfere with each other, when attempting to mount claws other than a reference claw at a lens mount 1501 side to a reference recess at a camera mount 1201 side according to an embodiment of the present invention.
Figure 25B:
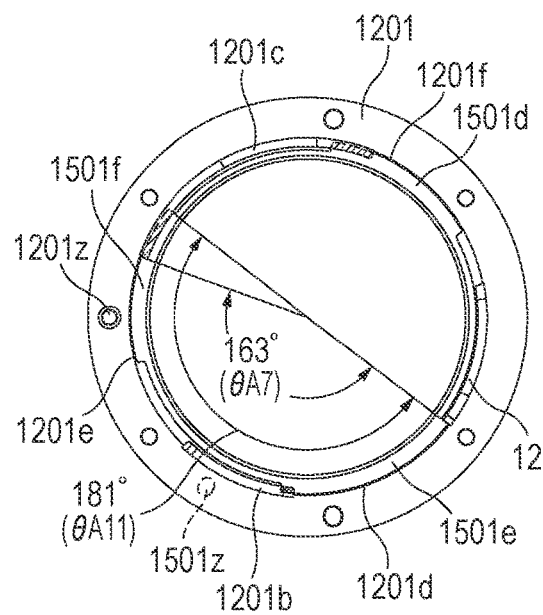
FIG. 25B is a diagram exemplarily illustrating a way in which the claw portions interfere with each other, when attempting to mount the claws other than the reference claw at the lens mount 1501 side to the reference recess at the camera mount 1201 side according to the embodiment of the present invention.
Figure 25C:
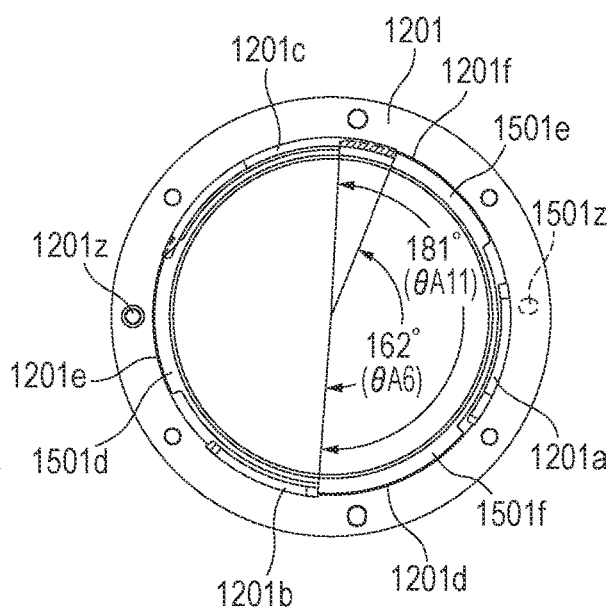
FIG. 25C is a diagram exemplarily illustrating a way in which the claw portions interfere with each other, when attempting to mount the claws other than the reference claw at the lens mount 1501 side to the reference recess at the camera mount 1201 side according to the embodiment of the present invention.
Figure 25D:
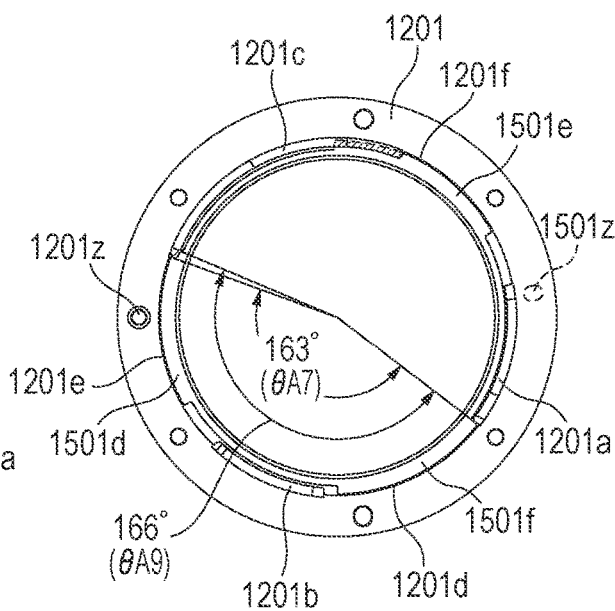
FIG. 25D is a diagram exemplarily illustrating a way in which the claw portions interfere with each other, when attempting to mount the claws other than the reference claw at the lens mount 1501 side to the reference recess at the camera mount 1201 side according to the embodiment of the present invention.

FIG. 25A, FIG. 25B, FIG. 25C and FIG. 25D illustrate diagrams exemplarily describing the way in which claw portions interfere with each other, when attempting to mount a claw portion other than the reference claw portion at the lens mount 1501 side to a reference notch portion at the camera mount 1201 side according to the embodiment of the present invention. FIG. 25A illustrates the way in which the first lens claw portion 1501d and the third camera claw portion 1201c interfere in a case of attempting to insert the second lens claw portion 1501e into the first camera notch portion 1201d. FIG. 25B illustrates the way in which the third lens claw portion 1501f and the third camera claw portion 1201c interfere in a case of attempting to insert the second lens claw portion 1501e into the first camera notch portion 1201d. FIG. 25C illustrates the way in which the second lens claw portion 1501e and the third camera claw portion 1201c interfere in a case of attempting to insert the third lens claw portion 1501f into the first camera notch portion 1201d. FIG. 25D illustrates the way in which the first lens claw portion 1501d and the third camera claw portion 1201c interfere in a case of attempting to insert the third lens claw portion 1501f into the first camera notch portion 1201d.

As illustrated in FIGS. 25A through 25D, at least two lens claw portions and one camera claw portion interfere, regardless of the relative rotation angle of the lens mount 1501 and camera mount 1201 according to the present embodiment. According to this configuration, erroneous mounting of an interchangeable lens assembly and conversion adapter having the lens mount 501 (1501) to an image pickup apparatus and conversion adapter having the camera mount 201 (1201) can be prevented effectively.

Figure 26:
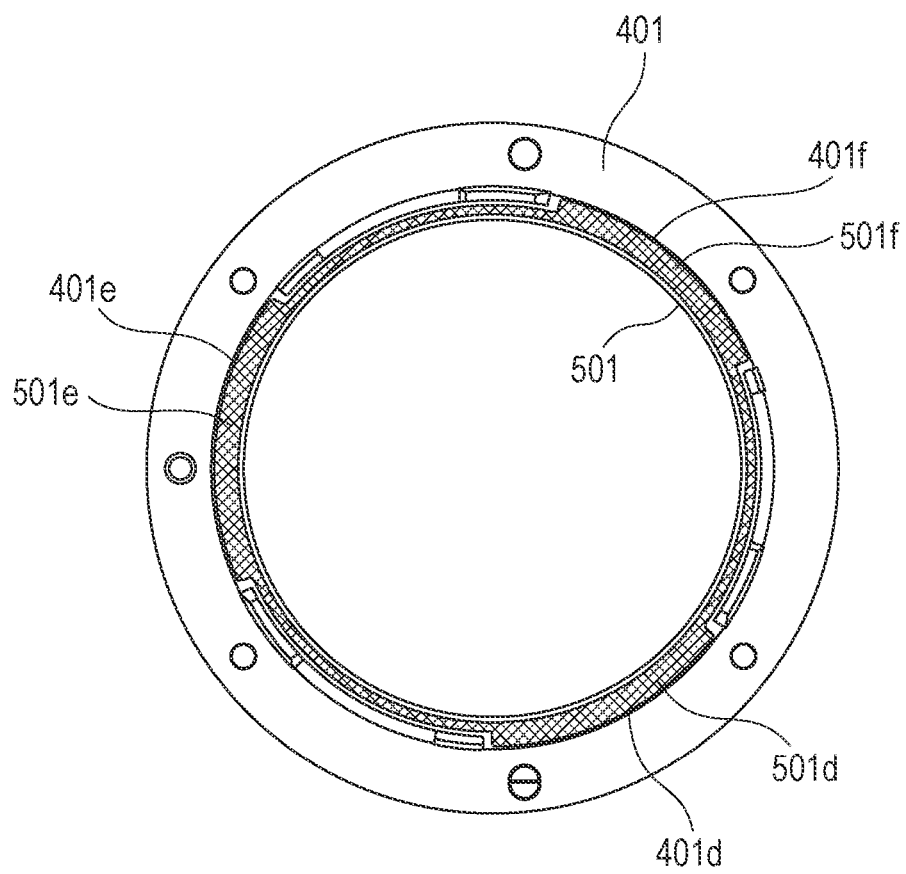
FIG. 26 is a diagram exemplarily illustrating a state in which claw portions provided to a camera mount 401 side and a lens mount 501 side according to an embodiment of the present invention are engaged.

FIG. 26 is a diagram exemplarily describing a state in which claw portions provided to the camera mount 1401 side and lens mount 1501 side according to the embodiment of the present invention are engaged. The first lens claw portion 501d can be inserted into the first camera notch portion 401d, as illustrated in FIG. 26. The second lens claw portion 501e can be inserted into the second camera notch portion 401e. Further, the third lens claw portion 501f can be inserted into the third camera notch portion 401f. That is to say, the camera mount 401 side and the lens mount 501 side are a combination compatible with being directly mounted to each other. As illustrated in FIG. 10A, the camera mount 201 side and the lens mount 301 side are a combination compatible to being directly mounted to each other.

As described above, the camera mount 401 corresponding to an image pickup apparatus (e.g., the camera body 60) that has a long flange focal distance, and the lens mount 501 corresponding to an interchangeable lens assembly (e.g., the second lens 50) that has a long flange focal distance can be directly mounted to each other. However, the camera mount 201 corresponding to an image pickup apparatus (e.g., the camera body 10) having a short flange focal distance and the lens mount 501 corresponding to an interchangeable lens assembly (e.g., the second lens 50) that has a long flange focal distance cannot be directly mounted to each other. The camera mount 201 corresponding to an image pickup apparatus (e.g., the camera body 10) that has a short flange focal distance and the lens mount 301 corresponding to an interchangeable lens assembly (e.g., the first lens 100) that has a short flange focal distance can be directly mounted to each other. However, the camera mount 401 corresponding to an image pickup apparatus (e.g., the camera body 60) that has a long flange focal distance and the lens mount 301 corresponding to an interchangeable lens assembly (e.g., the first lens 100) that has a short flange focal distance cannot be directly mounted to each other.

Therefore, an image pickup apparatus and camera accessory employing the configuration of the above-described embodiment can prevent erroneous mounting of an image pickup apparatus and camera accessory that have generally the same mount diameter but are not mutually compatible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An accessory configured to be detachably mountable to an image pickup apparatus that includes a plurality of first bayonet claw portions and a plurality of first terminals, the accessory comprising:
   an accessory body;
   a mount portion including a plurality of second bayonet claw portions capable of engaging with the plurality of first bayonet claw portions, and a plurality of second terminals contacting with the plurality of first terminals when the accessory is mounted to the image pickup apparatus; and
   a fixing member for fixing the second mount portion to the accessory body,
   wherein the plurality of second terminals is provided at positions different from positions of the plurality of second bayonet claw portions, and includes a terminal used in determining whether the accessory is mounted on the image pickup apparatus, and
   wherein, when viewed in a central axis direction of the mount portion, a half line, that extends from a central axis of the mount portion and passes through the terminal used in the determination, also passes through a predetermined claw portion among the plurality of second bayonet claw portions.

2. The accessory according to claim 1, wherein, when viewed in the central axis direction, all of a plurality of half lines, that extends from the central axis and passes through a plurality of terminals, among the plurality of second terminals, that is used in communication between the image pickup apparatus and the accessory, also passes through the predetermined claw portion.

3. The accessory according to claim 1, further comprising a terminal holding portion configured to hold the plurality of second terminals,
   wherein one of the terminal holding portion and the accessory includes a protrusion, and the other of the terminal holding portion and the accessory includes a hole portion to which the protrusion engages.

4. The accessory according to claim 3, wherein, when viewed in the central axis direction, a half line, that extends from the central axis and passes through the protrusion, also passes through the predetermined claw portion.

5. The accessory according to claim 3,
   wherein a first adjacent terminal is a terminal adjacent to the terminal used in the determination on one side with respect to the terminal used in the determination, a second adjacent terminal is a terminal adjacent to the terminal used in the determination on the other side with respect to the terminal used in the determination, and a third adjacent terminal is a terminal adjacent to the second adjacent terminal on the other side, among the plurality of second terminals, and
   wherein, when viewed in the central axis direction, the protrusion and the hole portion are provided in a region between a half line that extends from the central axis and passes through the first adjacent terminal, and a half line that extends from the central axis and passes through the third adjacent terminal.

6. The accessory according to claim 5, wherein, when viewed in the central axis direction, the protrusion and the hole portion are provided in a region between the half line that extends from the central axis and passes through the terminal used in the determination, and the half line that extends the central axis and pass through the third adjacent terminal.

7. The accessory according to claim 1, wherein the plurality of second terminals includes a terminal that is configured to be used in distinguishing a type of the accessory mounted on the image pickup apparatus.

8. The accessory according to claim 7, wherein, when viewed in the central axis direction, the half line that extends from the central axis and passes through the terminal configured to be used in the distinguishing passes through between the plurality of second bayonet claw portions.

9. The accessory according to claim 1,
   wherein the plurality of second terminals includes
   a terminal configured to connect the image pickup apparatus and a communication control system of the accessory to a ground, and
   a terminal configured to supply power, used in an operation of the communication control system, from the image pickup apparatus to the accessory.

10. The accessory according to claim 1,
    wherein the plurality of second terminals includes
    a terminal configured to connect the image pickup apparatus and a mechanical drive system of the accessory to a ground, and
    a terminal configured to supply power, used in an operation of the mechanical drive system, from the image pickup apparatus to the accessory.

11. The accessory according to claim 1,
    wherein the plurality of second terminals includes
    a terminal configured to communicate a clock signal output from the image pickup apparatus to the accessory,
    a terminal configured to allow two-way communication between the image pickup apparatus and the accessory, and
    a terminal configured to communicate data to the image pickup apparatus.

12. The accessory according to claim 11,
    wherein the plurality of second terminals includes
    a terminal configured to communicate data to the image pickup apparatus independent of the terminal configured to communicate data to the image pickup apparatus.

13. The accessory according to claim 11,
    wherein the plurality of second terminals includes
    a terminal configured to allow two-way communication between the image pickup apparatus and the accessory independent of the terminal configured to allow two-way communication between the image pickup apparatus and the accessory, and
    a terminal configured to communicate a communication request signal from the image pickup apparatus.

14. The accessory according to claim 1, further comprising a lens.

15. The accessory according to claim 1, wherein the accessory is detachably mountable to a lens apparatus.

16. The accessory according to claim 15, further comprising a plurality of third bayonet claw portions configured to allow engagement with the lens apparatus,
    wherein a minimum value of a dimension in a circumferential direction of the plurality of third bayonet claw portions is larger than a minimum value of a dimension in a circumferential direction of a notch between the plurality of second bayonet claw portions.

17. The accessory according to claim 15, further comprising a restricted portion configured to be restricted by a restriction member of the image pickup apparatus when the accessory is mounted to the image pickup apparatus, wherein the plurality of second bayonet claw portions includes first and second claw portions adjacent to the restricted portion in a circumferential direction, and an opposite claw portion arranged on an opposite side to the restricted portion with respect to the first and second claw portions in a circumferential direction.

18. The accessory according to claim 17, further comprising a plurality of third bayonet claw portions configured to allow engagement with the lens apparatus, wherein a dimension in a circumferential direction of a notch adjacent to one end portion of the opposite claw portion is smaller than a dimension in a circumferential direction of the plurality of third bayonet claw portions that overlaps the notch when viewed in the central axis direction, and wherein a dimension in a circumferential direction of the notch adjacent to the other end portion of the opposite claw portion is smaller than a dimension in a circumferential direction of the plurality of third bayonet claw portions that overlaps the notch when viewed in the central axis direction.

19. The accessory according to claim 17, further comprising a plurality of third bayonet claw portions configured to allow engagement with the lens apparatus, wherein a dimension in a circumferential direction of a notch adjacent to one end portion of the opposite claw portion is smaller than a dimension in a circumferential direction of each of the plurality of third bayonet claw portions, and wherein a dimension in a circumferential direction of the notch adjacent of the other end portion of the opposite claw portion is smaller than a dimension in a circumferential direction of each of the plurality of third bayonet claw portions.

20. The accessory according to claim 17, further comprising a plurality of third bayonet claw portions configured to allow engagement with the lens apparatus, wherein an interval in a circumferential direction between the furthest end portions of the opposite claw portion and the first claw portion is larger than an interval in a circumferential direction between the furthest end portions of first and second notches that overlap the opposite claw portion and the first claw portion when viewed in the central axis direction among the plurality of third bayonet claw portions.

21. The accessory according to claim 17, further comprising a plurality of third bayonet claw portions configured to allow engagement with the lens apparatus, wherein an interval in a circumferential direction between the furthest end portions of first and second notches that overlap the opposite claw portion and the first claw portion when viewed in the central axis direction among the plurality of third bayonet claw portions is smaller than an interval in a circumferential direction between the farthest end portions of two second bayonet claw portions adjacent to each other among the plurality of second bayonet claw portions, and wherein an interval in a circumferential direction between the furthest end portions of a third notch that overlaps the second claw portion when viewed in the central axis direction among the plurality of third bayonet claw portions and the first notch is smaller than an interval in a circumferential direction between the farthest end portions of two second bayonet claw portions adjacent to each other among the plurality of second bayonet claw portions.

22. The accessory according to claim 1, wherein the determination triggers a start of power supply form the image pickup apparatus to the accessory.

23. An image pickup apparatus comprising:

a plurality of image pickup apparatus first bayonet claw portions; and a plurality of image pickup apparatus first terminals, wherein the image pickup apparatus is detachably mountable to the accessory according to claim 1.

24. An image pickup system comprising:

the accessory according to claim 1; and an image pickup apparatus having a plurality of image pickup apparatus first bayonet claw portions, and a plurality of image pickup apparatus first terminals, wherein the image pickup apparatus is detachably mountable to the accessory.

* * * * *